US012134064B2

(12) United States Patent
Ehrenberg et al.

(10) Patent No.: US 12,134,064 B2
(45) Date of Patent: Nov. 5, 2024

(54) SELF-CLEANING AIR FILTRATION APPARATUS AND METHOD

(71) Applicant: THE SY-KLONE COMPANY, LLC, Jacksonville, FL (US)

(72) Inventors: Eric L. Ehrenberg, Jacksonville, FL (US); James G. Moredock, Saint Augustine, FL (US)

(73) Assignee: THE SY-KLONE COMPANY, LLC, Jacksonville, FL (US)

( * ) Notice: Subject to any disclaimer, the term of this patent is extended or adjusted under 35 U.S.C. 154(b) by 69 days.

(21) Appl. No.: 17/356,973

(22) Filed: Jun. 24, 2021

(65) Prior Publication Data
US 2022/0410058 A1    Dec. 29, 2022

(51) Int. Cl.
*B01D 45/16*   (2006.01)
*B01D 46/00*   (2022.01)
(Continued)

(52) U.S. Cl.
CPC ............. *B01D 50/20* (2022.01); *B01D 45/16* (2013.01); *B01D 46/0043* (2013.01);
(Continued)

(58) Field of Classification Search
CPC .... B01D 50/20; B01D 45/16; B01D 46/0043; B01D 46/009; B01D 46/2403;
(Continued)

(56) References Cited

U.S. PATENT DOCUMENTS 3,016,984 A    1/1962   Getzin
3,884,658 A    5/1975   Roach
(Continued)

FOREIGN PATENT DOCUMENTS

DE    195 47 664 A1    6/1997
JP    S54-016859 Y2    6/1979
(Continued)

OTHER PUBLICATIONS

Jan. 24, 2022 Search Report issued in European Patent Application No. 21187308.8.
(Continued)

*Primary Examiner* — Dung H Bui
(74) *Attorney, Agent, or Firm* — Oliff PLC

(57) ABSTRACT

An air filtration apparatus includes an airflow powerhead assembly including a fan assembly and a vane assembly, a filter assembly, and a separator chamber housing inside of which the filter assembly is disposed. The separator chamber housing has a chamber inlet at a first axial side and a clean air outlet at a second axial side of the separator chamber housing opposite the first axial side. The filter assembly has a first axial end adjacent the chamber inlet and a second axial end adjacent the clean air outlet. The separator chamber housing includes at least one debris ejection slot extension configured to eject debris from an inner space of the separator chamber housing. The filter assembly includes a debris catch tray disposed at the second axial end, the debris catch tray having a debris ejection slot aligned with the at least one debris ejection slot extension.

21 Claims, 43 Drawing Sheets

(51) Int. Cl.
  *B01D 46/24* (2006.01)
  *B01D 46/42* (2006.01)
  *B01D 46/48* (2006.01)
  *B01D 46/62* (2022.01)
  *B01D 50/20* (2022.01)
  *F02M 35/02* (2006.01)
  *F02M 35/024* (2006.01)

(52) U.S. Cl.
  CPC ....... *B01D 46/009* (2013.01); *B01D 46/2403* (2013.01); *B01D 46/4227* (2013.01); *B01D 46/4245* (2013.01); *B01D 46/48* (2013.01); *B01D 46/62* (2022.01); *B01D 2265/024* (2013.01); *B01D 2271/022* (2013.01); *B01D 2273/30* (2013.01); *B01D 2279/60* (2013.01); *F02M 35/0201* (2013.01); *F02M 35/024* (2013.01)

(58) Field of Classification Search
  CPC ............ B01D 46/4227; B01D 46/4245; B01D 46/48; B01D 46/62; B01D 2265/024; B01D 2271/022; B01D 2273/30; B01D 2279/60; B01D 46/0042; B01D 46/429; B01D 46/645; B01D 2265/021; B01D 2265/026; B01D 2265/028; B01D 2271/02; B01D 46/2414; F02M 35/0201; F02M 35/024; F02M 35/0223; F02M 35/0203; F02M 35/06
  See application file for complete search history.

(56) References Cited

U.S. PATENT DOCUMENTS

| | | | |
|---|---|---|---|
| 5,211,846 A | 5/1993 | Kott et al. | |
| D354,796 S | 1/1995 | Smith, Sr. | |
| 5,656,050 A | 8/1997 | Moredock | |
| 5,766,315 A | 6/1998 | Moredock | |
| 5,893,937 A | 4/1999 | Moessinger | |
| 6,319,304 B1 | 11/2001 | Moredock | |
| 6,338,745 B1 | 1/2002 | Moredock et al. | |
| 6,406,506 B1 | 6/2002 | Moredock et al. | |
| 6,416,561 B1 | 7/2002 | Kallsen et al. | |
| 6,425,943 B1 | 7/2002 | Moredock | |
| 6,558,444 B1 | 5/2003 | Hunter | |
| 6,726,735 B1* | 4/2004 | Oussoren | B01D 46/521 |
| | | | 210/473 |
| 6,878,189 B2 | 4/2005 | Moredock | |
| 7,056,368 B2 | 6/2006 | Moredock et al. | |
| 7,311,744 B2* | 12/2007 | Elliott | B23Q 11/10 |
| | | | 55/423 |
| 7,452,409 B2 | 11/2008 | Moredock et al. | |
| 7,628,837 B2 | 12/2009 | Ehrenberg | |
| D646,350 S | 10/2011 | Salvador et al. | |
| D646,750 S | 10/2011 | Salvador et al. | |
| 8,394,166 B2 | 3/2013 | Scott et al. | |
| 8,414,675 B2 | 4/2013 | Iddings et al. | |
| 9,205,360 B2 | 12/2015 | Kaufmann et al. | |
| D768,277 S | 10/2016 | Moredock et al. | |
| D768,833 S | 10/2016 | Moredock et al. | |
| 10,826,356 B2 | 11/2020 | Lapelosa | |
| 10,850,222 B2* | 12/2020 | Moredock | B01D 46/4245 |
| 11,541,336 B2 | 1/2023 | Stark et al. | |
| D987,028 S | 5/2023 | Ehrenberg et al. | |
| 2002/0020295 A1 | 2/2002 | Moredock | |
| 2005/0172587 A1 | 8/2005 | Moredock et al. | |
| 2006/0168921 A1 | 8/2006 | Cheng | |
| 2009/0101013 A1 | 4/2009 | Moredock | |
| 2009/0249754 A1 | 10/2009 | Amirkhanian et al. | |
| 2009/0308034 A1 | 12/2009 | Olson et al. | |
| 2009/0308250 A1 | 12/2009 | Rotter et al. | |
| 2010/0146917 A1 | 6/2010 | Coulonvaux et al. | |
| 2010/0180577 A1* | 7/2010 | Gonze | F01N 3/021 |
| | | | 60/277 |
| 2012/0055126 A1 | 3/2012 | Whittier et al. | |
| 2012/0060453 A1 | 3/2012 | Holzmann et al. | |
| 2013/0025454 A1 | 1/2013 | Moredock et al. | |
| 2014/0075897 A1* | 3/2014 | Moredock | B01D 50/20 |
| | | | 55/327 |
| 2015/0021256 A1 | 1/2015 | Luther et al. | |
| 2015/0082982 A1 | 3/2015 | Ruhland et al. | |
| 2015/0167601 A1 | 6/2015 | Waltenberg et al. | |
| 2015/0314224 A1* | 11/2015 | Johnson | B01D 65/00 |
| | | | 210/323.2 |
| 2015/0375148 A1 | 12/2015 | Klein | |
| 2016/0271530 A1 | 9/2016 | Dickson et al. | |
| 2016/0375391 A1 | 12/2016 | Adamek et al. | |
| 2017/0028328 A1* | 2/2017 | Parra | B01D 29/58 |
| 2018/0245548 A1 | 8/2018 | Varghese et al. | |
| 2019/0001250 A1 | 1/2019 | Moredock et al. | |
| 2019/0201826 A1 | 7/2019 | Luchesi De Almeida et al. | |
| 2019/0217237 A1 | 7/2019 | Cloud et al. | |
| 2019/0308126 A1 | 10/2019 | Fritzsching et al. | |
| 2020/0009491 A1* | 1/2020 | Miller | B01D 29/114 |
| 2020/0346160 A1* | 11/2020 | Rieger | B01D 46/2414 |
| 2020/0391142 A1 | 12/2020 | Immel et al. | |
| 2021/0023492 A1 | 1/2021 | Chirme et al. | |
| 2021/0129064 A1 | 5/2021 | Tripathi et al. | |
| 2021/0252434 A1 | 8/2021 | Chen | |
| 2021/0260515 A1 | 8/2021 | Löwstedt et al. | |
| 2021/0370215 A1 | 12/2021 | Ehrenberg et al. | |
| 2022/0410059 A1 | 12/2022 | Ehrenberg et al. | |
| 2023/0415085 A1 | 12/2023 | Loehl et al. | |

FOREIGN PATENT DOCUMENTS

| | | |
|---|---|---|
| JP | 2006-513855 A | 4/2006 |
| JP | 2014-529483 A | 11/2014 |
| WO | 01/10536 A1 | 2/2001 |
| WO | 2013/019364 A1 | 2/2013 |

OTHER PUBLICATIONS

Jul. 18, 2022 Search Report issued in European Patent Application No. 22165268.8.
Jul. 15, 2022 Examination Report issued in European Patent Application No. 21187308.8.
U.S. Appl. No. 17/138,052, filed Dec. 30, 2020 in the name of Eric L. Ehrenberg et al.
Nov. 1, 2022 Office Action issued in Japanese Patent Application No. 2022-025908.
Jan. 13, 2023 Office Action issued in U.S. Appl. No. 17/495,537.
Jan. 9, 2023 Office Action issued in Canadian Patent Application No. 3,129,266.
Aug. 8, 2022 Office Action issued in Australian Patent Application No. 202116704.
Facebook, Sy-Klone International, "Introducing Vortex Max" <https://www.facebook.com/watch/?v=600878197942221> (Sep. 28, 2021).
Twitter, Sy-Klone International, "Introducing Vortex Max" <https://twitter.com/SyKloneInt/status/1442873593281482769> (Sep. 28, 2021).
LinkedIn, Sy-Klone International "Introducing Vortex Max" Part 1 <https://www.linkedin.com/company/sy-klone-international/posts/?feedView=images> (Sep. 29, 2021).
LinkedIn, Sy-Klone International "Introducing Vortex Max" Part 2 <https://www.linkedin.com/company/sy-klone-international/posts/?feedView=images> (Sep. 29, 2021).
Facebook, Sy-Klone International, "Introducing Vortex Max" <https://www.facebook.com/sykloneinternational/videos/3103749909845007/> (Oct. 19, 2021).
Jul. 28, 2023 Office Action issued in Canadian Patent Application No. 3, 129,266.
Jun. 26, 2023 Office Action issued in U.S. Appl. No. 17/495,537.
Oct. 23, 2023 Office Action issued U.S. Appl. No. 17/495,537.
Jan. 19, 2023 Office Action issued in Australian Patent Application No. 2021209139.
Dec. 27, 2023 Office Action issued in Korean Patent Application No. 10-2021-0100953.
Jul. 9, 2024 Office Action issued in U.S. Appl. No. 29/812,462.
Jul. 10, 2024 Office Action issued in U.S. Appl. No. 29/812,473.

(56) References Cited

OTHER PUBLICATIONS

Jul. 10, 2024 Office Action issued in U.S. Appl. No. 29/812,468.
1 Apr. 4, 2024 Office Action issued in U.S. Appl. No. 17/495,537.
May 14, 2024 Office Action issued in Brazilian Patent Application No. 122022003347-4.

* cited by examiner

SELF-CLEANING AIR FILTRATION APPARATUS AND METHOD

BACKGROUND

The present disclosure is directed to an improved air filtration apparatus and air filtration method for efficiently removing heavier-than-air particulate debris from debris-laden air to provide a clean airflow to a device with which the air filtration apparatus and method are used.

Air precleaners and air filtration methods that centrifugally separate heavier-than-air debris from the air with a filter used on internal combustion engines, ventilation systems and other devices that draw in debris-laden air are known. Such air precleaners include powered air precleaners and air filtration methods which employ a motor-driven fan for drawing debris-laden air into the air precleaner, as well as air precleaners and air filtration methods that rely solely upon a vacuum applied to the air precleaners and air filtration methods by the device being supplied with clean air, such as an internal combustion engine, for drawing debris-laden air into the air precleaner. Examples of Assignee's prior air precleaners and filtration methods are shown in the following U.S. patents, all of which are incorporated herein by reference in their entirety:

U.S. Pat. No. 5,656,050;
U.S. Pat. No. 5,766,315;
U.S. Pat. No. 6,319,304;
U.S. Pat. No. 6,338,745;
U.S. Pat. No. 6,406,506;
U.S. Pat. No. 6,425,943;
U.S. Pat. No. 6,878,189;
U.S. Pat. No. 7,056,368; and
U.S. Pat. No. 7,452,409.

Current engine and HVAC air filtration systems suffer from numerous design and performance issues. For example, current systems are based on designs that create significant air intake restriction, the result of which is shortened air filter life and negatively impacted engine performance and fuel economy. Also, current systems operate under a vacuum, which prematurely shortens the filter life due to higher initial air intake restriction, requiring more frequent filter servicing. Current air filtration systems often incorporate an air precleaner that traps airborne debris within the device, requiring manual removal of the captured debris. Other current technologies use a dump valve that allows the weight of the captured debris to overcome the vacuum created in the air precleaner/filtration system and fall out of the air filtration system physically; however, this dump valve frequently clogs when there is moisture or mixed debris in the airflow. Current systems may use a vacuum device to scavenge the separated airborne debris from the air filtration system, which requires additional components to capture and remove the scavenged debris. Such a system is also prone to clogging when there is moisture or mixed debris in the airflow.

In addition, the physical size and weight of current technology air filtration systems to generate a given airflow to the downstream device can create installation and serviceability problems. Known air filtration systems may require custom manufacturing of the precleaner, air filtration system and/or its installation components due to variations in configurations and performance requirements. This customization limits the range of applications of known air filtration systems and adversely affects the time and cost for manufacture. Examples of such variations between applications which require individual customization include: the required separate components for precleaning and disposing of the debris that is centrifugally separated from the precleaning device and must be ejected to the atmosphere; the location and airflow direction through the filter; the location of the clean air outlet for providing clean air from the air filtration system to the engine or device with which the air filtration system is used; the physical size and style of the filter; the location of available supporting structure for mounting the air filtration system and its components; and the particular clean airflow rate required to assure performance of the downstream system. In the case of powered air precleaners and air filtration systems, the life of the motor of the motor-driven fan has been found to be reduced due to reduced airflow to cool the motor when the motor is in the airflow path on the clean side of the filter because, as the filter loads, airflow is reduced, and the heat remaining on the motor reduces its life. Further, it has been found that the debris built up in the separator chamber is subject to enter into the clean air outlet during filter servicing, which may lead to decreased engine life or to debris entering HVAC and ventilation systems, respectively.

Therefore, there is a need for an improved air precleaning filtration apparatus and method which overcome these drawbacks and limitations of the known air precleaner filtration apparatuses. More specifically, there is a need for an improved air precleaning filtration apparatus that is physically compact, permitting its use in limited space applications, and that is versatile for use in a range of applications where different mounting configurations and clean airflow rate requirements exist, thereby eliminating the expense and inefficiency of custom-manufactured air precleaner filtration systems. There is also a need for an air filtration method in a compact, monolithic, powered air precleaner filtration apparatus which can properly cool the fan motor as part of its design, ensuring extended motor life. Related to this, there is a need for an improved air precleaner filtration apparatus that operates at full efficiency regardless of the airflow demand of the device on which the system is installed, while ensuring that the ejection slot/port does not become clogged during operation. There is also a need for the disposable air filter cartridge to provide a barrier to keep separated debris out of the clean side outlet during filter servicing and direct the separated debris to its intended location (the ejection slot/port located at the outlet end of the main housing separator chamber), such barrier being referred to herein as a debris catch tray. There is also a need to incorporate filter identification technology with the ability to store data in the filter. There is further a need to monitor pressure and vacuum in the device, and provide multiple types of fans and motors, as well as variable speed control of the electric motor when required. The improved, compact, versatile air precleaning filtration apparatus and method of the present disclosure, with the disposable air filter cartridge having the debris catch tray, address these needs in the art.

SUMMARY

The present disclosure is directed to a compact self-cleaning air filtration apparatus and method providing a range of advantageous effects, which include reducing air intake restriction on engine applications, providing positive airflow pressure for HVAC and ventilation systems, and improving the debris separator efficiency at all operating airflow rates. The air filtration apparatus incorporates features including optional filter identification (FID) with data storage, multiple fan and motor combinations, motor speed control, pressure monitoring and control, the incorporation of a rain cap and/or debris screen, an ejection port adaptor, an ejection slot sealing cap adaptor, and the use of a wide range of filter media. The range of media includes high-efficiency media for the removal of very small particles and superior durability and serviceability. Based on the type of filter used, various fan and motor combinations may be employed in the apparatus. The air filtration apparatus of this disclosure advantageously reduces the physical space required for installation at a given airflow output, reduces engine airflow restriction, and provides the ability for electronic filter identification and data storage inside the air filter, with an easy-to-service, disposable air filter cartridge that incorporates a debris catch tray to keep residual debris that is inside the separator chamber from entering the clean air outlet during filter cartridge servicing, and to improve the ejection of airborne debris from the pressurized separator chamber. The separator chamber of the disclosed embodiment is elongated and tapered in the direction along the axis from the inlet to the at least one ejector port (also called a debris ejection slot extension) and the clean air outlet located at the end of the separator chamber. By passing the air in a linear direction, the restriction within the air filtration apparatus is significantly reduced, allowing more of the positively pressurized airflow to be pushed out of the clean air outlet and into the engine or device to which the compact self-cleaning air filtration apparatus is installed. This linear directional airflow allows for a more compact design, thereby allowing for much higher airflow in applications with limited space. The air precleaning filtration apparatus is a versatile and compact self-cleaning air filtration device for use in limited-space applications having numerous needs for mounting configurations and ejection slot/port mounting orientations to provide clean air to ventilation systems, heat exchangers, heating, and air conditioning systems (HVAC), and other devices having a range of airflow demands, such as internal combustion engines. The disclosure according to a preferred embodiment represents an improvement to conventional air precleaner apparatuses and methods.

DETAILED DESCRIPTION OF EMBODIMENTS

Figure 1:
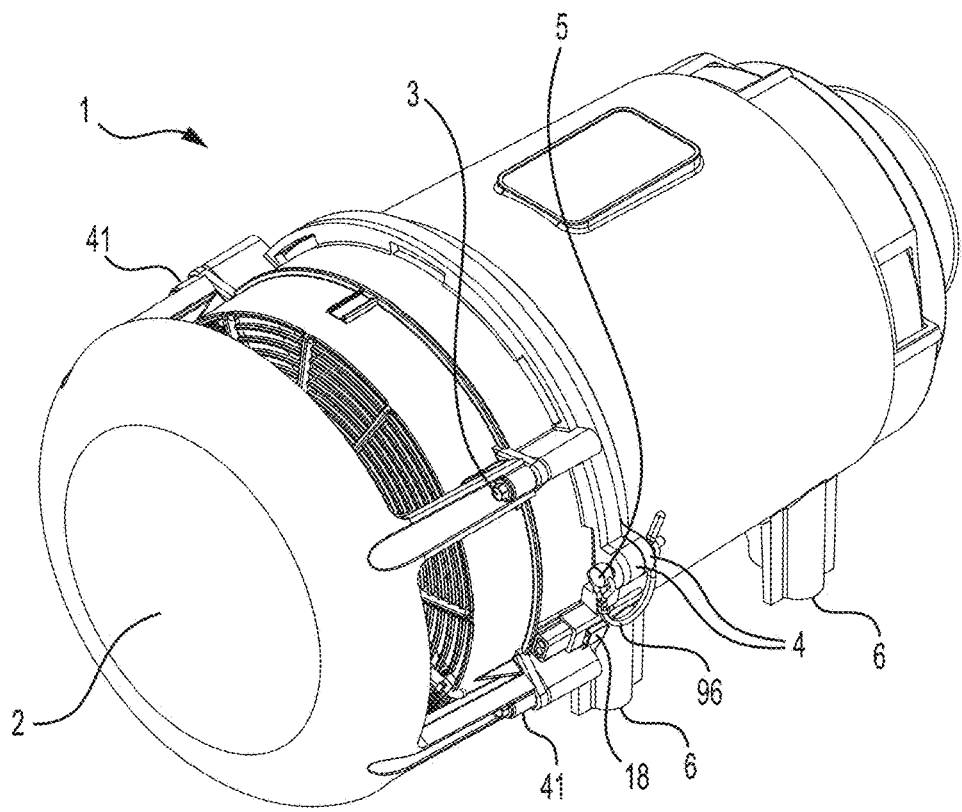
FIG. 1 is a perspective view of an exemplary air filtration apparatus.
Figure 2:
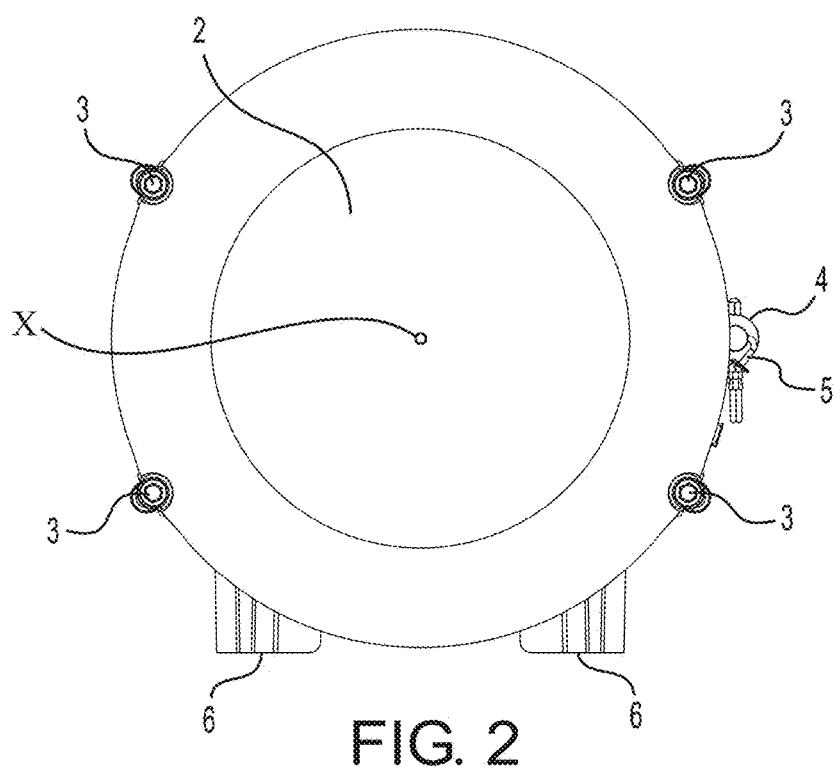
FIG. 2 is a view of the air filtration apparatus from the top of a rain cap of the air filtration apparatus.
Figure 4:
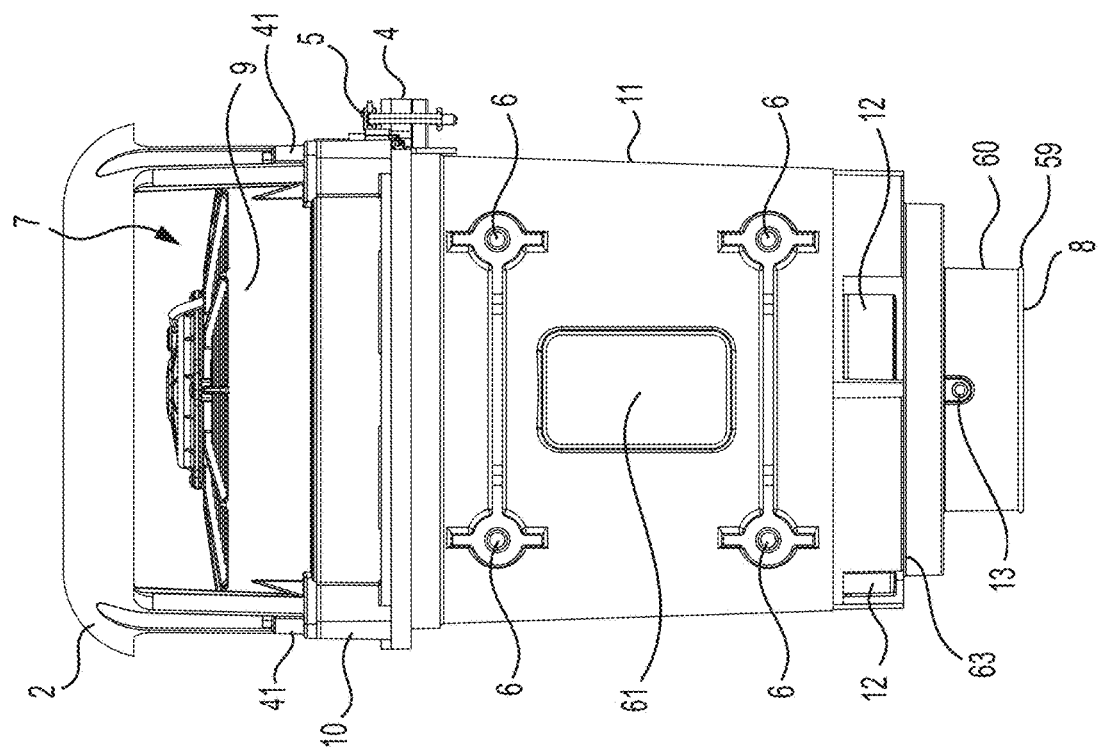
FIG. 4 is a side view of the air filtration apparatus including mounting feet showing the opposite side from FIG. 3.
Figure 3:
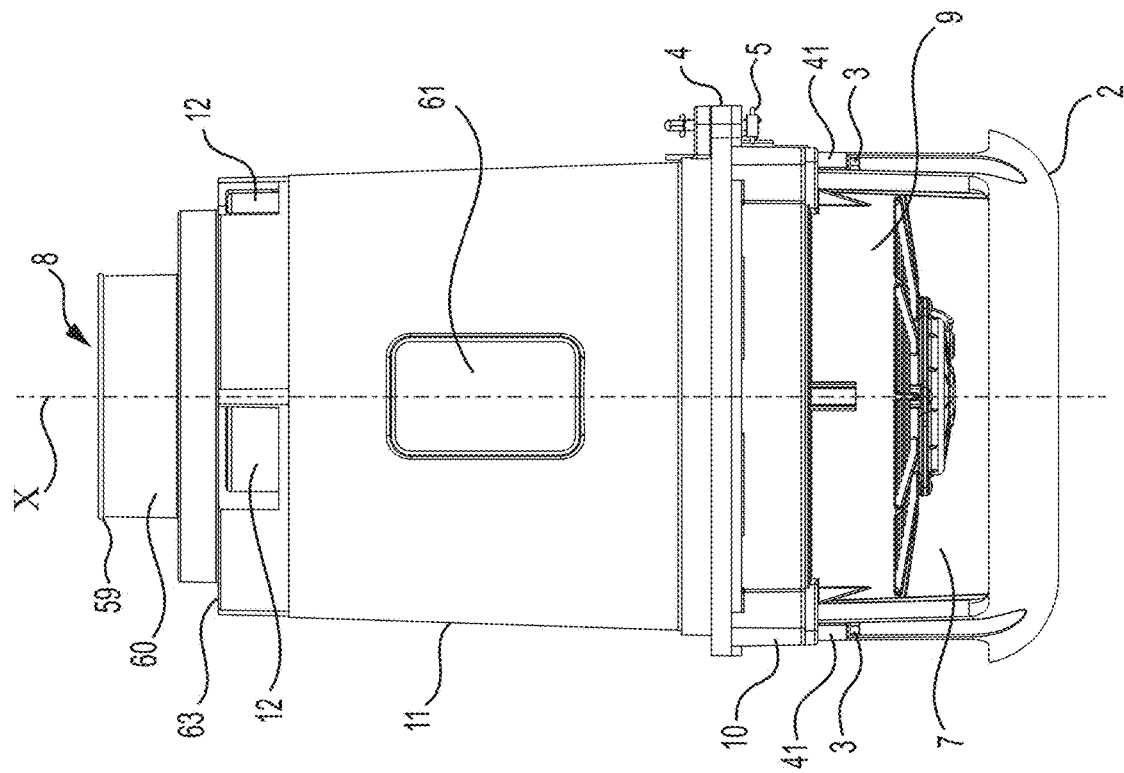
FIG. 3 is a side view of the air filtration apparatus.
Figure 5:
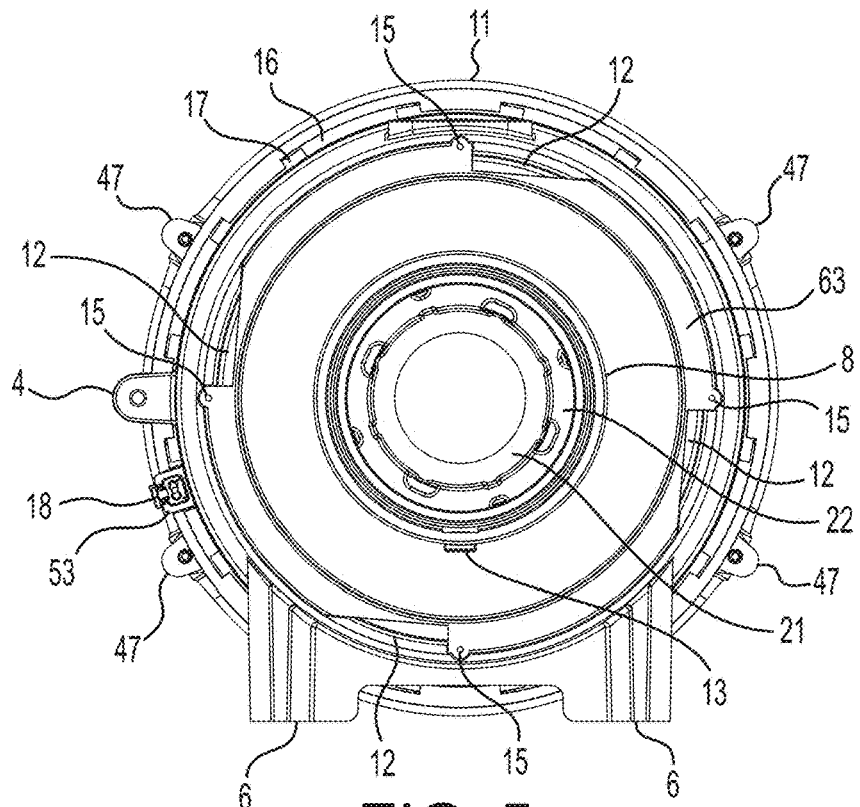
FIG. 5 is a view of the air filtration apparatus from the clean air outlet, showing the opposite side from FIG. 2.

Exemplary embodiments of a self-cleaning air filtration apparatus and method are described below in detail.

As shown in FIGS. 1 to 9, the self-cleaning air filtration apparatus 1 includes a detachable airflow powerhead assembly 109 having a rain cap 2, a motor/fan assembly 9, and a vane (louver) assembly 10. The air filtration apparatus 1 also includes an outer filter assembly 20, an optional inner filter assembly 19, and a tapered separator chamber housing 11. The separator chamber housing 11 is disposed downstream of the airflow powerhead assembly 109 relative to a direction of airflow in the air filtration apparatus 1 during use. These components of the air filtration apparatus 1 are assembled together such that a longitudinal axis X extends through the center of each component.

(1) Airflow Powerhead Assembly

Figure 6A:
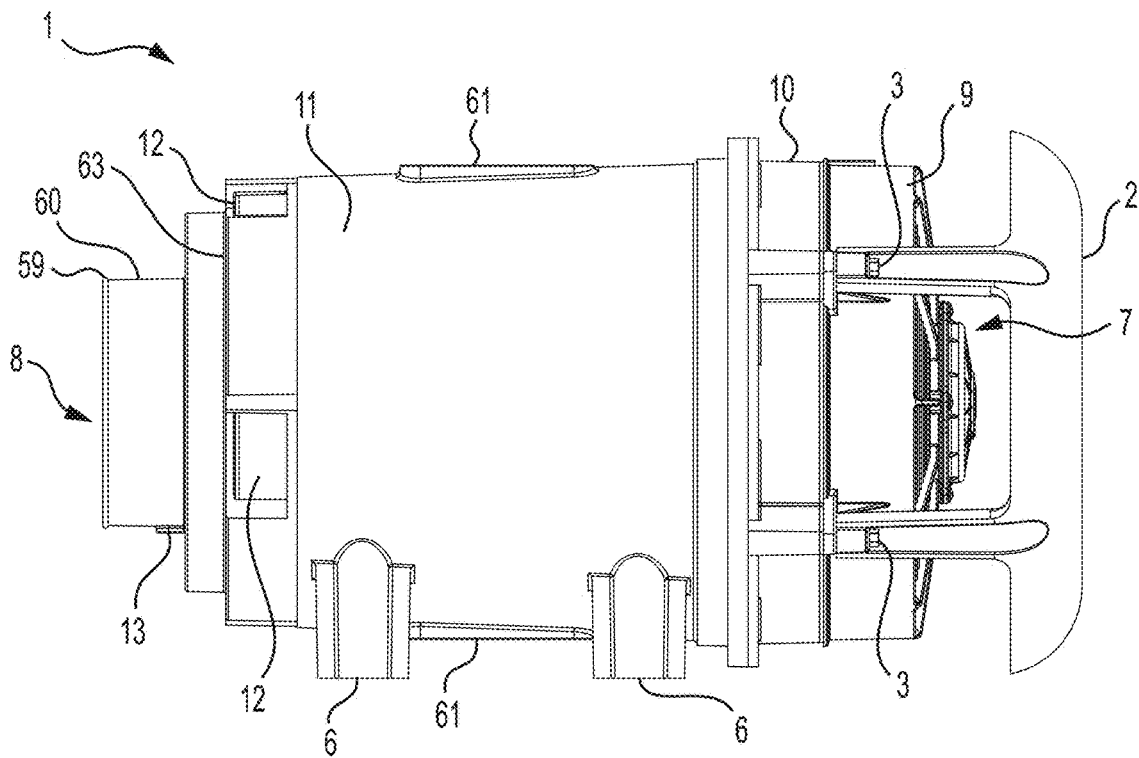
FIG. 6A is a side view of the air filtration apparatus.
Figure 6C:
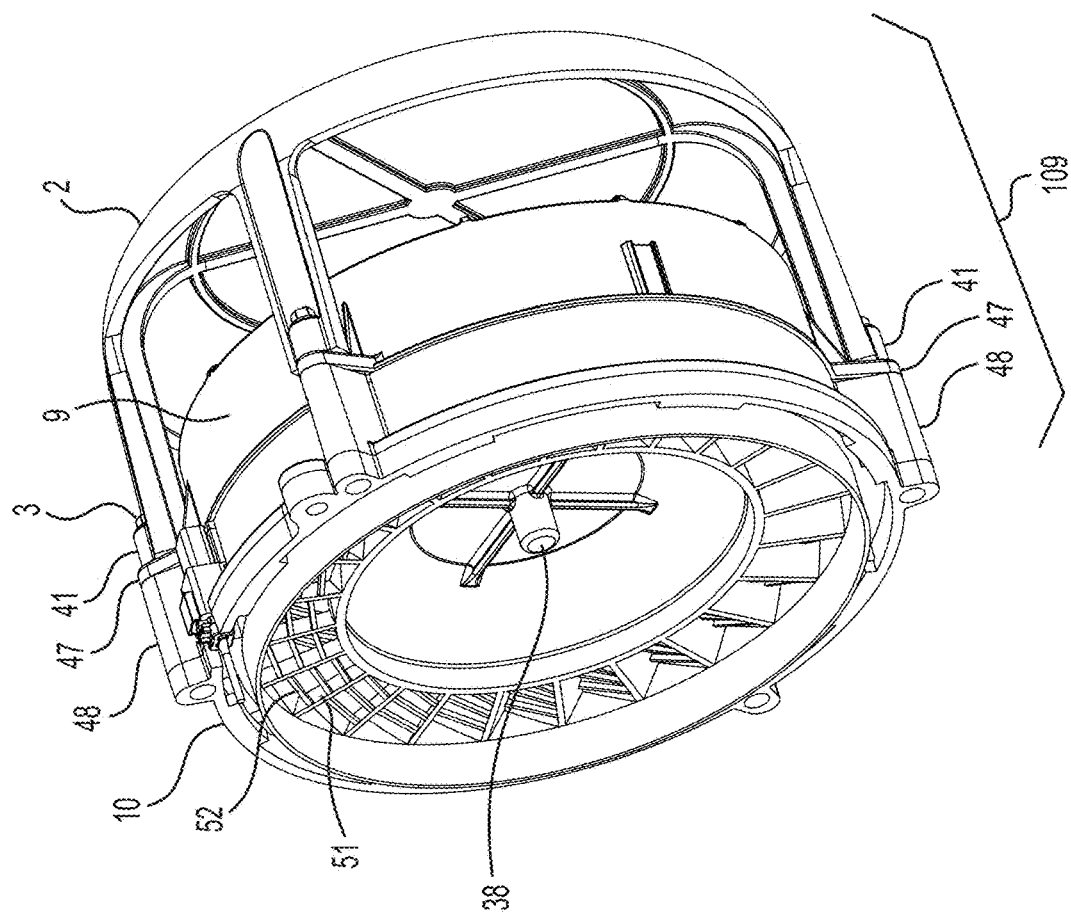
FIG. 6C is a perspective view of the airflow powerhead assembly.
Figure 6B:
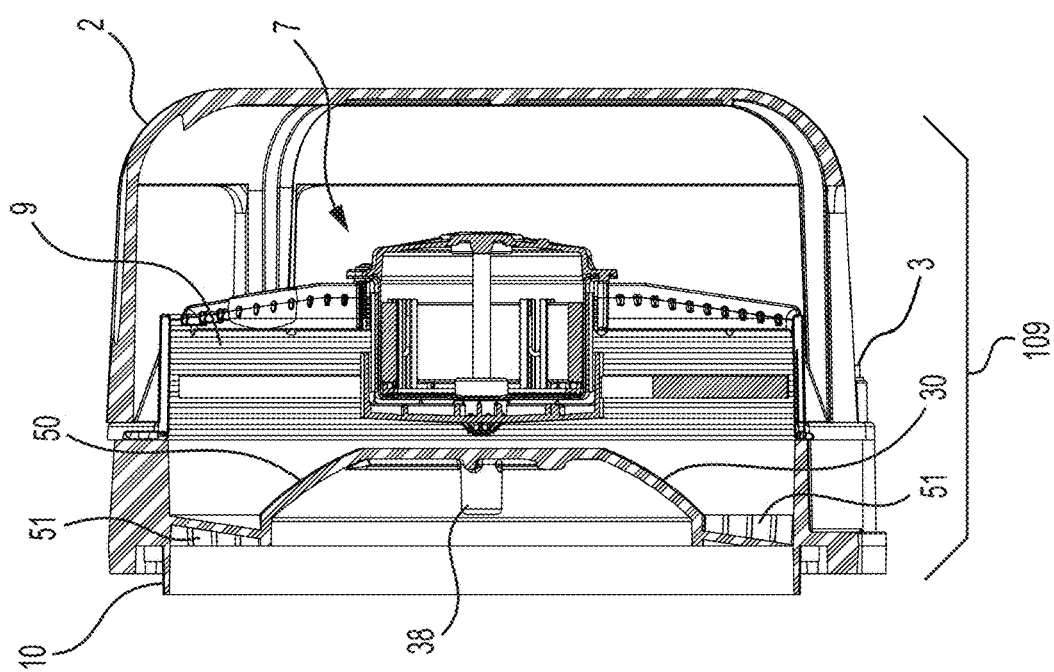
FIG. 6B is a cross-sectional view of the airflow powerhead assembly with an optional rain cap.

The airflow powerhead assembly 109 is configured to be held together by fasteners 3. More specifically, the fasteners 3 are inserted into receiving bosses 41 of the rain cap 2, receiving bosses 47 of the motor/fan assembly 9, and receiving bosses 48 of the vane assembly 10. The fasteners 3 may be, for example, metal bolts, rivets or other such attachment members. In the present embodiment, the airflow powerhead assembly 109 is shown as having four fasteners 3, and four each of corresponding receiving bosses 41, 47 and 48. However, the number of fasteners and receiving bosses is not limited to four and may be more or less than four. FIGS. 6B and 6C show the airflow powerhead assembly 109 in the assembled state, with the rain cap 2, motor/fan assembly 9, and vane assembly 10 fixed together.

Figure 10:
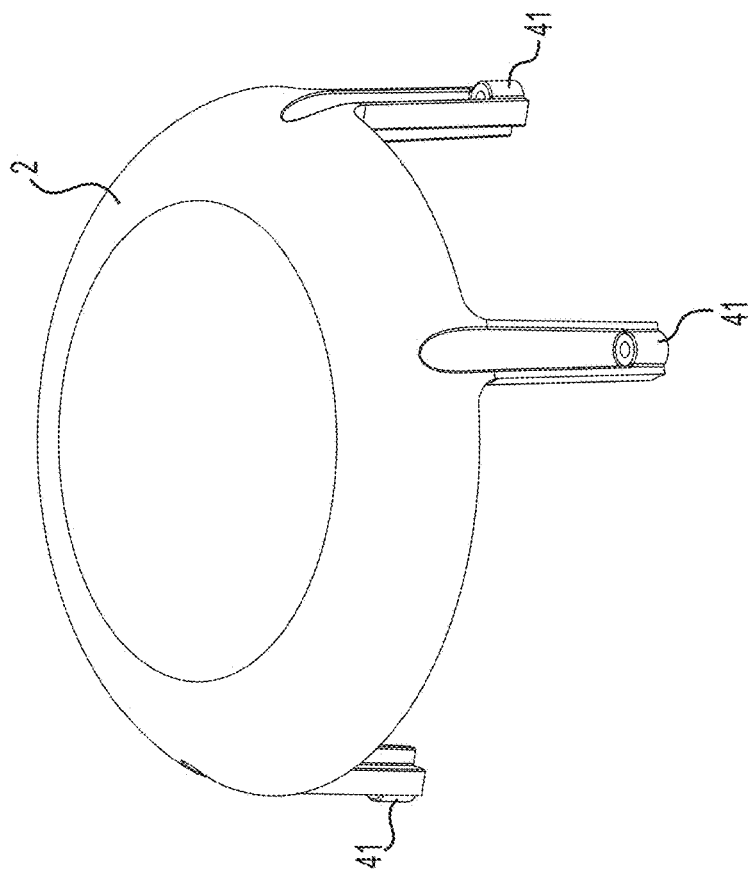
FIG. 10 is a perspective view of a rain cap of the air filtration apparatus.
Figure 12:
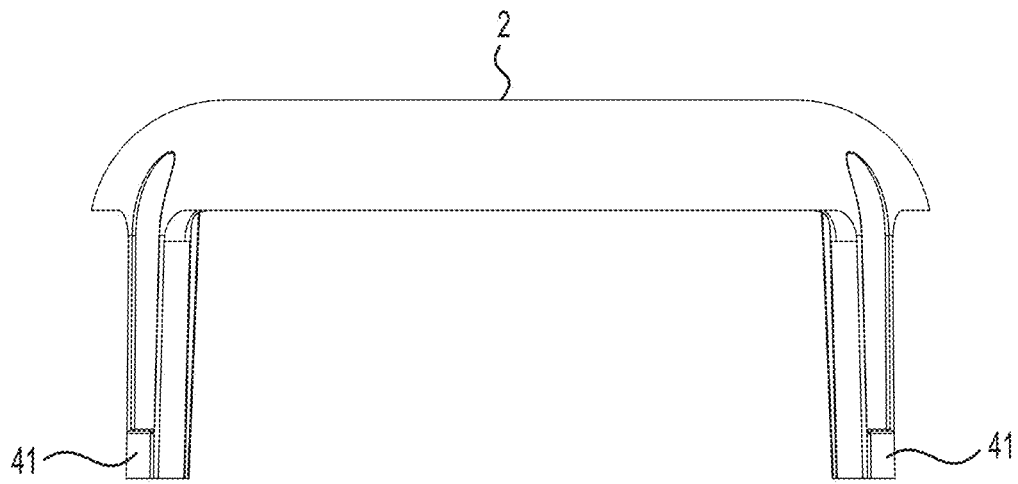
FIG. 12 is a side view of the rain cap.
Figure 13:
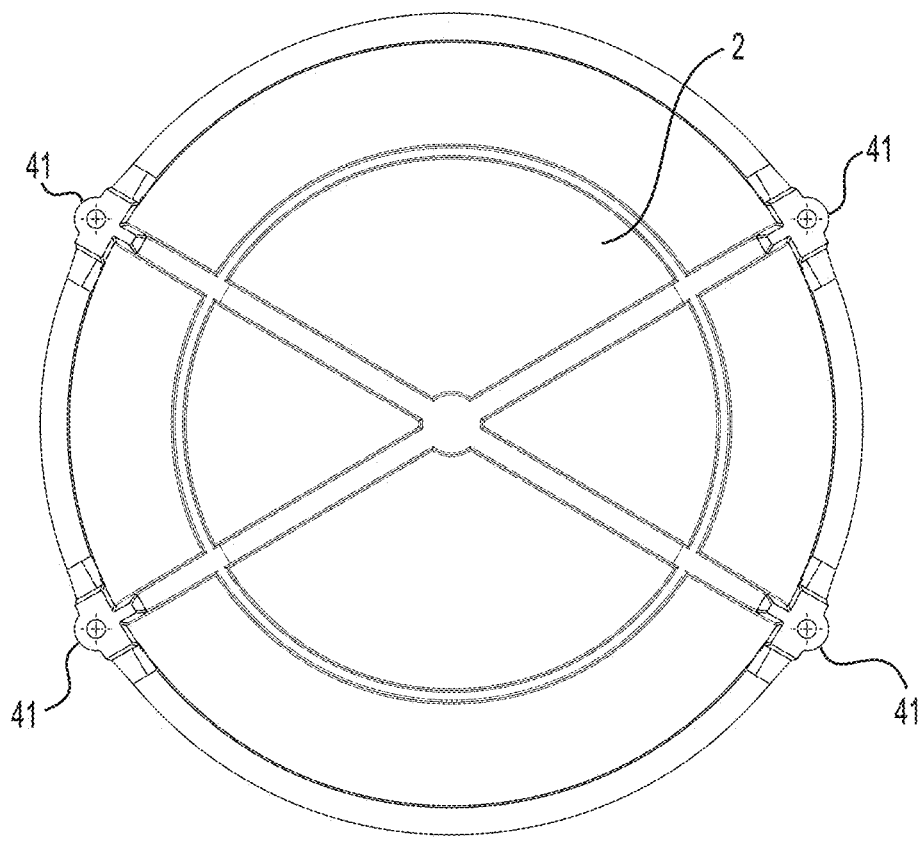
FIG. 13 is a plan view of the underside of the rain cap.
Figure 14:
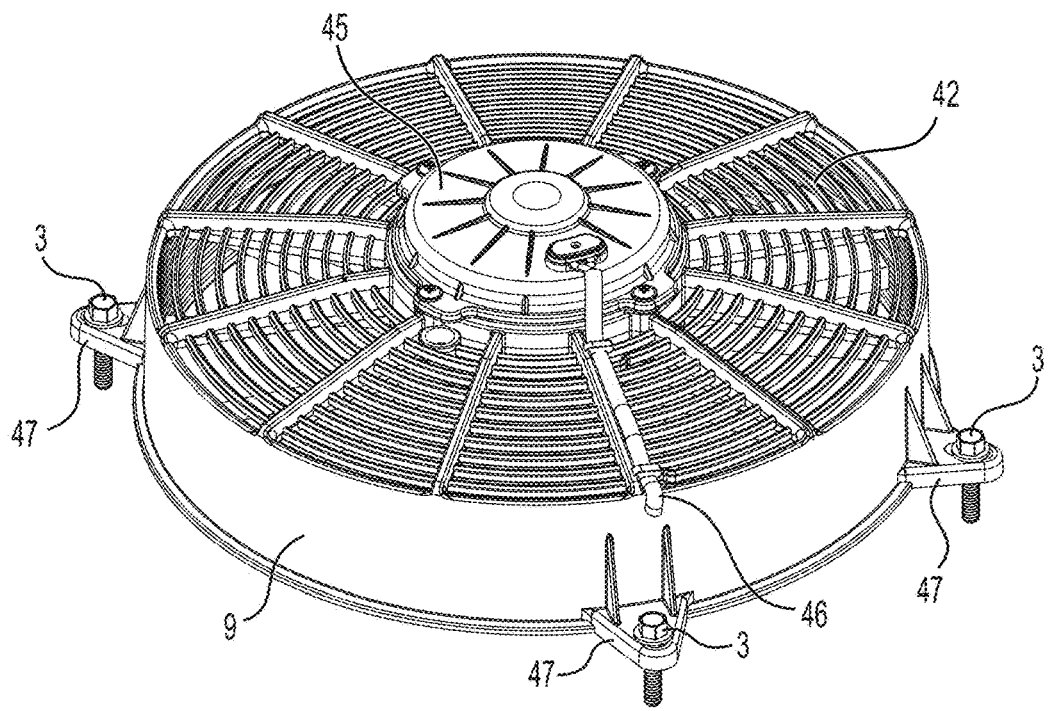
FIG. 14 is a perspective view of a motor/fan assembly of the air filtration apparatus having a debris guard member.
Figure 15:
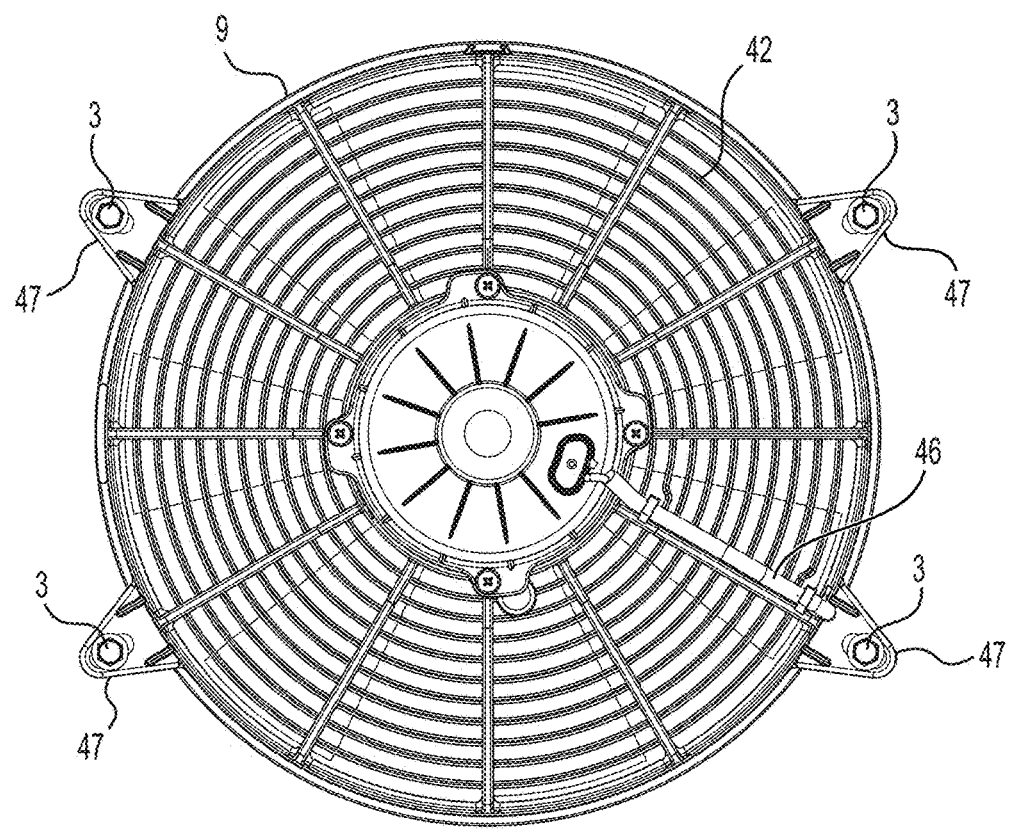
FIG. 15 is a plan view of the dirty air inlet of the motor/fan assembly.
Figure 16:
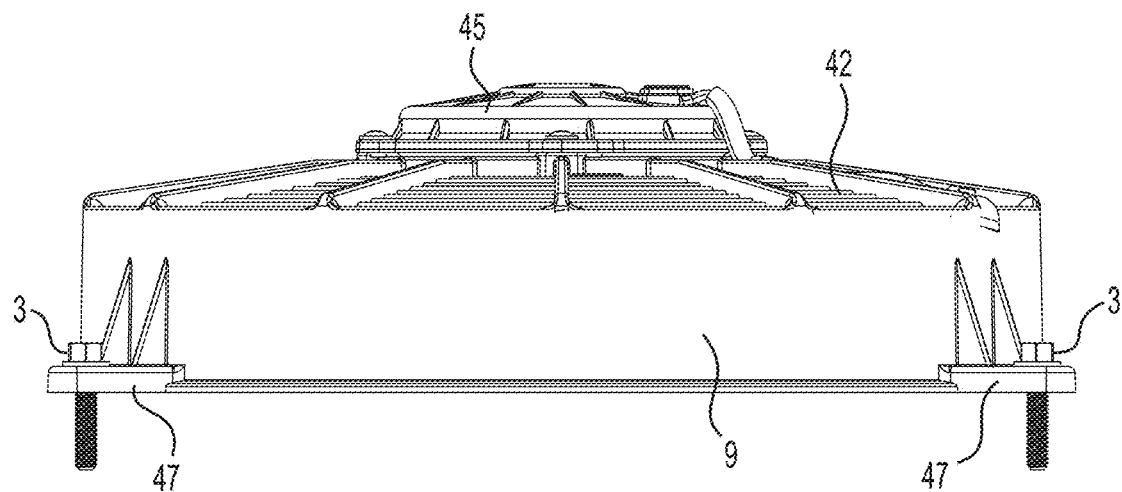
FIG. 16 is a side view of the motor/fan assembly.
Figure 17:
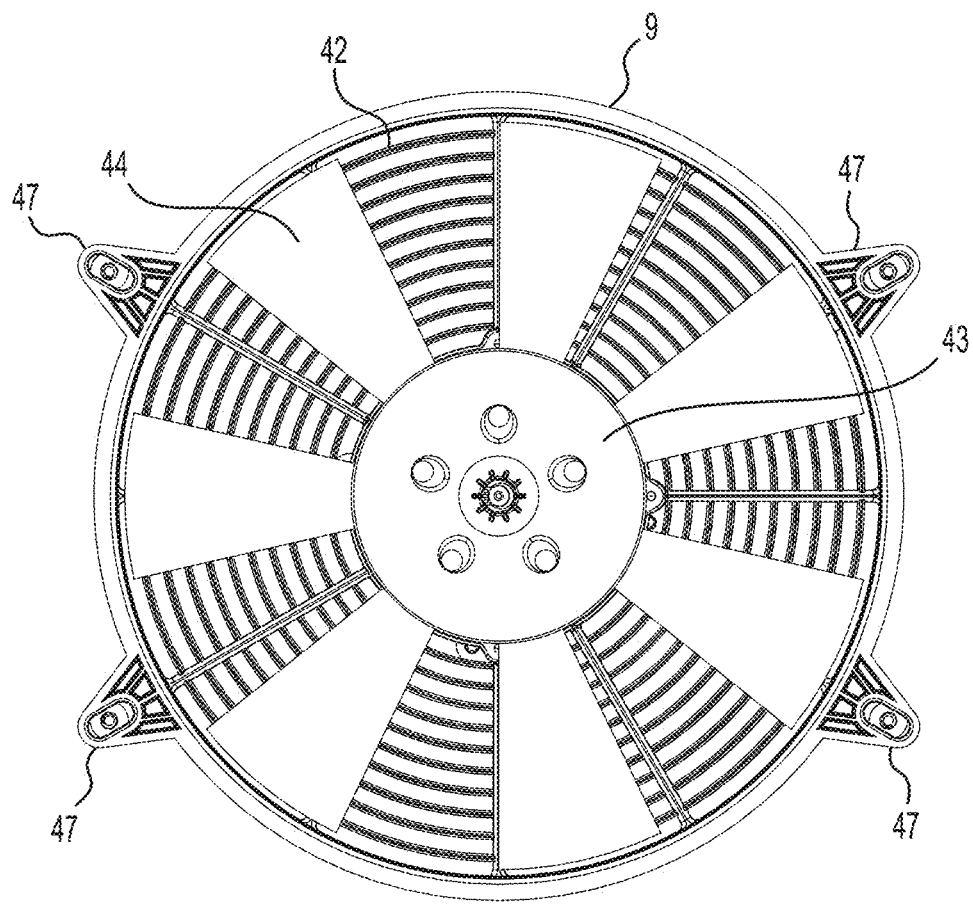
FIG. 17 is a plan view of the dirty air outlet side of the motor/fan assembly.

As seen in FIGS. 10 and 12, the rain cap 2 is formed of a round, tapered head and a plurality of mounting feet (four in the present embodiment) extending from the head in a direction parallel to an axial direction of the air filtration apparatus 1 defined by the longitudinal axis X. The tapered head is a convex plate member that protrudes outward in a first axial direction (i.e., the direction away from the remaining components of the air filtration apparatus 1) which is opposite to a second axial direction. The inner surface of the tapered head has a cross-member extending between the four receiving bosses 41 for structural support. The rain cap 2 is further provided with the receiving bosses 41 for receiving the fasteners 3. The rain cap 2 may be made of, for example, polymer composite resin.

As seen in FIGS. 14 to 17, the motor/fan assembly 9 includes a fan assembly 43. The fan assembly 43 includes a debris guard member 42, fan blades 44, a fan motor 45, electrical wiring 46, and the receiving bosses 47. The debris guard member 42 is made of, for example, polymer composite resin and includes a plurality of circumferentially extending guard beams partitioned by radially extending partition beams. The debris guard member 42 functions to prevent debris that could damage the fan assembly 43 from entering into the fan assembly 43, and also to prevent a user's hands/fingers from entering the fan assembly 43.

The fan motor 45 is provided at the center of the fan assembly 43 and is powered by the electrical wiring 46. The electrical wiring 46 is connected to a power source, such as a battery not shown in the figures, by way of electrical connector 18 described below. The fan motor 45 is configured to drive the fan blades 44 using the power supplied through the electrical wiring 46. The fan motor 45 may be made of, for example, metal and/or polymer composite resin. The fan motor 45 as shown is electrical and can be a brushed or a brushless motor. Advantageously, the air filtration apparatus 1 is comprised of a relatively compact fan motor 45 and fan assembly 43, helping to reduce the physical size of the apparatus, and the location of the fan motor 45 on the dirty side of the airflow to cool the motor ensures extended motor life compared to conventional apparatuses. Other motor and fan configurations, such as one including a hydraulic motor, could also be used.

The fan blades 44 are provided on the inner side (second axial side) of the motor/fan assembly 9. In the present embodiment, seven fan blades 44 are provided, but the fan blades 44 are not limited to this number and there may be more or less than seven fan blades 44 provided to the motor/fan assembly 9. The fan blades 44 are spaced from each other in the circumferential direction and are arranged to rotate when driven by the fan motor 45. The fan blades 44 may be made of, for example, polymer composite resin.

As seen in FIGS. 18 to 23, the vane assembly 10 includes a tapered airflow diverter 50 at the center of the vane assembly 10, and a plurality of vanes 51 extending radially outward from the airflow diverter 50 to a circumferential wall 24 (see FIG. 7) of the vane assembly 10. The airflow diverter 50 is a convex plate member that protrudes outward in the first axial direction (i.e., the direction away from the vanes 51). The airflow diverter 50 is positioned at the center of the vane assembly 10 and on the incoming air side, facing the back of the fan blades 44 which direct the airflow into the vanes 51. The circumferential wall 24 includes a mounting surface 49 (see FIG. 18) on which the motor/fan assembly 9 is mounted. The circumferential wall 24 additionally has a radially outer surface from which the receiving bosses 48 extend radially outward. On the opposite, second axial side of the vane assembly 10, a mounting surface 55 is provided for mounting the vane assembly 10 to the separator chamber housing 11 as discussed below. The vane assembly 10 further includes an indentation (recess) 53 in which is provided an electrical connector mounting groove 56 configured to receive electrical connector 18, described below.

Each of the vanes 51 has first and second oppositely facing surfaces which are angled relative to the longitudinal axis X. The plurality of vanes 51 are arranged and spaced from each other in the circumferential direction. A plurality of guard members 52 is provided between adjacent pairs of the vanes 51 as a safety measure to prevent, for example, a user's finger from passing through the vane assembly 10. In the present embodiment, three guard members 52 extend between each adjacent pair of vanes 51, but the number of guard members 52 may be more or less than three. The guard members 52 extend circumferentially between the vanes 51. All of the components of the vane assembly 10 may be made of, for example, metal and/or polymer composite resin.

Figure 18:
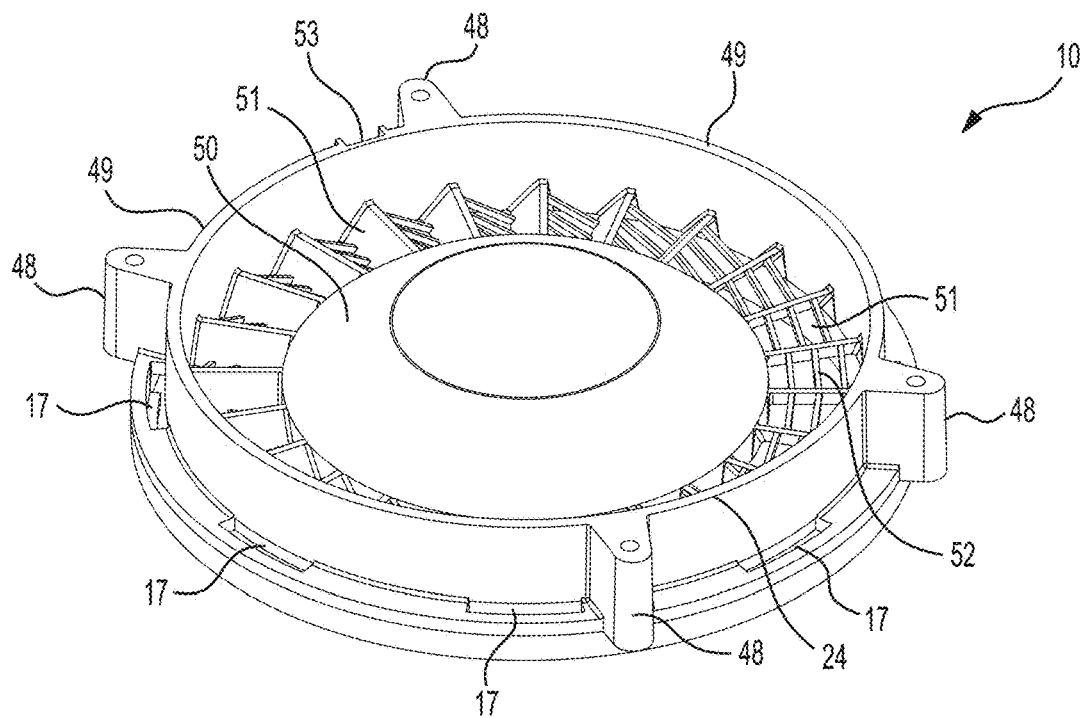
FIG. 18 is a perspective view of the dirty air inlet side of a vane assembly of the air filtration apparatus.
Figure 19:
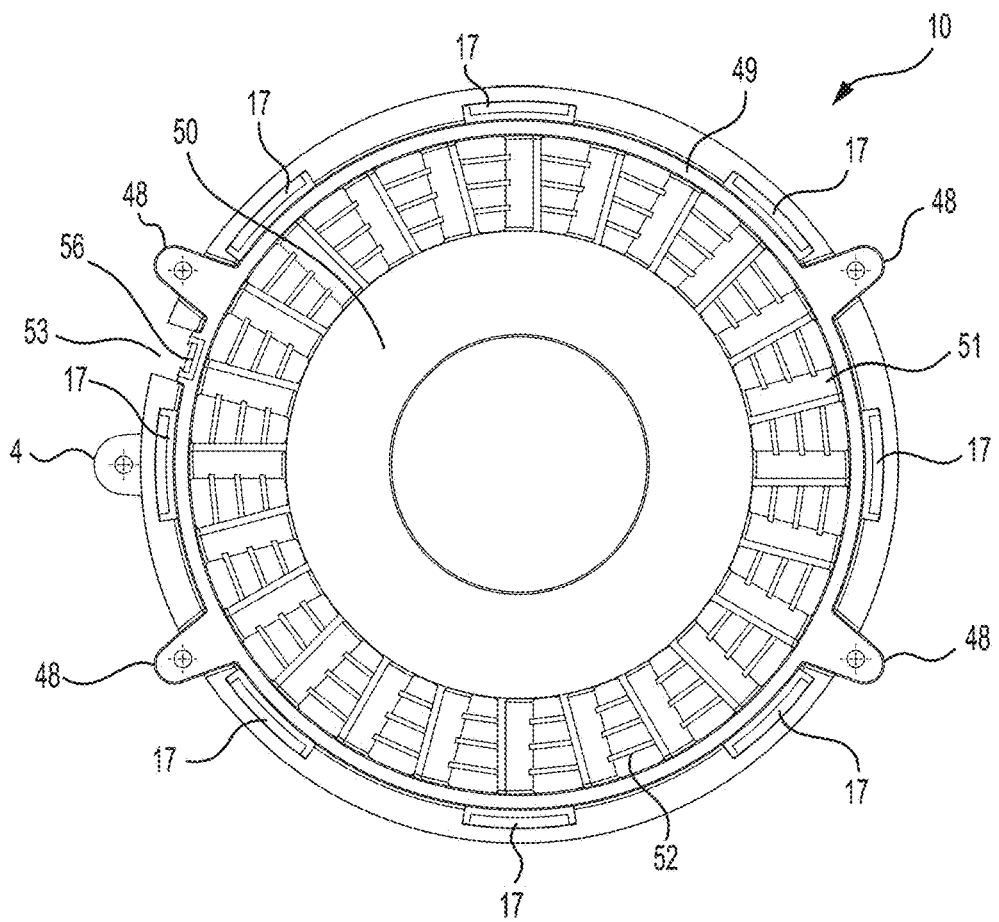
FIG. 19 is a plan view of the dirty air inlet side of the vane assembly.
Figure 20:
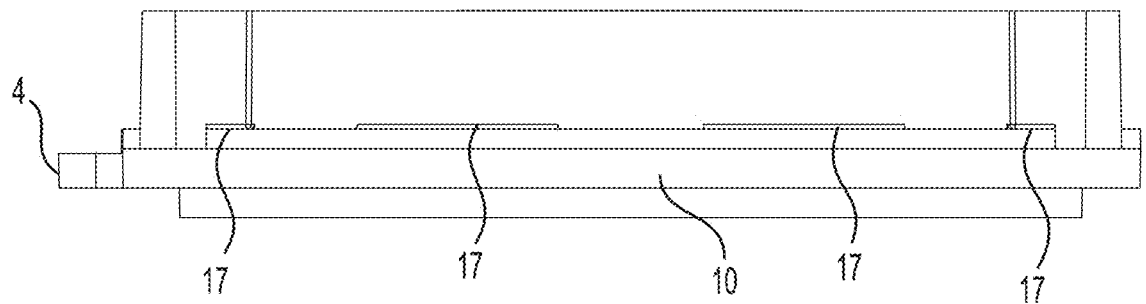
FIG. 20 is a side view of the vane assembly.
Figure 21:
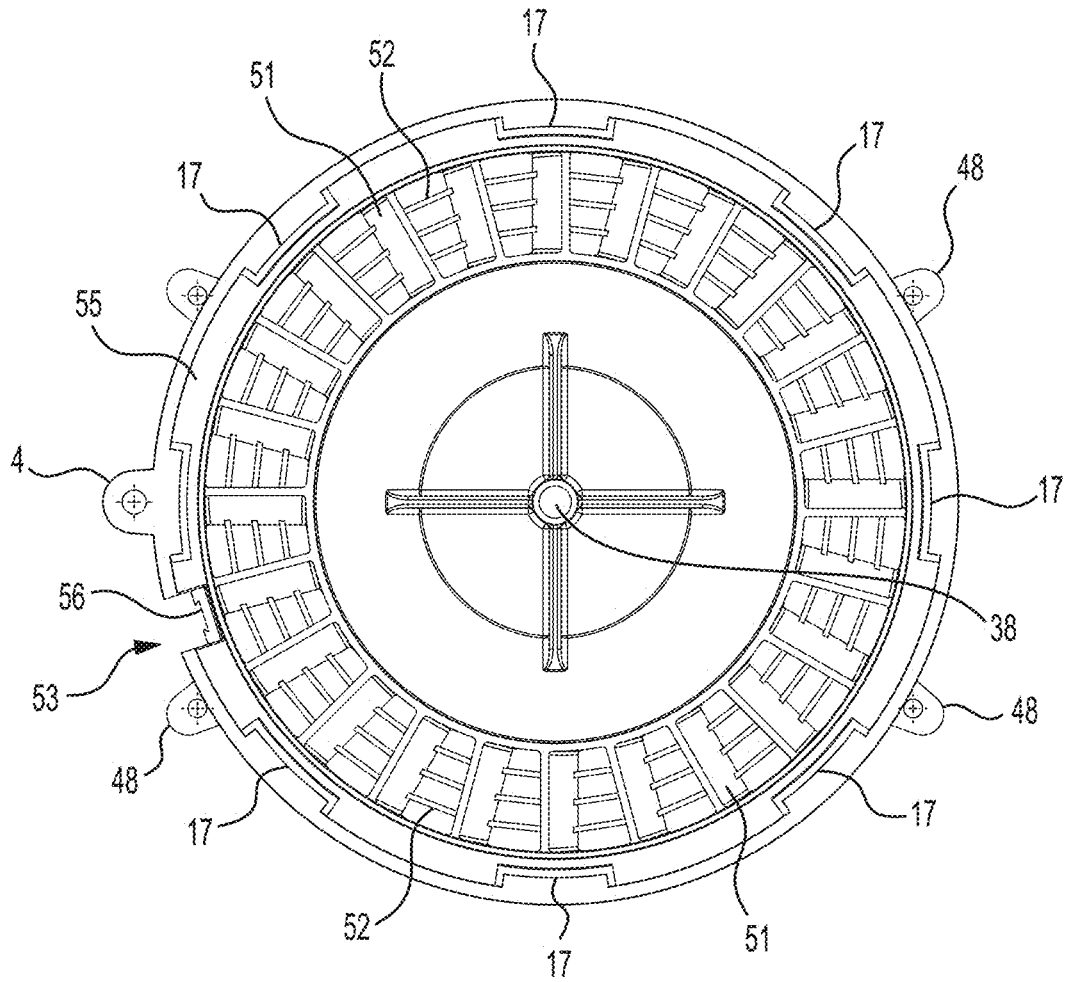
FIG. 21 is a plan view of the dirty air outlet side of the vane assembly.
Figure 22:
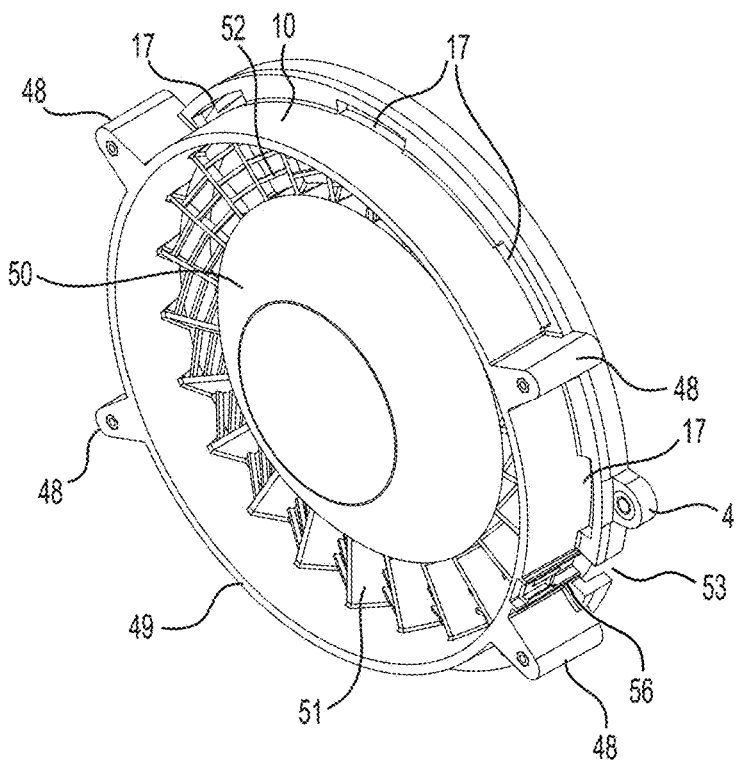
FIG. 22 is another perspective view of the dirty air inlet side of the vane assembly.

The vane assembly 10 is further provided with a plurality of locking slots 17, along the mounting surface 55, arranged to receive mounting tabs 16 of the separator chamber housing 11 as discussed below. The locking slots 17 are arranged and spaced from each other in the circumferential direction. Each locking slot 17 is longer in the circumferential direction than in the radial direction. As seen in FIGS. 18 and 22, each locking slot 17 is open in the first and second axial directions in order to receive a respective mounting tab 16. After the mounting tabs 16 are inserted into the locking slots 17, the vane assembly 10 (or the entire airflow powerhead assembly 109) is rotated relative to the separator chamber housing 11 to securely assemble the air filtration apparatus 1.

The inner surface of the airflow diverter 50 is further provided with an alignment pin 38. The alignment pin 38 is made of, for example, polymer composite resin and is provided to align the airflow powerhead assembly 109 with the outer filter assembly 20, as described below.

Figure 23:
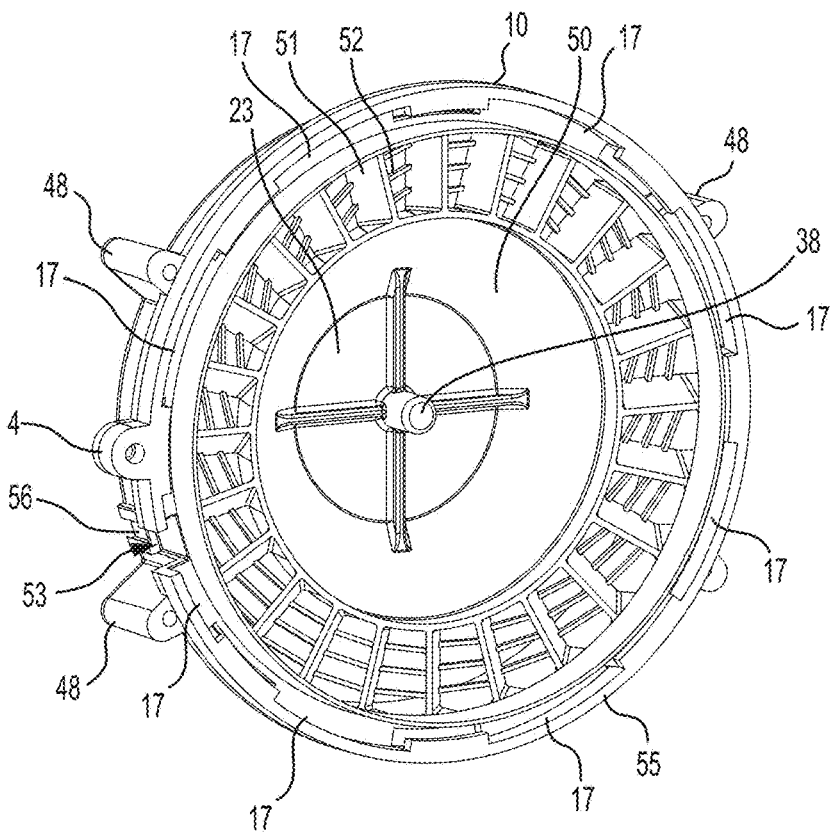
FIG. 23 is a perspective view of the dirty air outlet side of the vane assembly.
Figure 24:
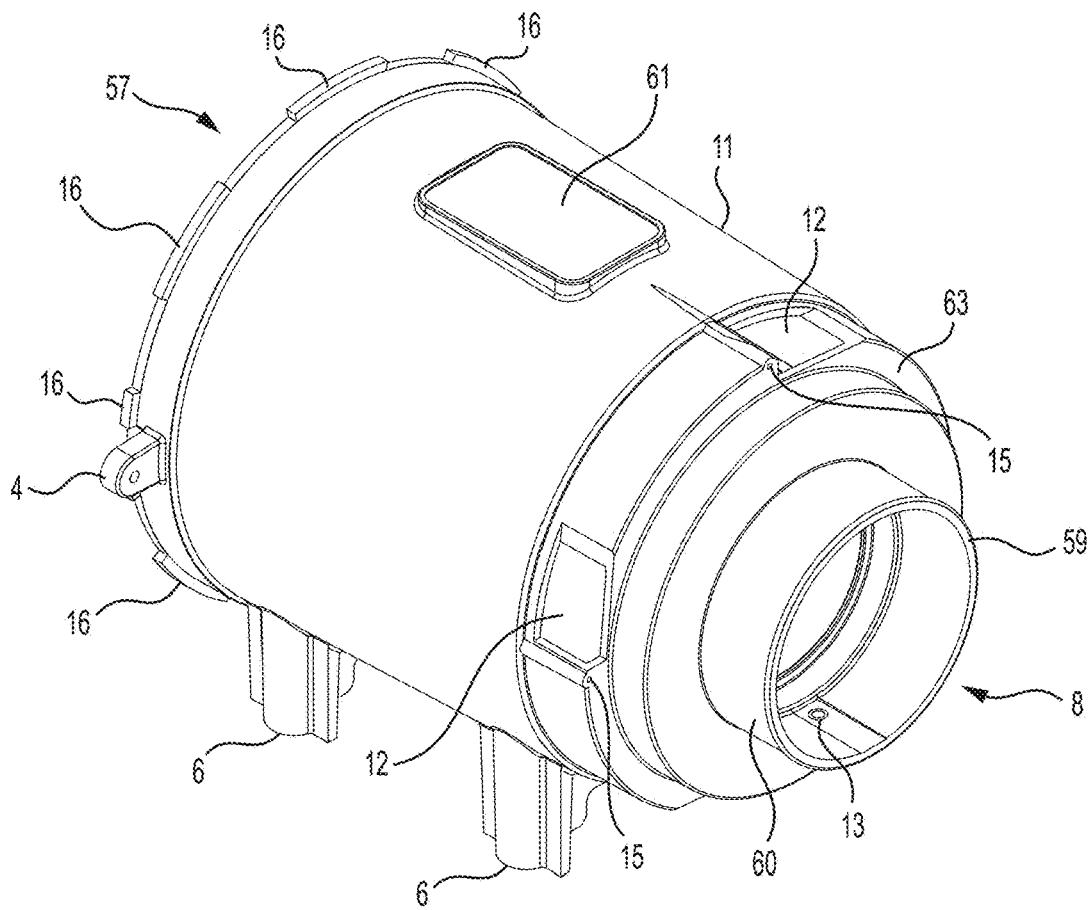
FIG. 24 is a perspective view of a separator chamber housing of the air filtration apparatus having a clean air outlet.
Figure 51:
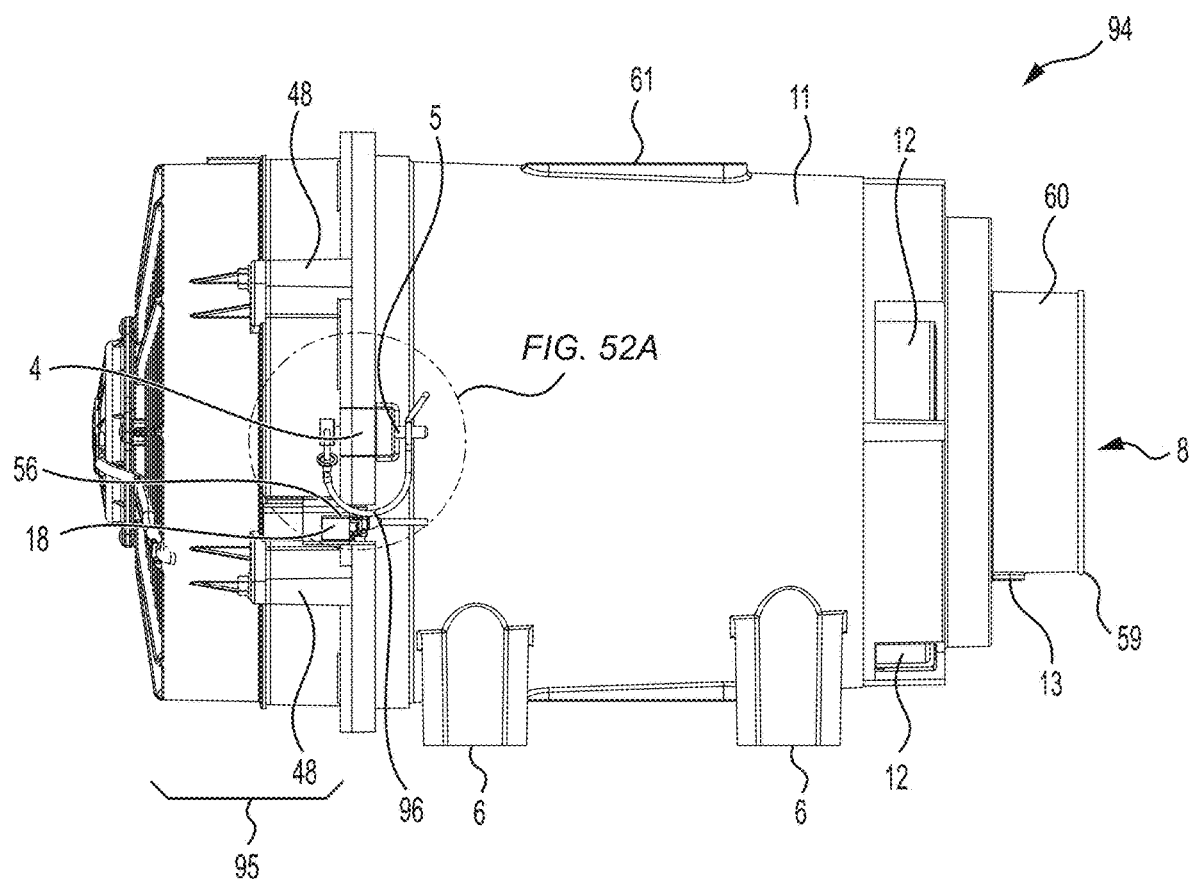
FIG. 51 is a side view of the air filtration apparatus showing a locking pin assembly.
Figure 52A:
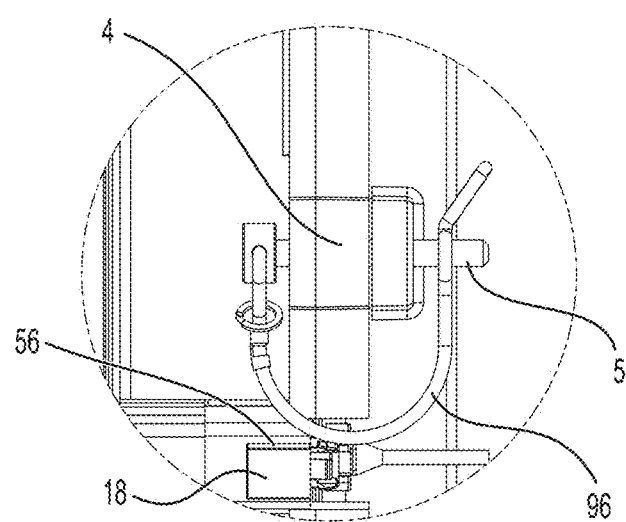
FIG. 52A is an enlarged view of the portion encircled in FIG. 51 and marked "FIG. 52A."
Figure 52B:
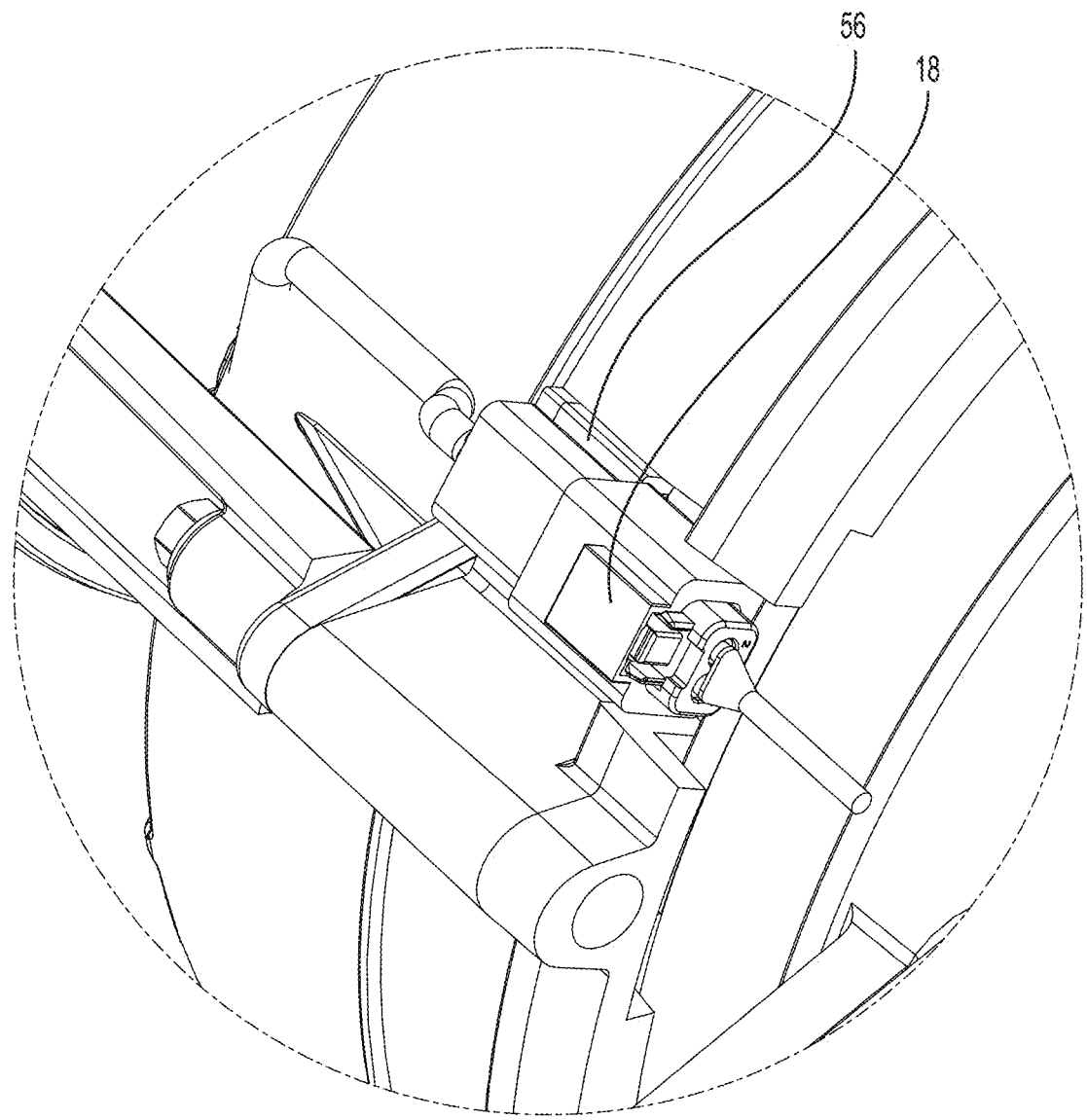
FIG. 52B is an enlarged perspective view of an electrical connector of the air filtration apparatus.

As seen in FIGS. 1 to 3 and 51 to 54, the airflow powerhead assembly 109 (the rain cap 2, the motor/fan assembly 9, and the vane (louver) assembly 10) is configured to be mounted to the separator chamber housing 11 via a locking pin assembly 97. The locking pin assembly 97 is made of, for example, metal and/or polymer composite resin and includes first and second locking pin bosses 4, a locking pin 5, and a locking pin retainer 96. As seen in FIGS. 1, 22 and 23, the first locking pin boss 4 is provided on the outer circumferential edge of the vane assembly 10. As seen in FIGS. 1 and 24, the second locking pin boss 4 is provided on the outer circumferential edge of the first axial end of the separator chamber housing 11. When assembled, the first locking pin boss 4 and the second locking pin boss 4 are aligned such that the locking pin 5 passes through both the first locking pin boss 4 and the second locking pin boss 4. As seen in FIGS. 1, 51 and 52A, the locking pin retainer 96 is a flexible member that is arranged to retain the locking pin 5 in the assembled state. For example, the locking pin retainer 96 may have a rigidity that is less than the rigidity of the locking pin 5. A first end of the locking pin retainer 96 is fixed to a head of the locking pin 5 by passing through an opening in the head. A second, opposite end of the locking pin retainer 96 has an opening configured to receive the opposite end of the locking pin 5, thereby preventing the locking pin 5 from inadvertently being removed from the first locking pin boss 4 and the second locking pin boss 4.

As seen in FIGS. 1, 51, 52A and 52B, the air filtration apparatus 1 is provided with an electrical connector 18 that is disposed within the mounting groove 56 of the vane assembly 10. The electrical connector 18 is an adaptor configured to connect the electrical wiring 46 to the power source. The air filtration apparatus 1 includes a safety feature that prevents removal of the airflow powerhead assembly 109 from the separator chamber housing 11 without first removing the electrical connector 18. Specifically, the electrical connector 18 prevents rotation of the airflow powerhead assembly 109 relative to the separator chamber housing 11 and thus prevents the mounting tabs 16 (described below) from being removed from the locking slots 17 (discussed below). Accordingly, the male and female portions of the electrical connector 18 must be disconnected from each other in order for the airflow powerhead assembly 109 to be removed from the separator chamber housing 11.

(2) Separator Chamber Housing

As seen in FIGS. 24 to 28, the separator chamber housing 11 is shaped so as to taper in the second axial direction (i.e., toward the clean air outlet 8). In other words, the diameter of the separator chamber housing 11 gradually decreases from the first axial end (at an airflow inlet 57) to the second axial end (at a clean air outlet 8). The separator chamber housing 11 is provided with the mounting tabs 16 discussed above. The plurality of mounting tabs 16 are arranged and spaced from each other in the circumferential direction. Each mounting tab 16 is longer in the circumferential direction than in the radial direction. Each mounting tab 16 is received in a respective locking slot 17 of the vane assembly 10, as described above, and then rotated until the first and second locking pin bosses 4 are aligned for insertion of the locking pin 5, to secure the airflow powerhead assembly 109 to the separator chamber housing 11. Together with the locking pin assembly 97, the coupling of the mounting tabs 16 with the locking slots 17 ensures a secure assembly of the airflow powerhead assembly 109 to the separator chamber housing 11. Also, as discussed above, once the electrical connector 18 (male and female parts) is connected to provide power, the airflow powerhead assembly 109 cannot be removed from the separator chamber housing 11 (i.e., the mounting tabs 16 cannot be removed from the locking slots 17) without first disconnecting the electrical connector 18.

Figure 8:
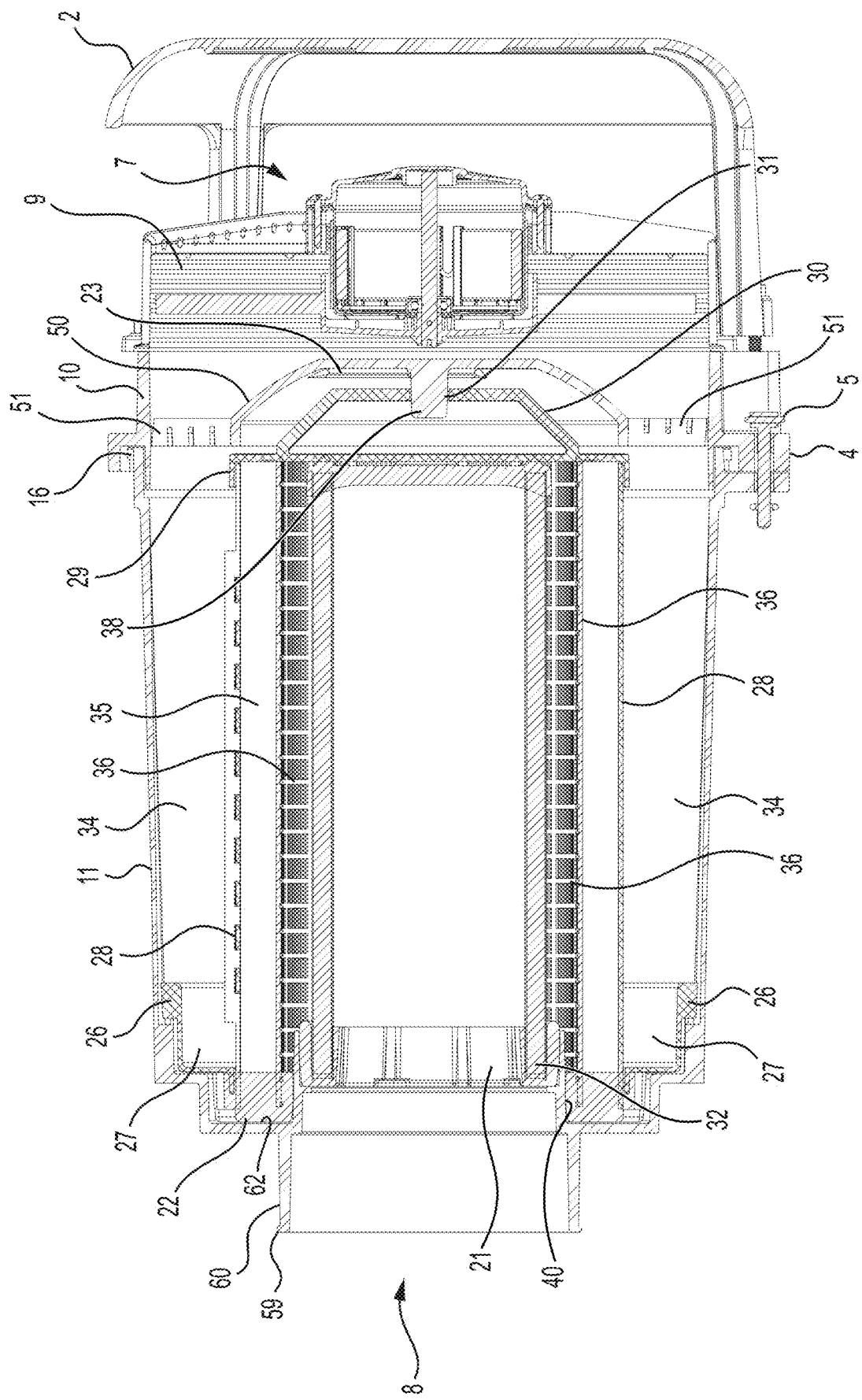
FIG. 8 is a cross-sectional view of the air filtration apparatus.
Figure 25:
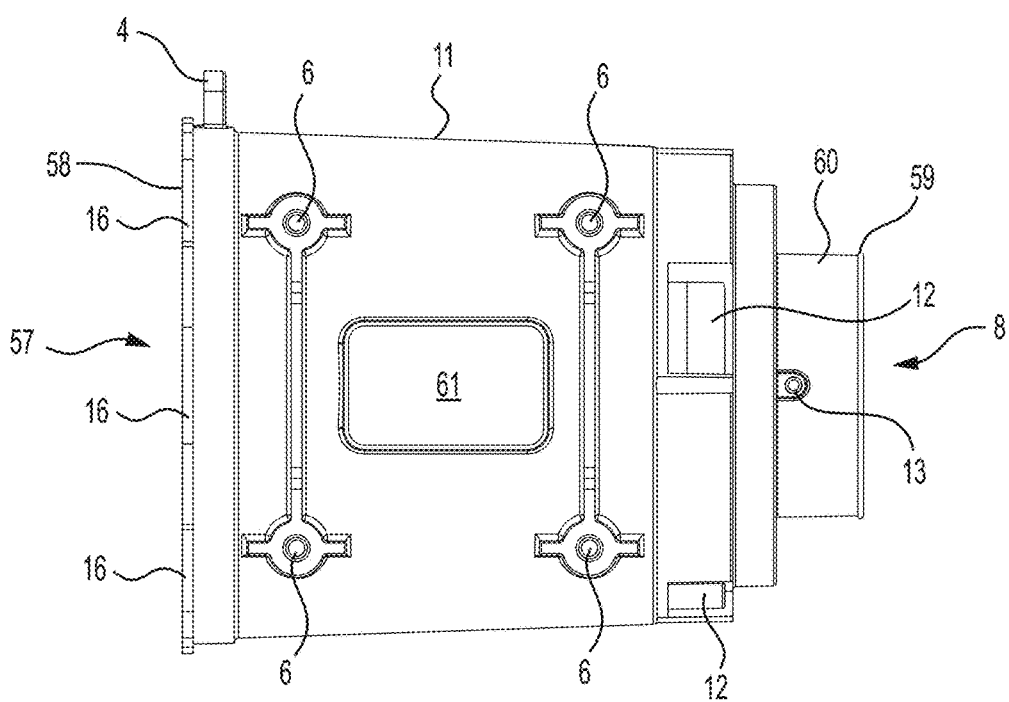
FIG. 25 is a side view of the separator chamber housing showing the mounting feet.
Figure 26:
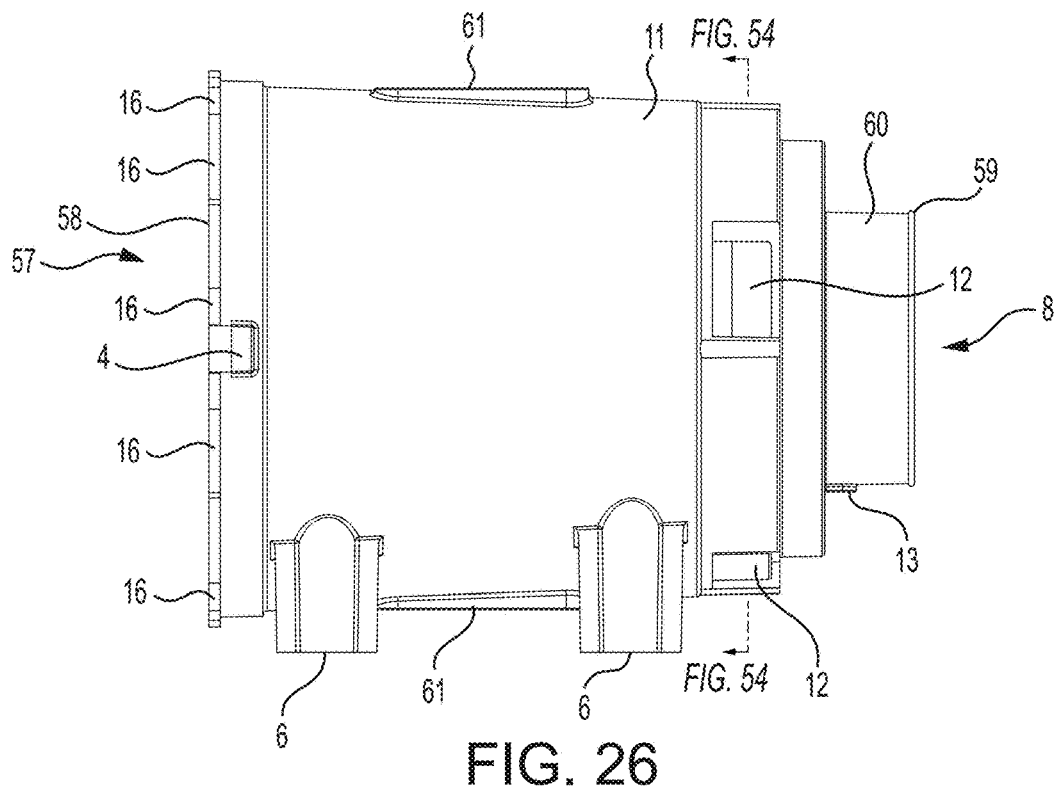
FIG. 26 is a side view of the separator chamber housing.

The separator chamber housing 11 has an airflow inlet 57 on the first axial side and a clean air outlet 8 on the opposite, second axial side, as seen in FIGS. 24 and 25. As shown in FIG. 8, the separator chamber housing 11 has a debris separator chamber 34 disposed axially between the airflow inlet 57 and the clean air outlet 8. The airflow inlet 57 is larger in diameter than the clean air outlet 8. The separator chamber housing 11 may be made of, for example, metal and/or polymer composite resin. In use, driving of the motor/fan assembly 9 causes debris-laden air to be pushed through the vane assembly 10, which creates a centripetally spinning airflow which is then pushed into the airflow inlet 57 and into the separator chamber housing 11. In the separator chamber housing 11, debris is pushed under airflow pressure radially outward to spin along the inner wall of the separator chamber housing 11. The debris-laden airflow maintains speed and energy while rotating due to the tapered structure of the separator chamber housing 11 because the tapered structure reduces the area inside the separator chamber housing 11, thereby collapsing the space and the debris-laden airflow until the debris passes through debris ejection slot extensions 12 (discussed below) to exit the air filtration apparatus 1, while the remaining air passes through the outer filter assembly 20 under the centripetal force, is filtered, and exits as clean air through the clean air outlet 8.

The separator chamber housing 11 has a plurality of mounting bosses 6 extending radially outward from the outer circumferential surface of the separator chamber housing 11. In the present embodiment, four mounting bosses 6 are provided. However, the number of mounting bosses 6 is not limited to four and may be more or less than four. The mounting bosses 6 are configured for mounting the air filtration apparatus 1 in a plurality of orientations to a support structure such as an engine or other device to which the air filtration apparatus 1 is provided. The plurality of possible mounting orientations provides advantageous adaptability for use of the air filtration apparatus 1 in various applications. The mounting bosses 6 are elongated members made of, for example, metal and/or polymer composite resin. Each mounting boss 6 has an opening on its free end to mount the air filtration apparatus 1 to the support structure. Between the mounting bosses 6 is provided a labeling surface 61 for providing a label or other indicia regarding the air filtration apparatus 1.

On its first axial side, the separator chamber housing 11 includes a mounting surface 58 surrounding the airflow inlet 57. The mounting surface 58 is arranged to mate with the mounting surface 55 of the vane assembly 10. The mounting tabs 16 are formed on the mounting surface 58.

On its second axial side, the separator chamber housing 11 has an outlet sealing surface 60 surrounding the clean air outlet 8. An air outlet sealing bead 59 is provided on the outlet sealing surface 60 at the edge of the clean air outlet 8. As shown in FIG. 24, on the inner circumferential surface of the clean air outlet 8 is a vacuum/pressure port 13 configured to receive an optional mechanical pressure/vacuum sensor or electrical pressure/vacuum sensor (not shown) for sensing the pressure of the airflow at the clean air outlet 8.

As seen in FIGS. 24 to 28, the separator chamber housing 11 has a plurality of debris ejection slot extensions 12 which are configured to align with a debris ejection slot 72 of the debris catch tray 27, described in detail below. In the present embodiment, four debris ejection slot extensions 12 are provided spaced part around the circumference of the separator chamber housing 11. However, the number of debris ejection slot extensions 12 is not limited to four and may be as few as one or more than four. As understood from FIGS. 27 and 28, each debris ejection slot extension 12 has a first indented surface and a second surface extending radially outward from the first indented surface to the outer circumferential surface, in order to facilitate ejection of the debris from the separator chamber housing 11.

The separator chamber housing 11 further includes a mounting surface 63. The mounting surface 63 is configured to accommodate an optional ejection port adaptor 64, an optional FID (filter identification) reader air outlet side adaptor 83, and an optional ejection slot sealing cap adaptor 93.

(3) Ejection Port Adaptor

Figure 31:
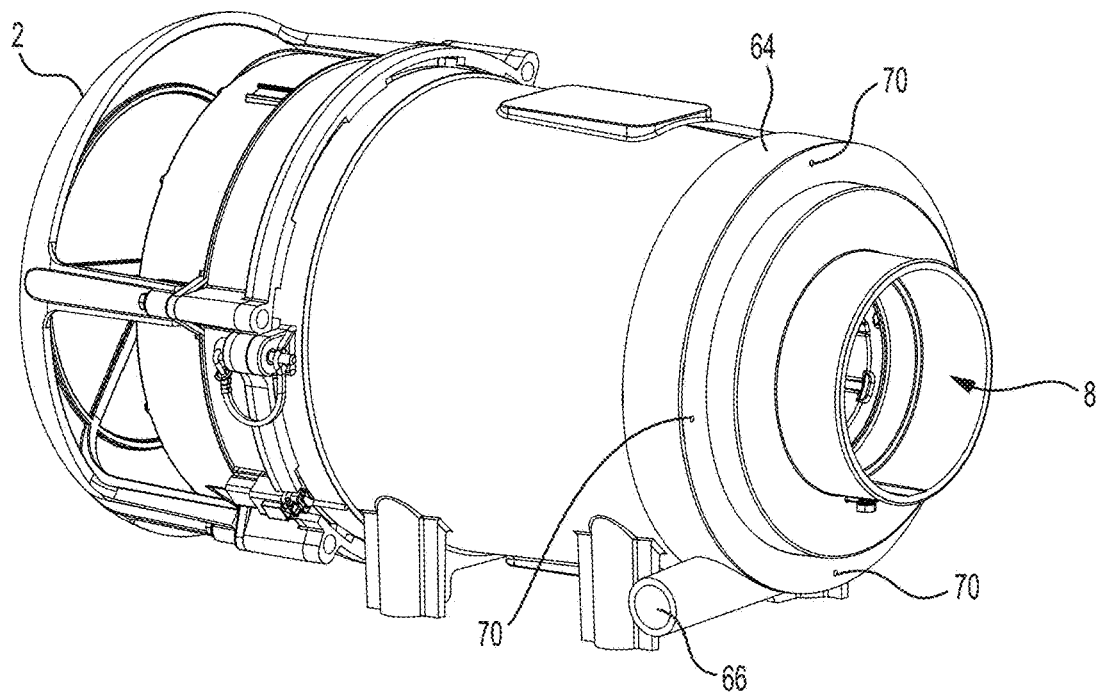
FIG. 31 is a perspective view of the air filtration apparatus having the ejection port adaptor installed thereon.
Figure 32:
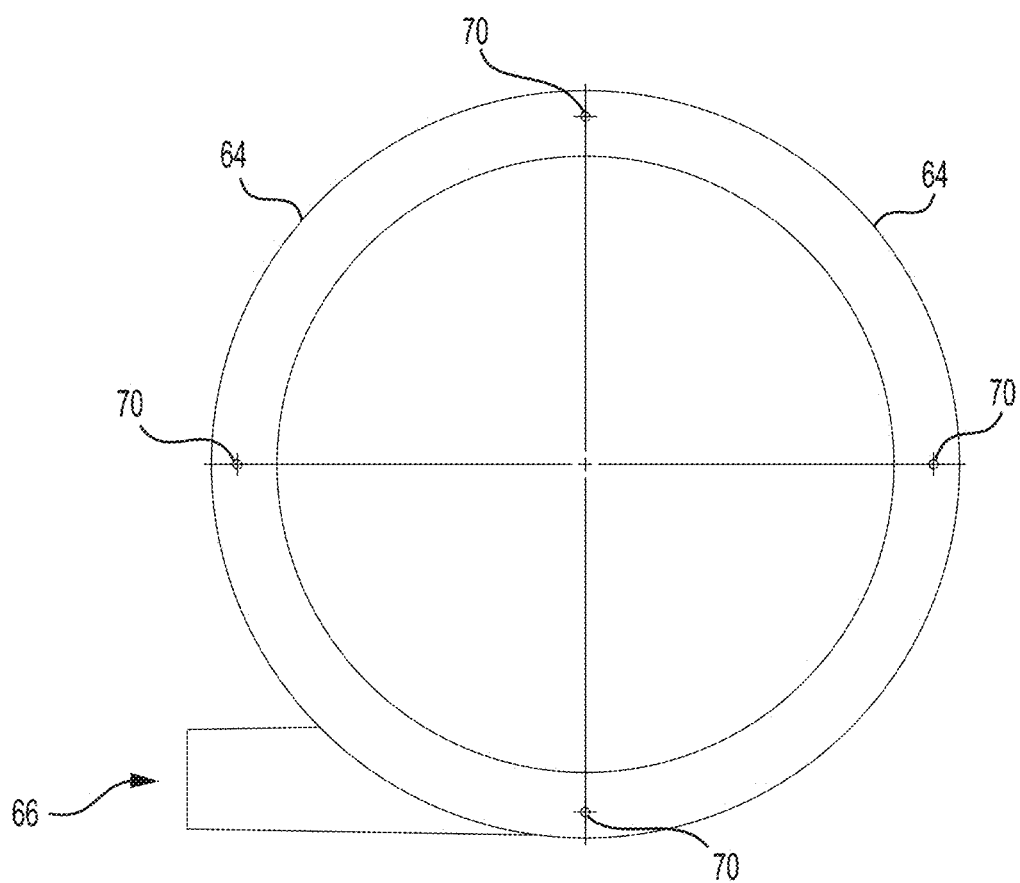
FIG. 32 is a plan view of a second end of the ejection port adaptor.
Figure 33:
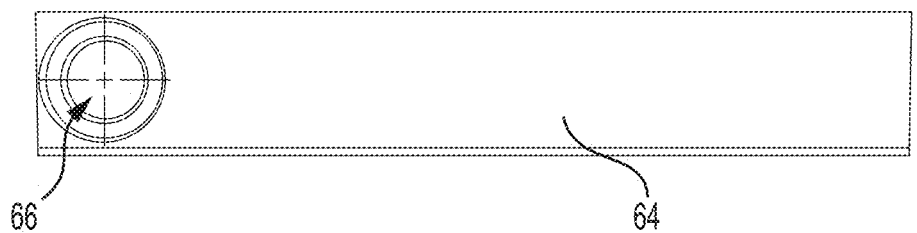
FIG. 33 is a side view of the ejection port adaptor showing the debris ejection port.
Figure 34:
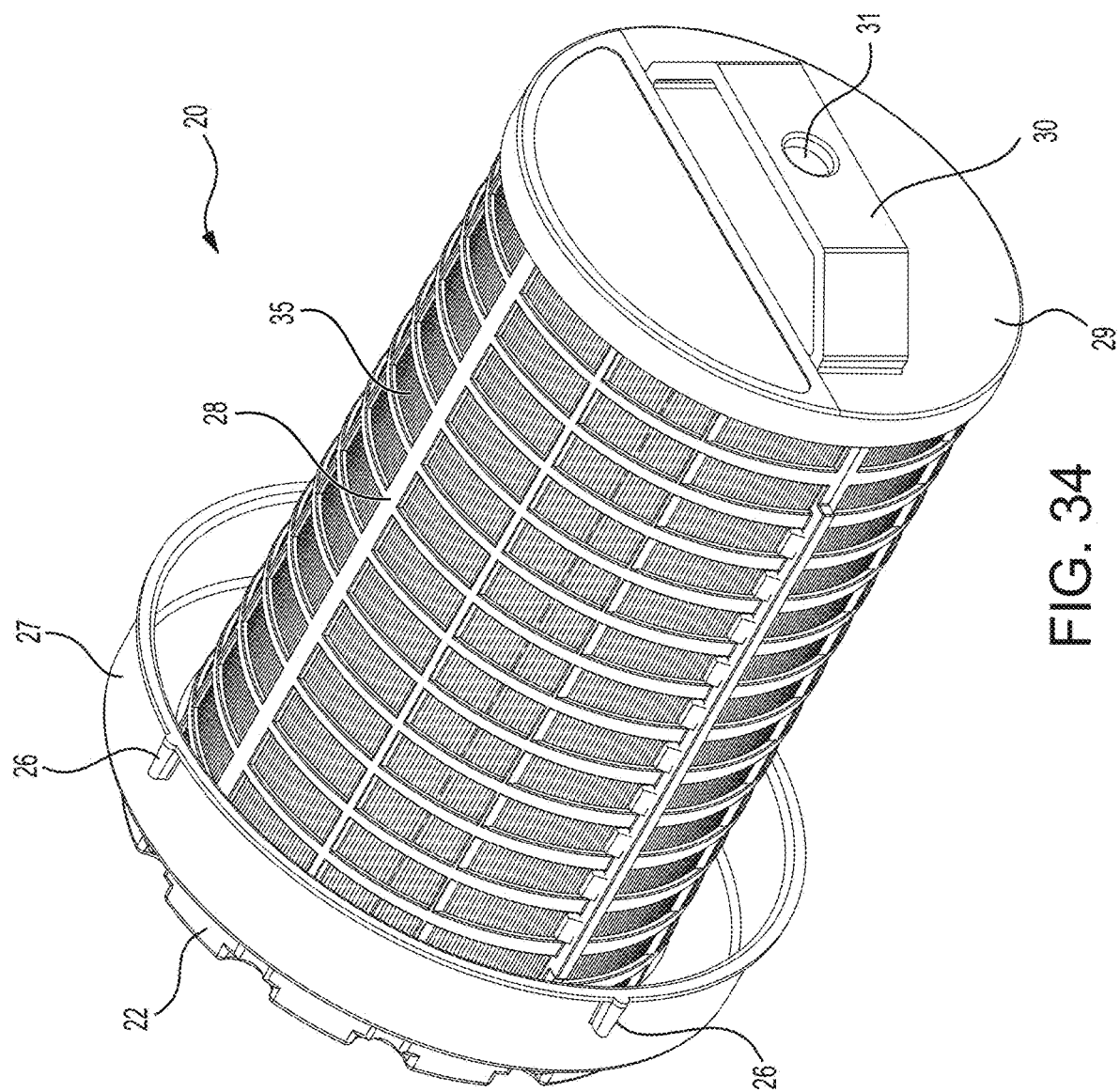
FIG. 34 is a perspective view of an outer filter assembly of the air filtration apparatus.
Figure 35:
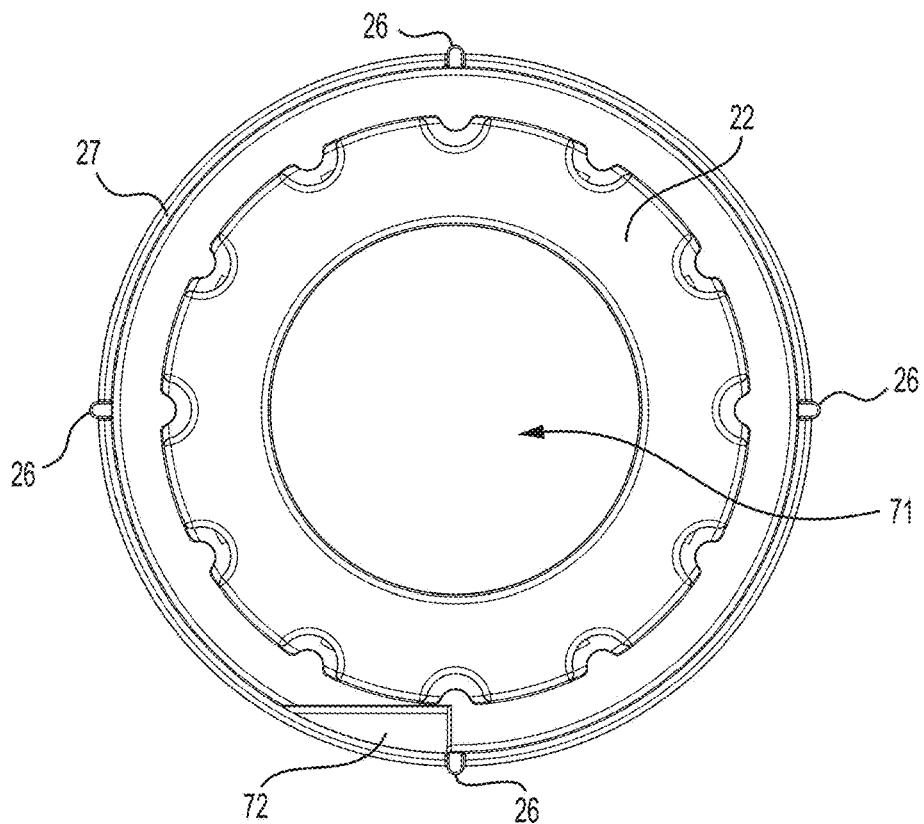
FIG. 35 is a plan view of the clean air side of the outer filter assembly showing a debris ejection slot.
Figure 36:
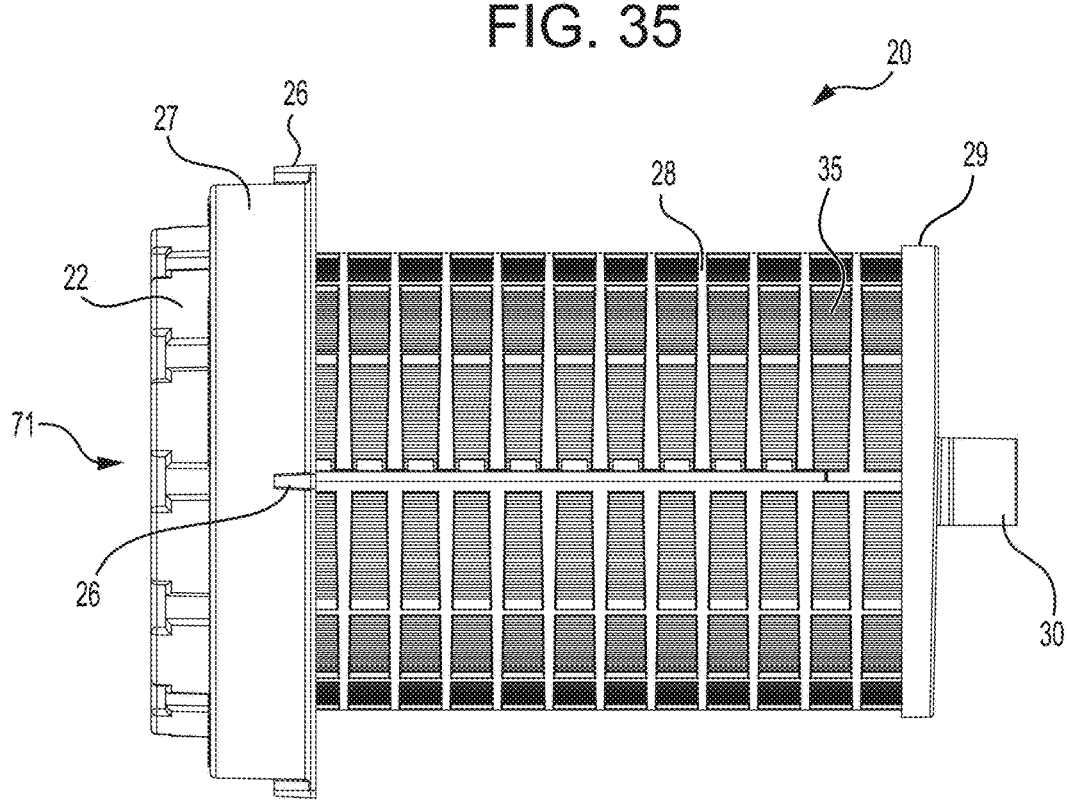
FIG. 36 is a side view of the outer filter assembly.
Figure 37:
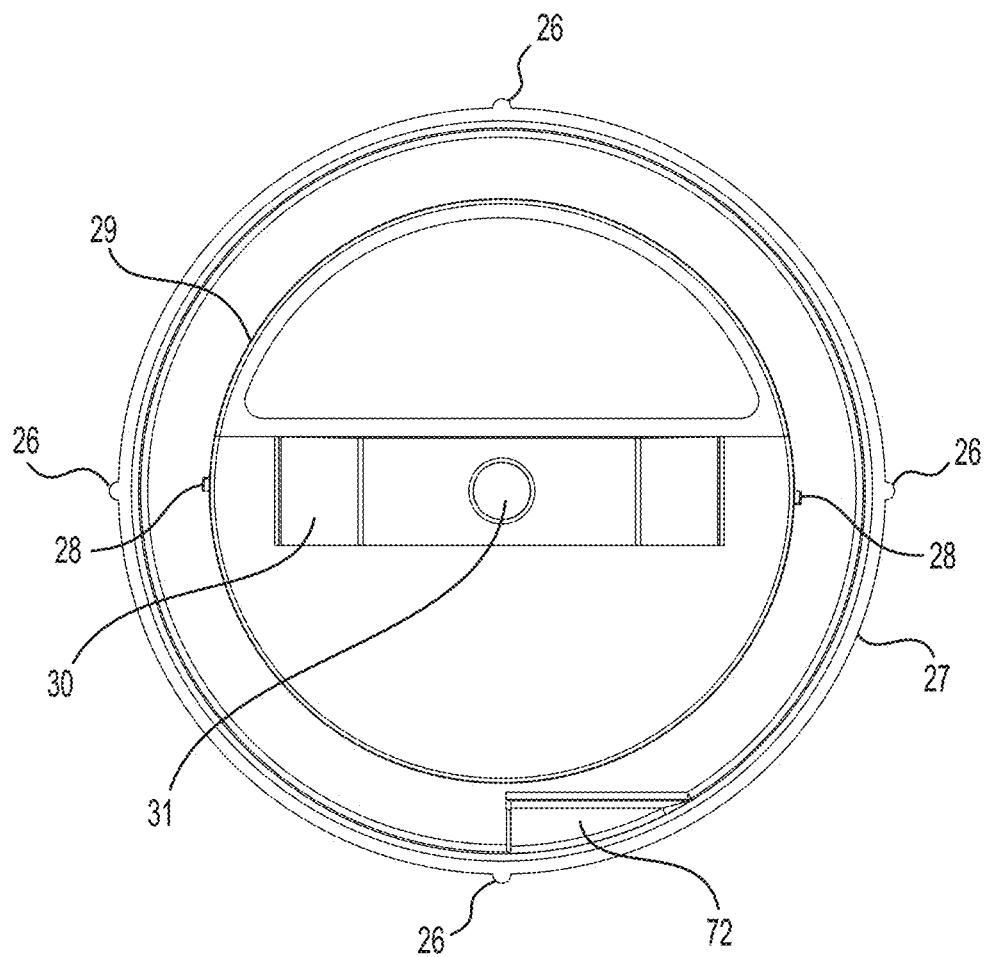
FIG. 37 is a plan view of the dirty air side of the outer filter assembly showing the debris ejection slot.

The ejection port adaptor 64 is shown in FIGS. 29 to 33 and includes a plurality of alignment slots 65, a debris ejection port 66, a horizontal sealing surface 67, a vertical sealing surface 68, an ejection port exit opening 69 and fastener holes 70. The alignment slots 65 are each configured to receive a mounting boss 15 (shown in FIG. 24) positioned on the separator chamber housing 11 at each of the debris ejection slot extensions 12. A fastener 85 (shown in FIG. 47) is provided to secure the ejection port adaptor 64 to the separator chamber housing 11 by passing through a fastener hole in each mounting boss 15 and through each of the fastener holes 70 of the ejection port adaptor 64. The fasteners 85 are, for example, metal or polymer composite resin screws, bolts, rivets or other such attachment members. Debris exits the ejection port adaptor 64 via the ejection port exit opening 69 and the debris ejection port 66. The horizontal sealing surface 67 mates with the mounting surface 63. The vertical sealing surface 68 mates with an axially facing surface (facing in the second axial direction) of the separator chamber housing 11 positioned on the first axial side of the debris ejection slot extensions 12. The ejection port adaptor 64 may be made of, for example, polymer composite resin. FIG. 31 shows the ejection port adaptor 64 installed on the separator chamber housing 11. The optional ejection port adaptor 64 advantageously allows for directing ejection of the debris through a single port (the debris ejection port 66) which may be adapted for ejection of debris-laden air to a specific location or outside of, for example, an engine compartment or other device compartment as needed.

(4) Filter Reading Features

Figure 47:
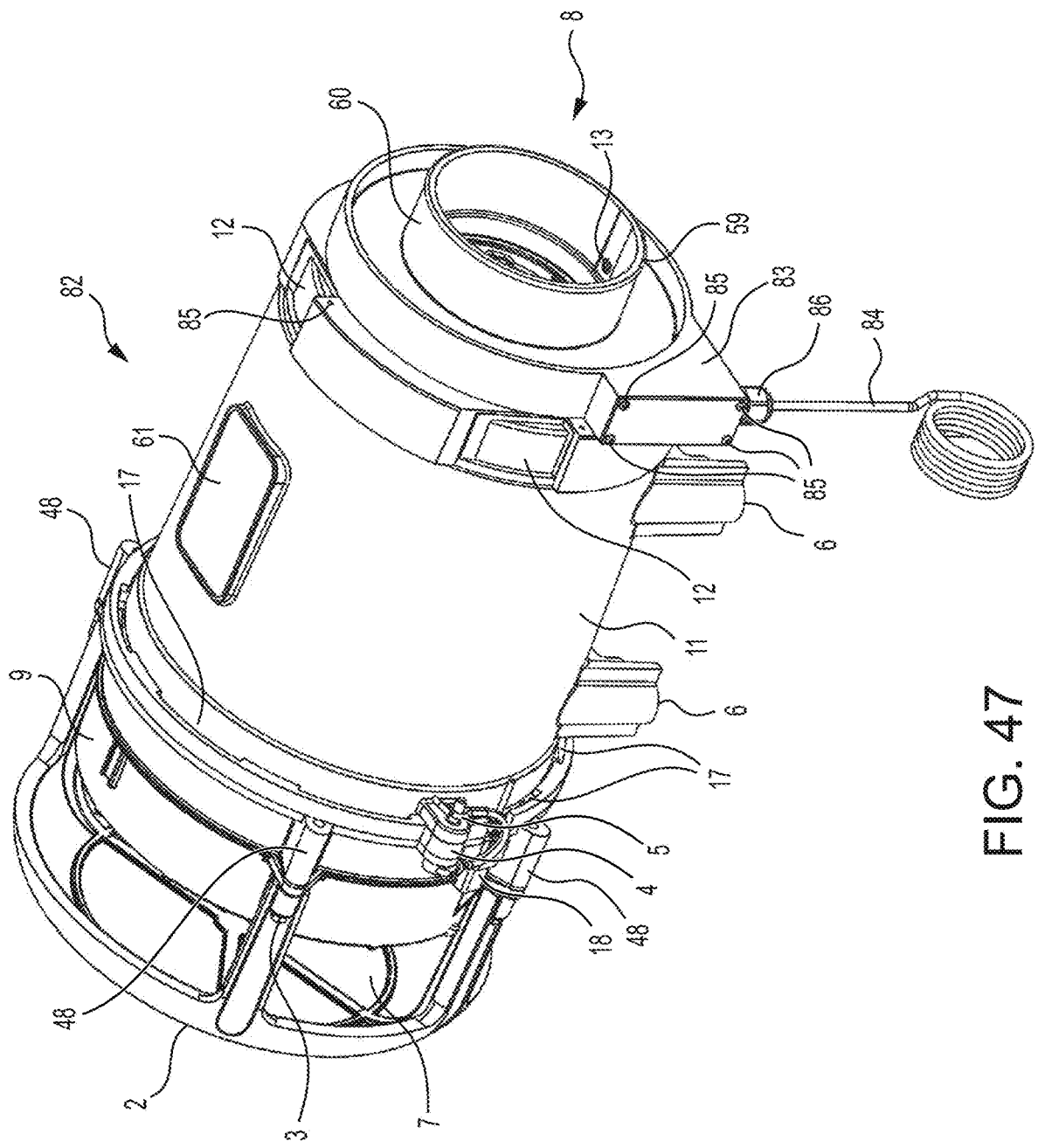
FIG. 47 is a perspective view of the air filtration apparatus showing an optional filter identification reader air outlet side adaptor attached to the air outlet side.
Figure 48A:
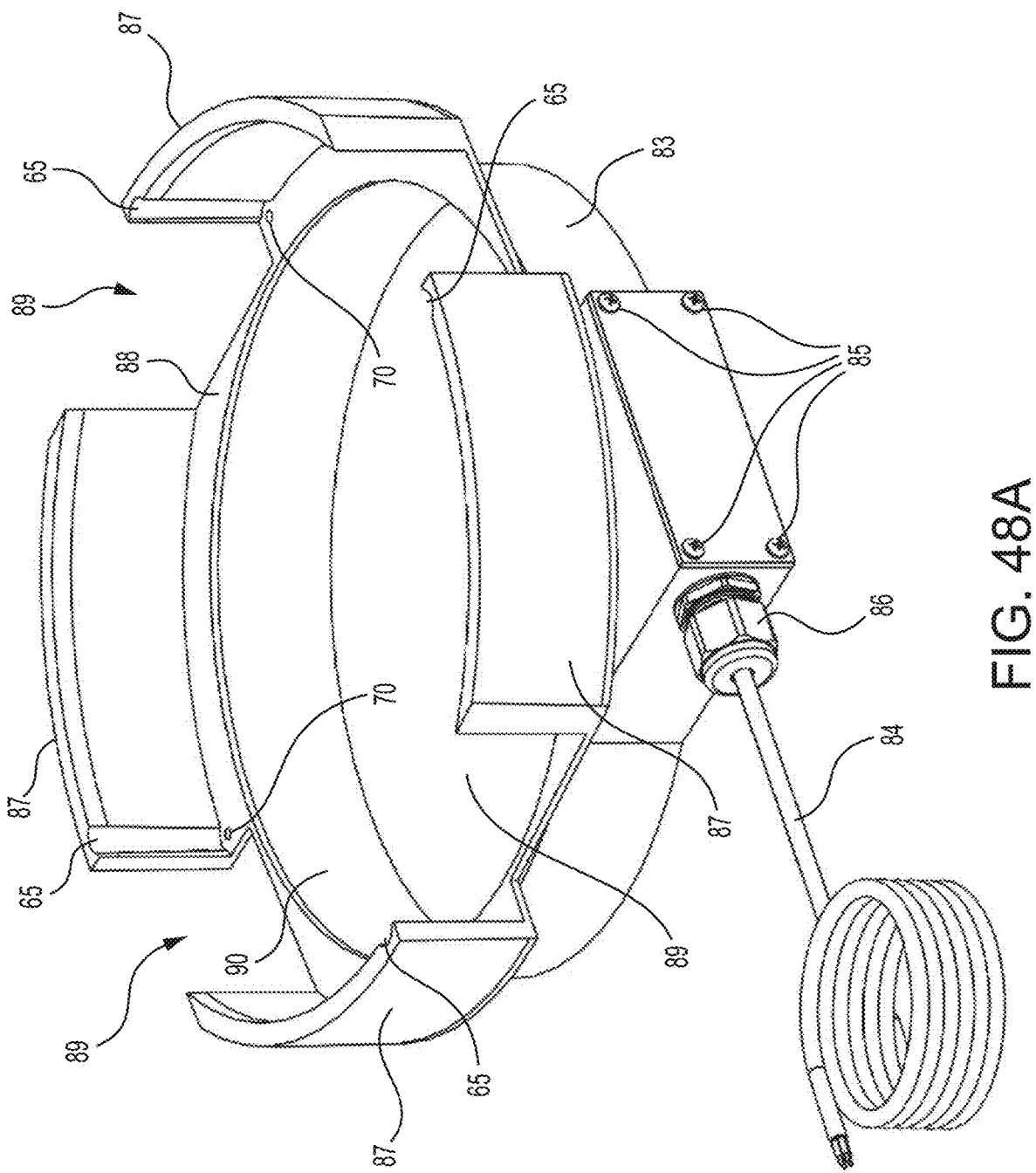
FIG. 48A is a first perspective view of the filter identification reader air outlet side adaptor.
Figure 48B:
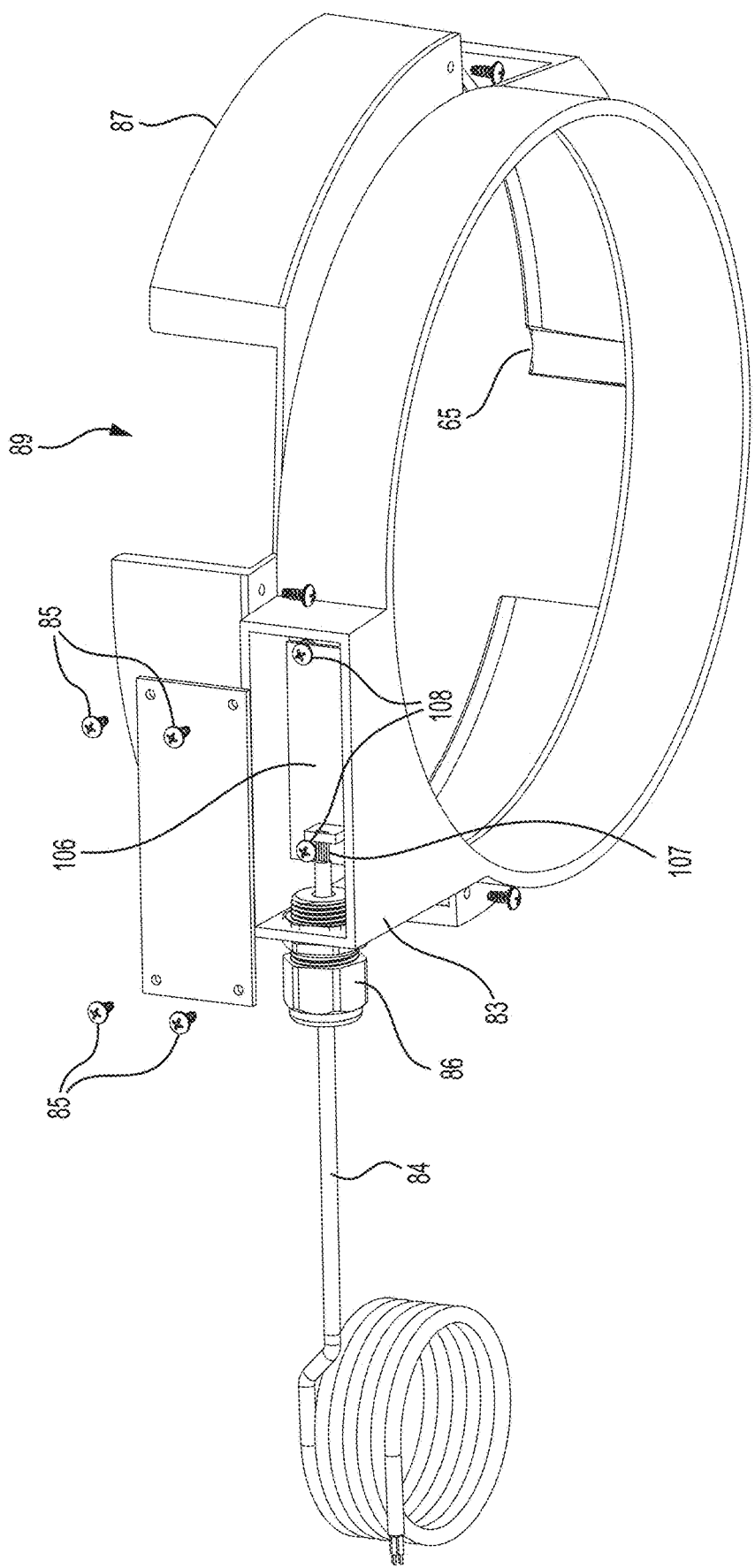
FIG. 48B is a second perspective view of the filter identification reader air outlet side adaptor showing internal features including a filter identification reader circuit board.

FIGS. 47, 48A and 48B show a modified arrangement 82 of the air filtration apparatus 1 having the optional FID reader air outlet side adaptor 83 installed at the clean air outlet 8. The FID reader air outlet side adaptor 83 is a ring-shaped member that fits to the mounting surface 63. The FID reader air outlet side adaptor 83 includes electrical wiring 84, the fasteners 85, a plurality of alignment slots 65, an electrical wire seal 86, a plurality of vertical mounting supports 87, a horizontal sealing surface 88, air gaps 89, a vertical circular slip fit mounting support 90, an FID reader circuit board 106, an electrical connector 107, and fasteners 108. The electrical wiring 84 is connected to a power source, such as a battery, not shown in the figures, for providing power to the FID reader air outlet side adaptor 83. The alignment slots 65 are each configured to receive a respective mounting boss 15, and the fasteners 85 are provided to secure the FID reader air outlet side adaptor 83 to the separator chamber housing 11 by passing through a fastener hole in each mounting boss 15 and each of the fastener holes 70 in the FID reader air outlet side adaptor 83. Additional fasteners 85 are provided at a removable panel adjacent the electrical wire seal 86 to facilitate entry through the panel, inside of which the FID reader circuit board 106 is connected to the electrical wiring 84 via the electrical connector 107 (see FIG. 48B). The fasteners 108 disposed inside of the panel are provided to secure the FID reader circuit board 106 to a surface of the FID reader air outlet side adaptor 83. The electrical connector 107 is made of, for example, metal and/or polymer composite resin and electrically connects the circuitry of the FID reader circuit board 106 to the electrical wiring 84. The fasteners 108 are, for example, metal bolts, rivets or other such attachment members. The electrical wire seal 86 is formed of, for example, a nut or other fastener and an O-ring seal that prevents entry of moisture into the FID reader air outlet side adaptor 83. The horizontal sealing surface 88 mates with the mounting surface 63. The vertical mounting supports 87 are arranged to mate with the outer circumferential surface of the separator chamber housing 11 that extends between the debris ejection slot extensions 12, with the axial edge of the vertical mounting supports 87 being arranged to mate with the axially facing surface (facing in the second axial direction) of the separator chamber housing 11 positioned on the first axial side of the debris ejection slot extensions 12. So as not to impede the ejection of debris through the debris ejection slot extensions 12, the air gaps 89 are provided between adjacent vertical mounting supports 87, as seen in FIG. 48A. The vertical circular slip fit mounting support 90 mates with the outer circumferential surface of the separator chamber housing 11 disposed on the second axial side of the mounting surface 63. The FID reader air outlet side adaptor 83 may be made of, for example, metal and/or polymer composite resin. The FID reader air outlet side adaptor 83 advantageously allows for reading of the filter identification ring ("FIR") 92 on the clean air side of the air filtration apparatus 1, as described below.

Figure 49:
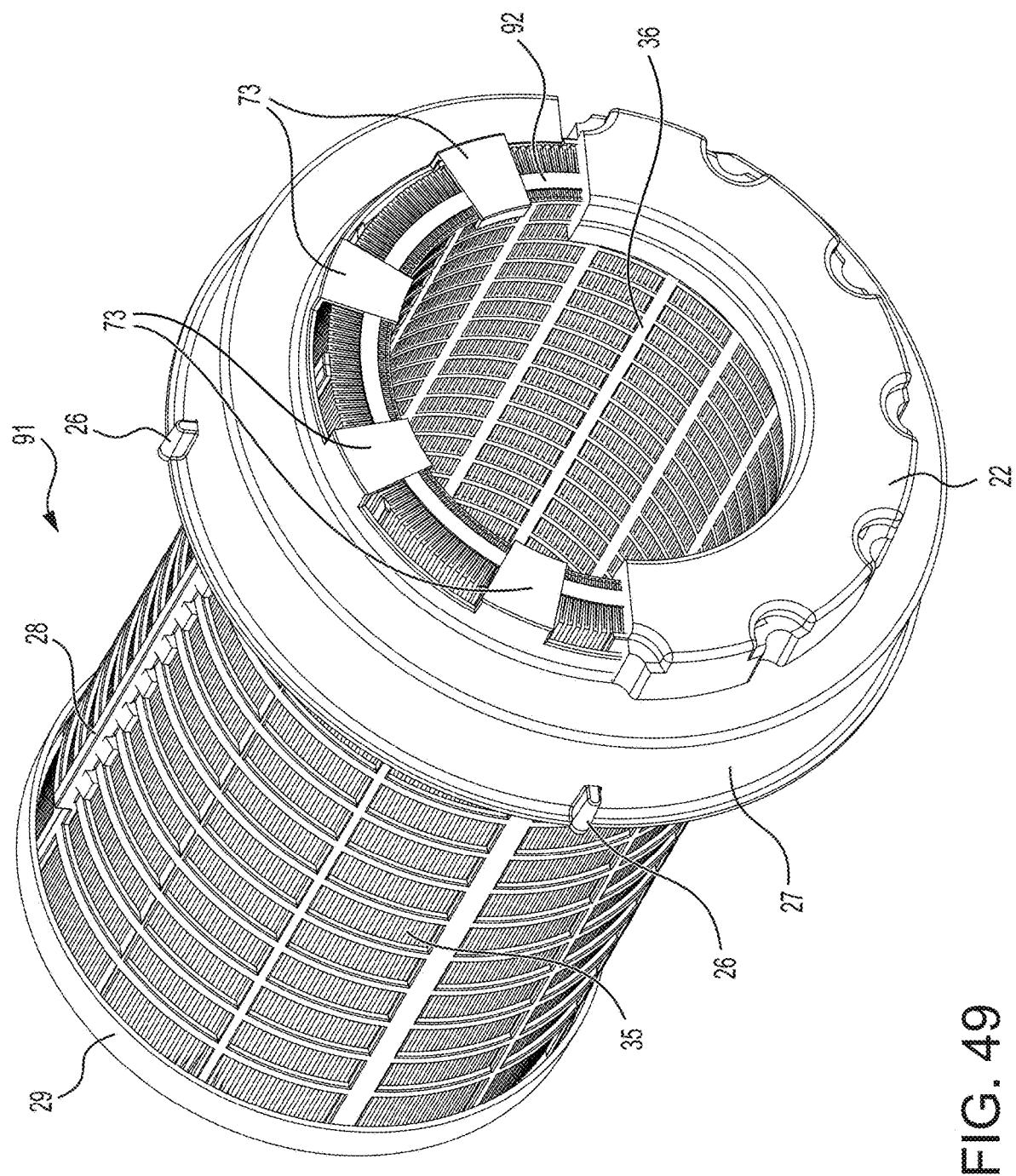
FIG. 49 is perspective view of the outer filter assembly with a portion of an outer filter clean side seal cut away to show internal elements including an optional filter identification ring.

As noted above, the FID (filter identification) reader air outlet side adaptor 83 and the filter identification ring ("FIR") 92 are optional components. The FID reader circuit board 106 includes circuitry and an antenna to provide power to, and to communicate with, the FIR 92. The FID reader circuit board 106 is configured to receive filter-related data from the FIR 92. The features of the FIR 92 and the FID reader circuit board 106 (also described as a "control module," or "RCM") are described in detail in U.S. application Ser. No. 16/022,941, filed Jun. 29, 2018 (now U.S. Pat. No. 10,850,222, issued Dec. 1, 2020), and incorporated herein by reference in its entirety. Additional features of the FIR 92 and the FID reader circuit board 106 are described in detail in U.S. application Ser. No. 17/138,052, incorporated herein by reference in its entirety. In addition, although the FIR 92 is described in this application as having as ring shape, the filter identification device may have various configurations. For example, the FIR 92 could be a filter identification chip embedded in the outer filter clean side seal 22. The FIR 92 is provided on the "clean side" of the airflow (i.e., at a position passed by the airflow after debris is removed by the outer filter media 35) as shown in FIG. 49.

(5) Ejection Slot Sealing Cap Adaptor

Figure 50A:
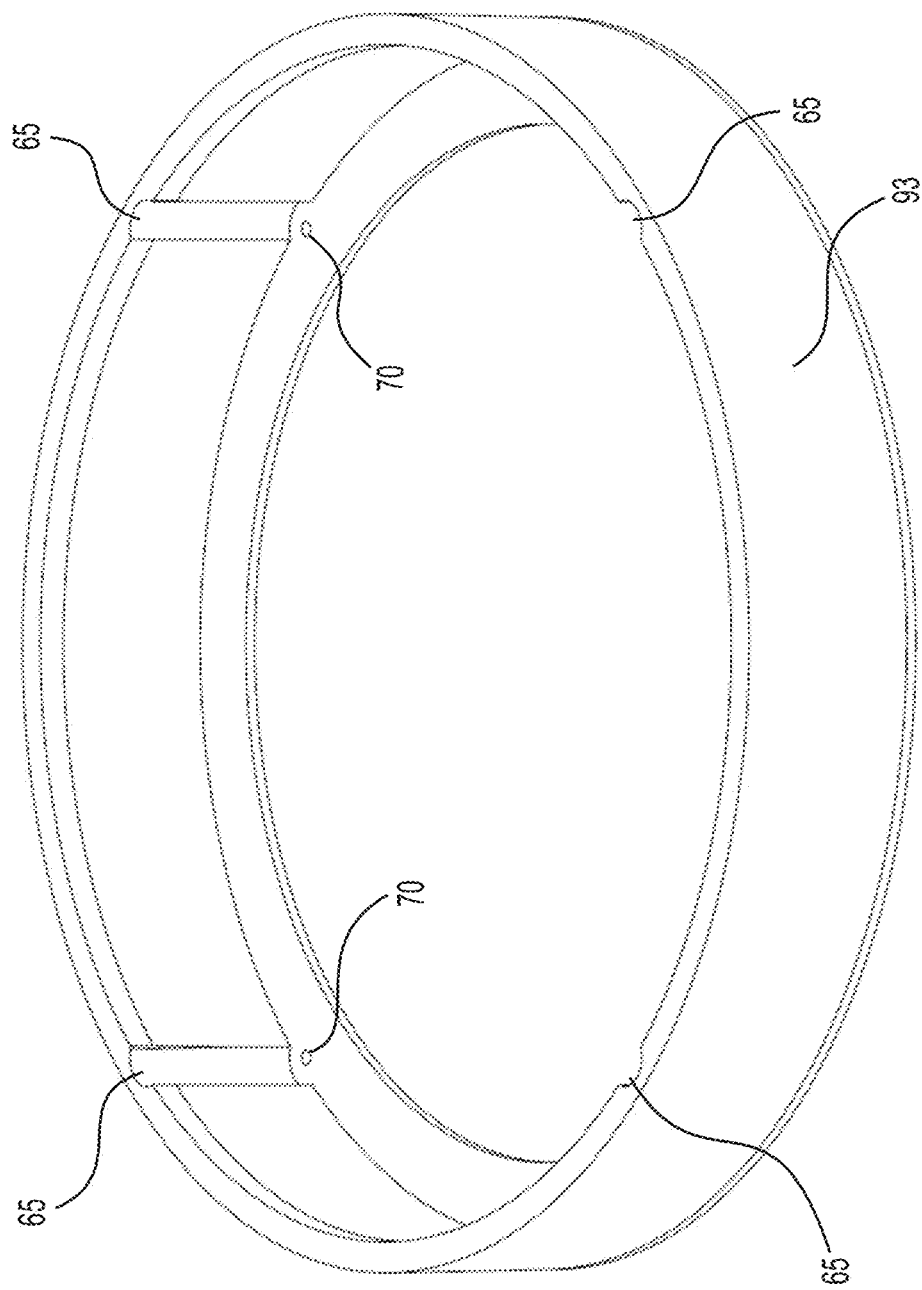
FIG. 50A is a perspective view showing an optional ejection slot sealing cap adaptor of the air filtration apparatus.
Figure 50B:
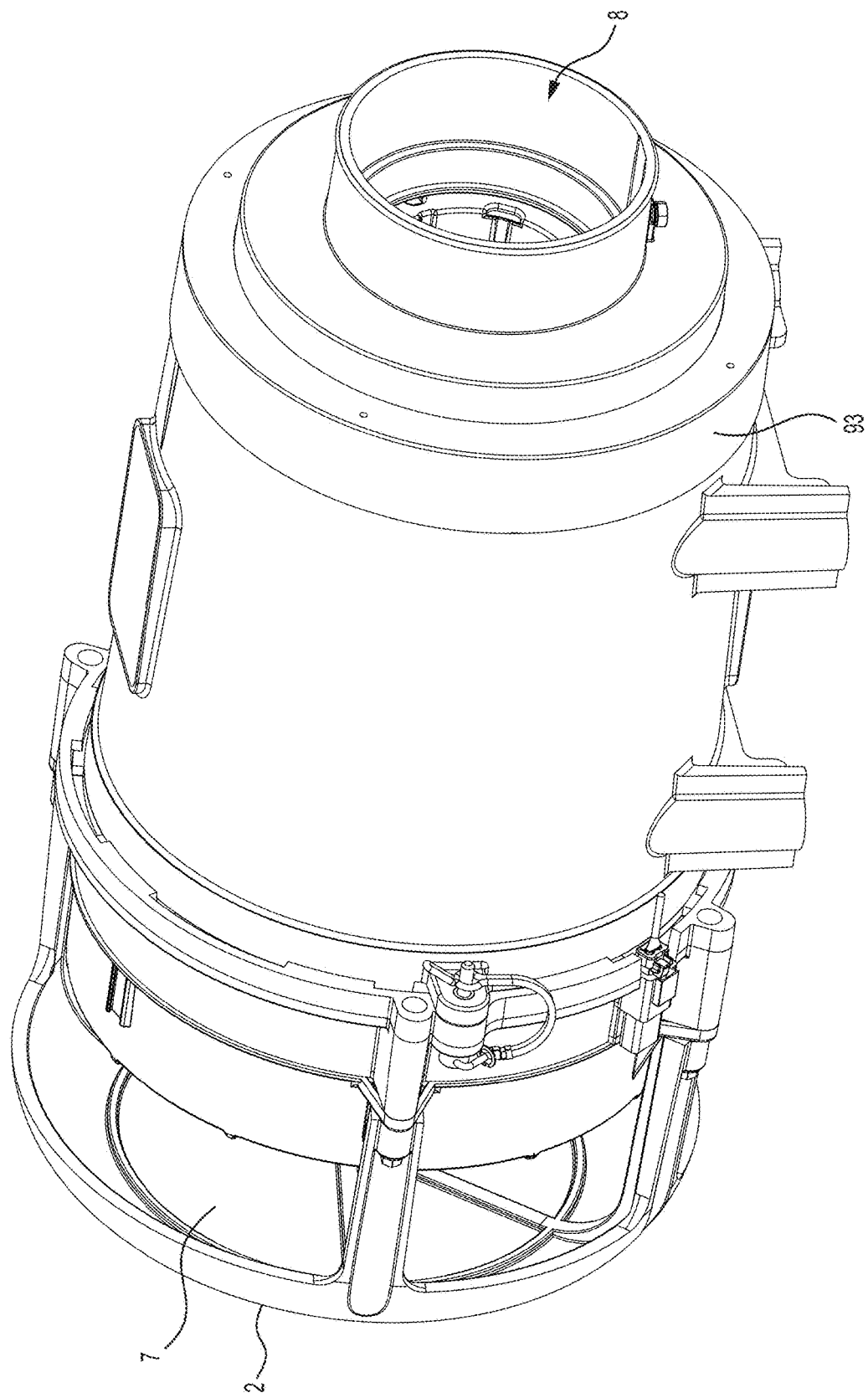
FIG. 50B is a perspective view of the air filtration apparatus having the ejection slot sealing cap adaptor installed thereon.

The optional ejection slot sealing cap adaptor 93 is shown in FIGS. 50A and 50B and includes a plurality of alignment slots 65 and fastener holes 70. As with the ejection port adaptor 64, the alignment slots 65 are each configured to receive a respective mounting boss 15, and a fastener 85 is provided to secure the ejection slot sealing cap adaptor 93 to the separator chamber housing 11 by passing through the fastener hole in each mounting boss 15 and each of the fastener holes 70 of the ejection slot sealing cap adaptor 93. FIG. 50B shows the ejection slot sealing cap adaptor 93 installed on the separator chamber housing 11. The ejection slot sealing cap adaptor 93 may be made of, for example, polymer composite resin. The ejection slot sealing cap adaptor 93 advantageously allows for sealing of the debris ejection slot extensions 12 when the separator chamber housing 11 is to be used without the self-cleaning features.

(6) Filter Assembly

FIGS. 34 to 46 and 49 show features of the outer filter assembly 20. The outer filter assembly 20 includes an outer filter clean side seal 22, a debris catch tray 27, a two-part outer screen 28, a closed end cap 29, outer filter media 35, and an optional inner screen 36.

(6-1) Outer Filter Media

The outer filter media 35 removes debris from the air passing through the air filtration apparatus 1. The filter structure of this disclosure allows for the use of a wide range of filter media and is ideally suited for advanced, high-efficiency media. For example, the outer filter media 35 may include a variety of media, including but not limited to, natural fiber or synthetic fiber media; may contain carbon wrap, carbon pellets, felt wrap or foam; or may be any media having high efficiency properties. The outer filter media 35 can be formed of a single media or of multiple media, including but not limited to the types of media mentioned above.

(6-2) Screen Assemblies

The outer filter media 35 is surrounded and protected by the outer screen 28. In addition, the optional inner screen 36 may be positioned inside of the outer filter media 35 for additional structural support. Both the inner screen 36 and the outer screen 28 may be made of, for example, polymer composite resin. The inner screen 36 is optional and, depending on the type of media used in the outer filter media 35, the outer screen 28 may be provided without the need for the inner screen 36. The inner screen 36, the outer filter media 35 and the outer screen 28 are held in place on the first axial side by the closed end cap 29. For example, the inner screen 36, the outer filter media 35 and the outer screen 28 may be fixed to the closed end cap 29 by using glue, urethane, closed cell foam, epoxy, rubber, or any other bonding agent that would securely fasten the inner screen 36, the outer filter media 35 and the outer screen 28 to the closed end cap 29 without damaging the outer filter media 35.

On the second axial side, the inner screen 36, the outer filter media 35 and the outer screen 28 are held in place by the outer filter clean side seal 22, described in detail below. At the center of the outer screen 28, the two screen halves of the outer screen 28 are held in place by a latch mechanism that provides alignment of the two screen halves and holds them together during and after the manufacturing process. The latch mechanism may have a plurality of projections on one end of the outer screen 28 and a plurality of receiving slots on the other end of the outer screen 28 into which the projections are inserted, as described in detail in U.S. application Ser. No. 17/138,052, filed Dec. 30, 2020 and incorporated herein by reference in its entirety.

(6-3) Outer Filter Clean Side Seal

Figure 38:
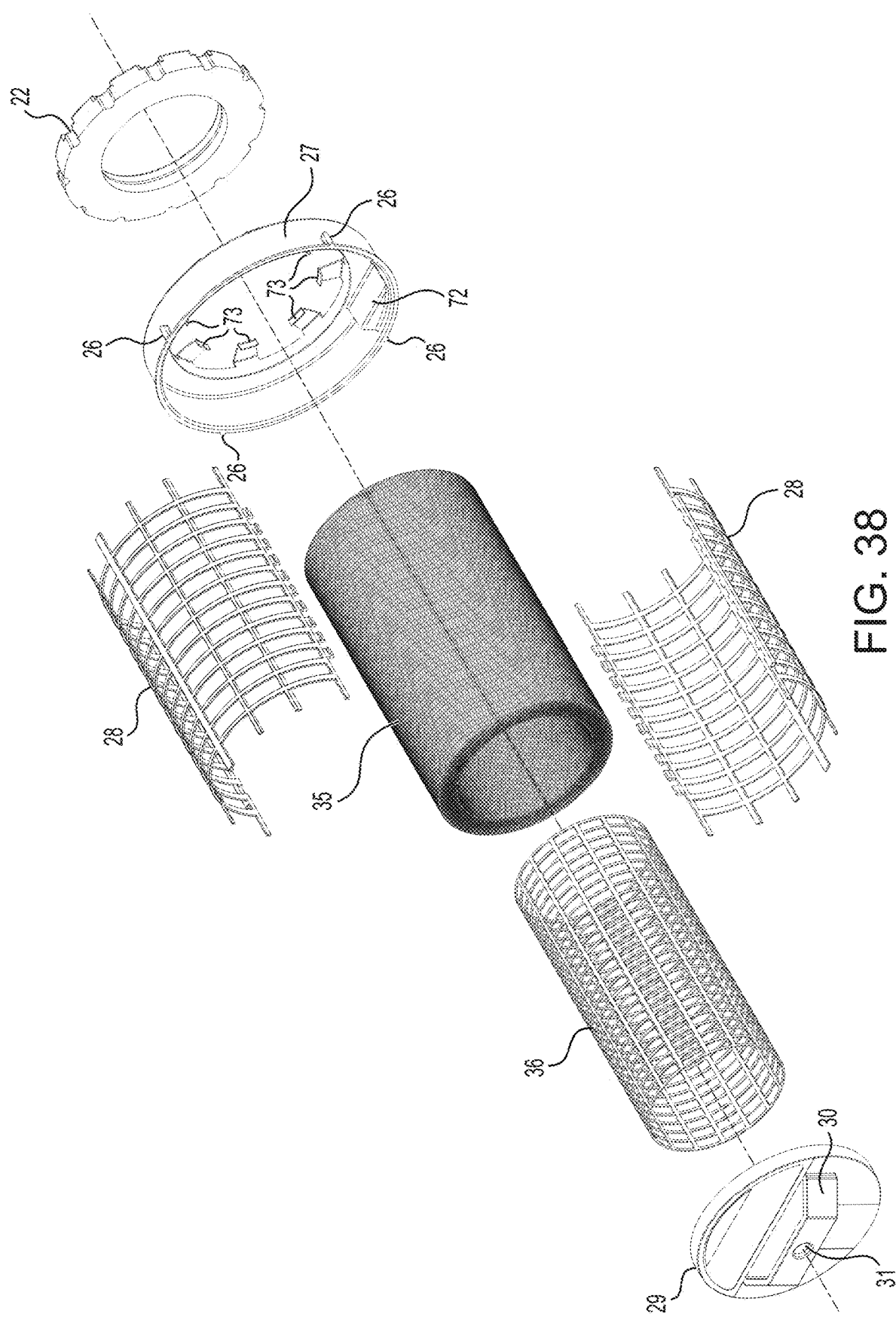
FIG. 38 is an exploded view of the outer filter assembly.
Figure 39:
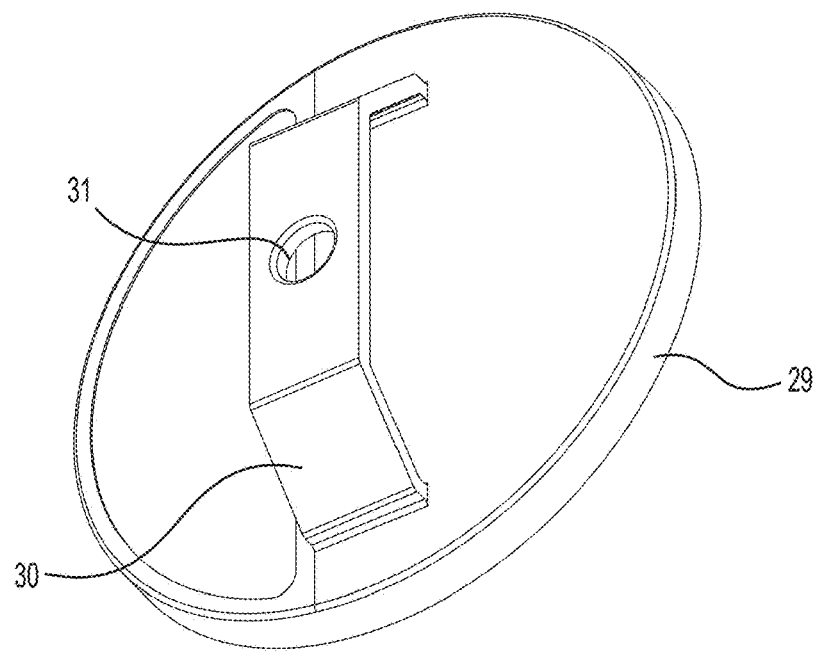
FIG. 39 is a perspective view of a closed end cap of the outer filter assembly.
Figure 40:
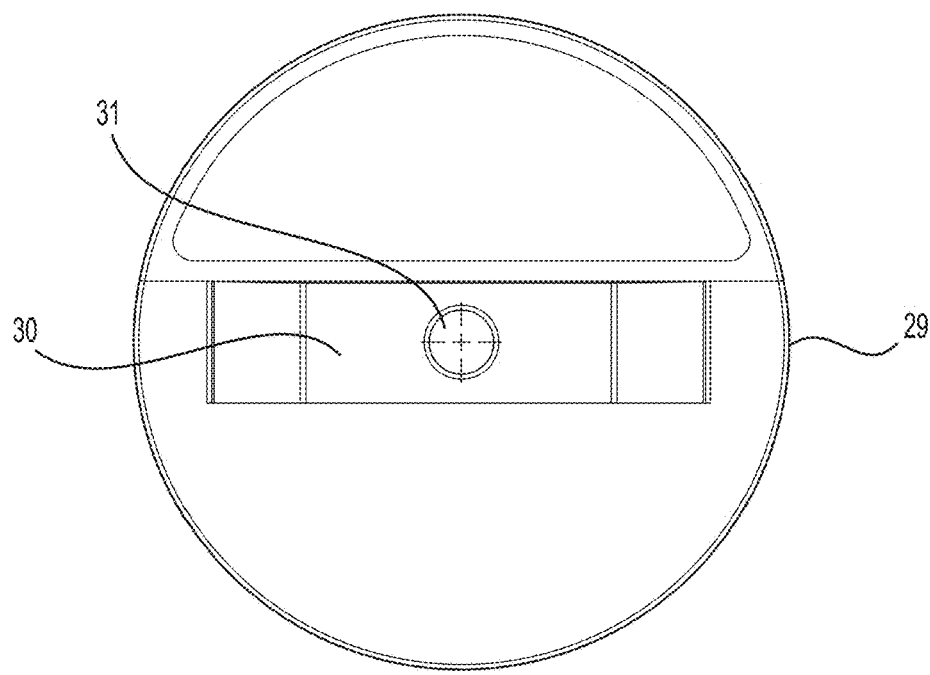
FIG. 40 is a plan view of a first, dirty air side of the closed end cap.

The outer filter clean side seal 22 is formed of, for example, urethane. More specifically, the outer filter clean side seal 22 may be formed of cold-poured urethane, as described in detail in U.S. application Ser. No. 17/138,052, incorporated herein by reference in its entirety. For purposes of illustration only, FIG. 38 shows the outer filter clean side seal 22 as being a separate element. However, the outer filter clean side seal 22 is actually integrally formed with the optional inner screen 36, the outer filter media 35, the outer screen 28, and the debris catch tray 27. Similarly to the process described in U.S. application Ser. No. 17/138,052, during the manufacturing process a mold is provided for the cold pour of the urethane to create the outer filter clean side seal 22. When the debris catch tray 27, the optional inner screen 36, the outer filter media 35, and the outer screen 28 are installed into the mold, the urethane is poured so as to flow into the open areas to secure firmly together the assembled inner screen 36, the outer filter media 35, the outer screen 28, the debris catch tray 27, and, if included, the optional filter identification ring ("FIR") 92 described below, as shown in FIG. 49. In other words, the urethane seal 22, after being cured, holds all of these constituent parts together, embedded within the urethane of the outer filter clean side seal 22, in an advantageously secure manner. FIG. 49 shows an outer filter assembly 91 in which a portion of the outer filter clean side seal 22 has been cut away for illustrative purposes to show how the optional FIR 92, the debris catch tray 27, the outer screen 28, and the outer filter media 35 are embedded within the outer filter clean side seal 22. As seen in FIG. 8, the separator chamber housing 11 has an axially extending sealing surface 40 that abuts against an inner circumferential surface of the outer filter clean side seal 22 in order to seal the radially outer edge of the clean air outlet 8. In addition, the separator chamber housing 11 has a radially extending sealing surface 62 that abuts against an axially facing surface (facing in the second axial direction) of the outer filter clean side seal 22 in order to seal the clean air outlet 8. The inner circumferential surface of the outer filter clean side seal 22 forms an air filter clean side outlet 71 (see FIG. 35) that communicates with the clean air outlet 8.

(6-4) Debris Catch Tray

FIGS. 43 to 46 shows features of the debris catch tray 27, which is included in (and embedded in) the outer filter clean side seal 22 as described above. The debris catch tray 27 includes a plurality of filter alignment ridges 26, a debris ejection slot 72, a plurality of support tabs 73, an inner axially-facing wall 78, an inner circumferential wall 79, an outer circumferential wall 80, and an outer axially-facing wall 81. The inner axially-facing wall 78 faces toward the first axial direction and surrounds the support tabs 73. The inner circumferential wall 79 faces toward the radial direction and, together with the inner axially-facing wall 78, creates the space inside the debris catch tray 27 in which the debris spins before exiting through the debris ejection slot 72. The outer axially-facing wall 81 faces toward the second axial direction (toward the clean air outlet 8) and surrounds the support tabs 73. The outer circumferential wall 80 faces outward in the radial direction and faces the inner circumferential surface of the separator chamber housing 11 when installed.

Figure 27:
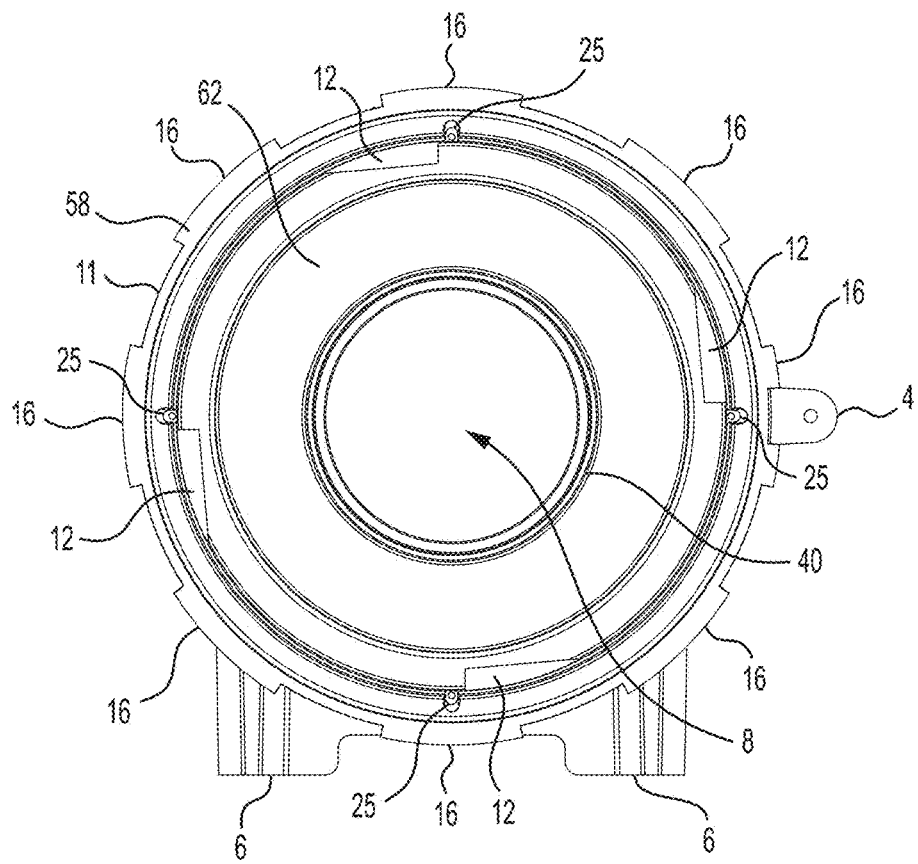
FIG. 27 is a view of the inside of the separator chamber housing as viewed from the dirty air inlet side.
Figure 28:
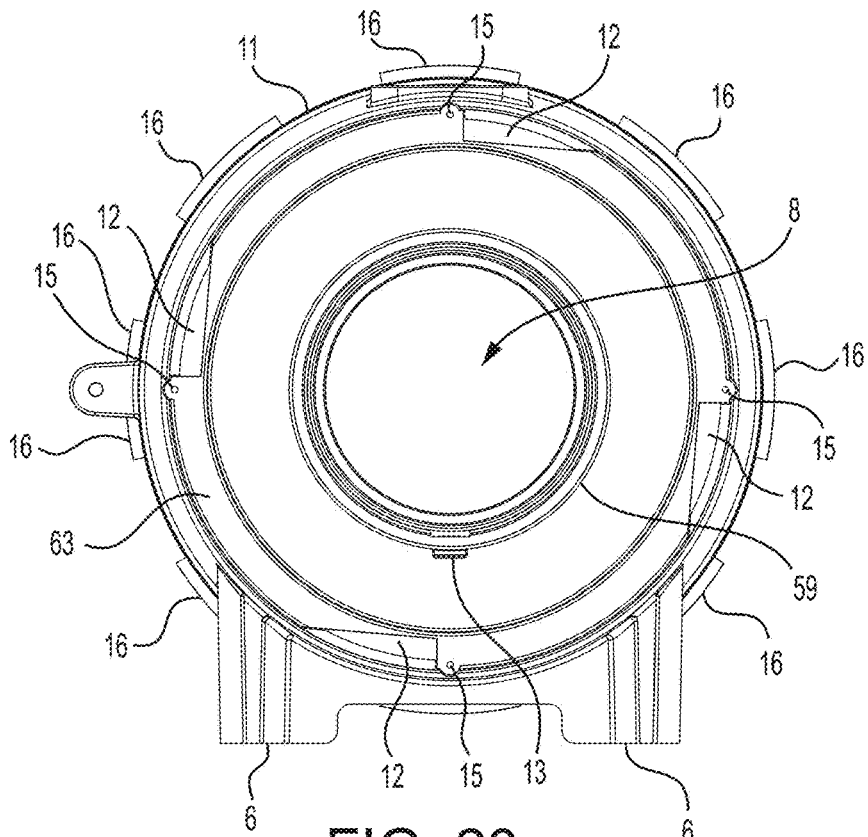
FIG. 28 is a view of the separator chamber housing as viewed from the clean air outlet side.
Figure 29:
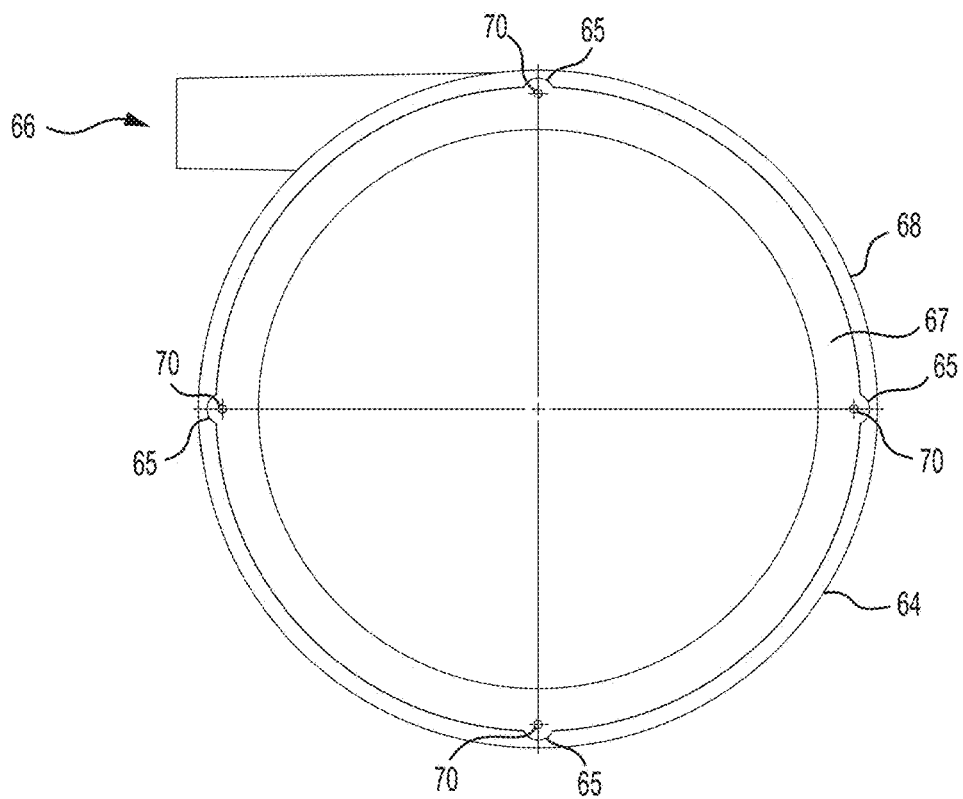
FIG. 29 is a plan view of a first end of an ejection port adaptor of the air filtration apparatus.
Figure 30:
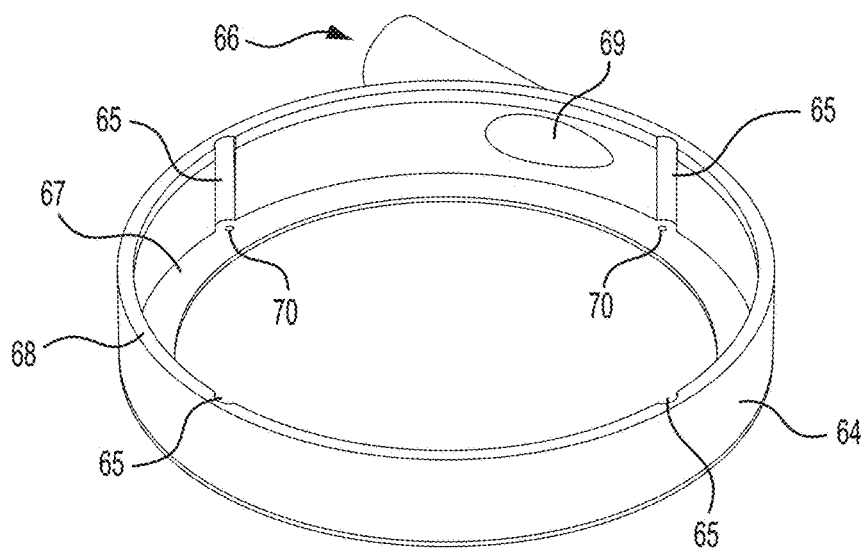
FIG. 30 is a perspective view of the ejection port adaptor.
Figure 54:
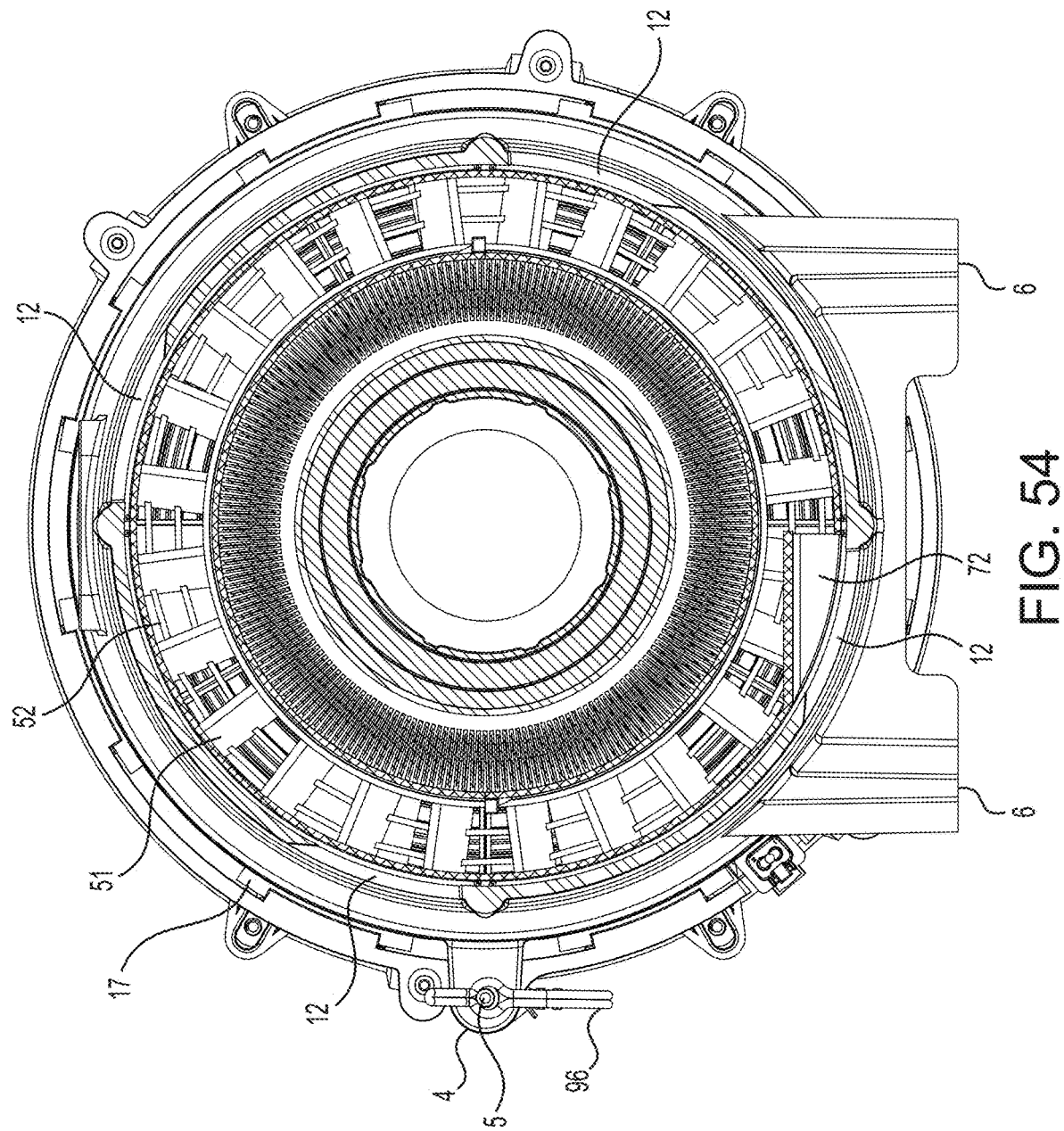
FIG. 54 is a cross-sectional view taken along line 54-54 in FIG. 26, showing the inside of the separator chamber housing with the outer filter assembly installed, as viewed from the clean air side.

Each of the filter alignment ridges 26 is arranged to mate with a respective one of a plurality of filter alignment grooves 25 formed on the inner surface of the separator chamber housing 11, as shown in FIG. 27. In addition, as noted briefly above, the debris ejection slot 72 is configured to align (axially and circumferentially) with one of the debris ejection slot extensions 12. Depending on the rotational position of the outer filter assembly 20, the debris ejection slot 72 can be aligned with any of the debris ejection slot extensions 12. For example, FIG. 54 is a cross-sectional view taken along line 54-54 in FIG. 26 and showing the debris ejection slot 72 aligned with one of the debris ejection slot extensions 12. The mating arrangement of the filter alignment ridges 26 and the filter alignment grooves 25 provides a safety feature that advantageously ensures that, regardless of the rotational position of the outer filter assembly 20, the debris ejection slot 72 will, without fail, be aligned with one of the debris ejection slot extensions 12. In other words, the mating arrangement of the filter alignment ridges 26 and the filter alignment grooves 25 prevents the outer filter assembly 20 from being installed in the separator chamber housing 11 without aligning the debris ejection slot 72 with one of the debris ejection slot extensions 12. In the present embodiment, four debris ejection slot extensions 12 are provided and thus four filter alignment ridges 26 and four filter alignment grooves 25 are arranged circumferentially. As a result, there are four rotational positions in which the outer filter assembly 20 can be installed. However, the number is not limited to four, and more or fewer debris ejection slot extensions 12, filter alignment ridges 26 and filter alignment grooves 25 may be provided, as long as the number of filter alignment ridges 26 and filter alignment grooves 25 corresponds to the number of debris ejection slot extensions 12.

Figure 43:
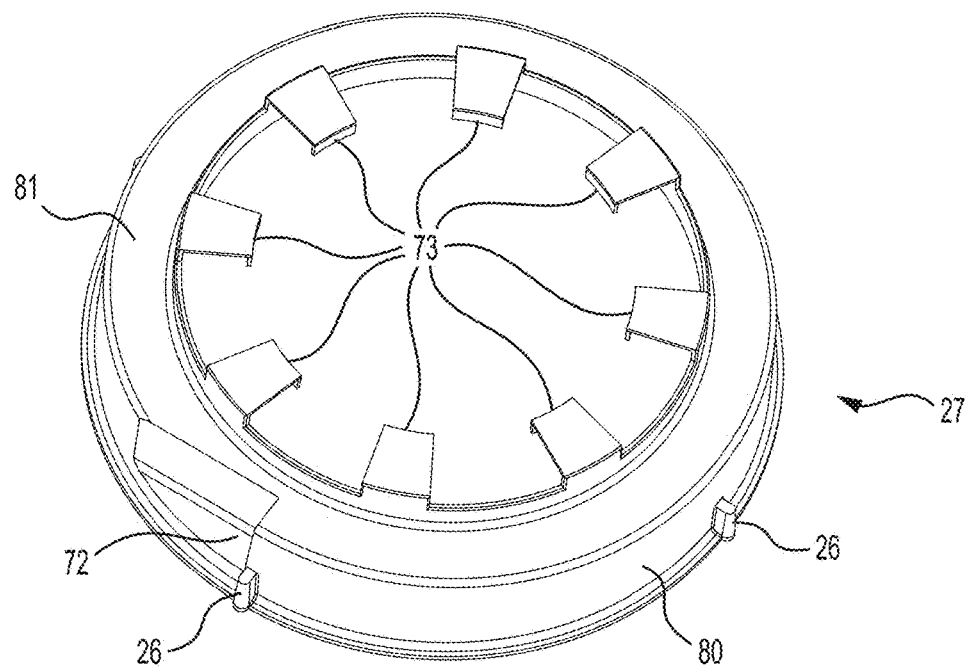
FIG. 43 is a perspective view from the clean air side of a debris catch tray of the air filtration apparatus.
Figure 44:
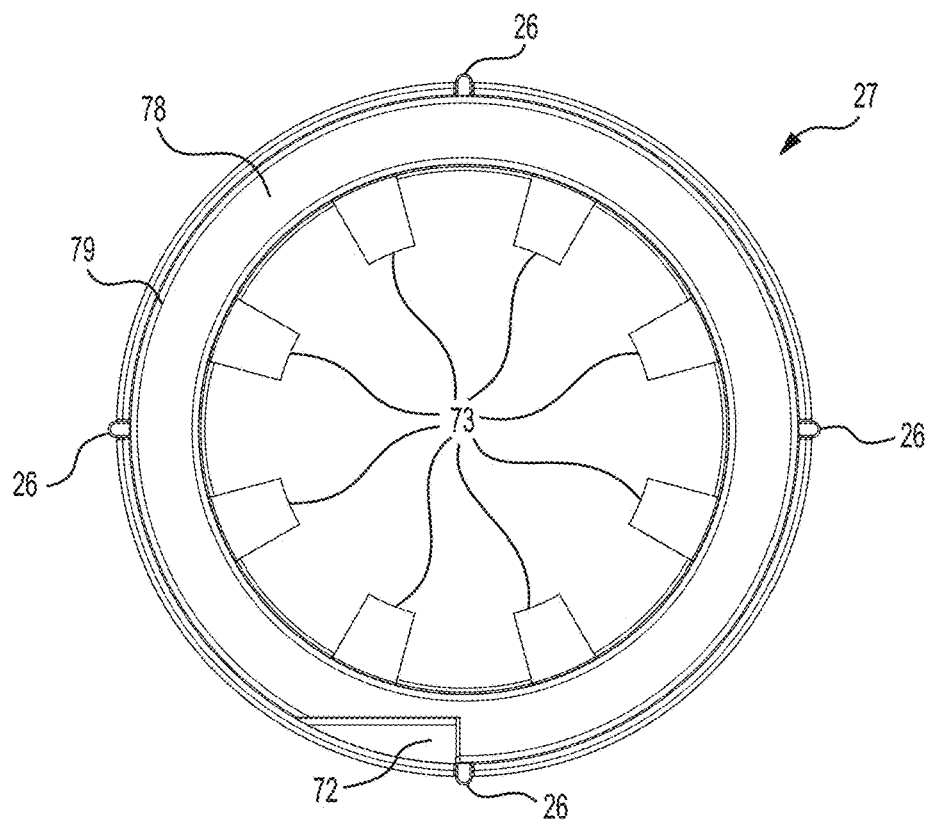
FIG. 44 is a plan view of an inner surface of the debris catch tray that is a surface for sealing a filter media.
Figure 45:
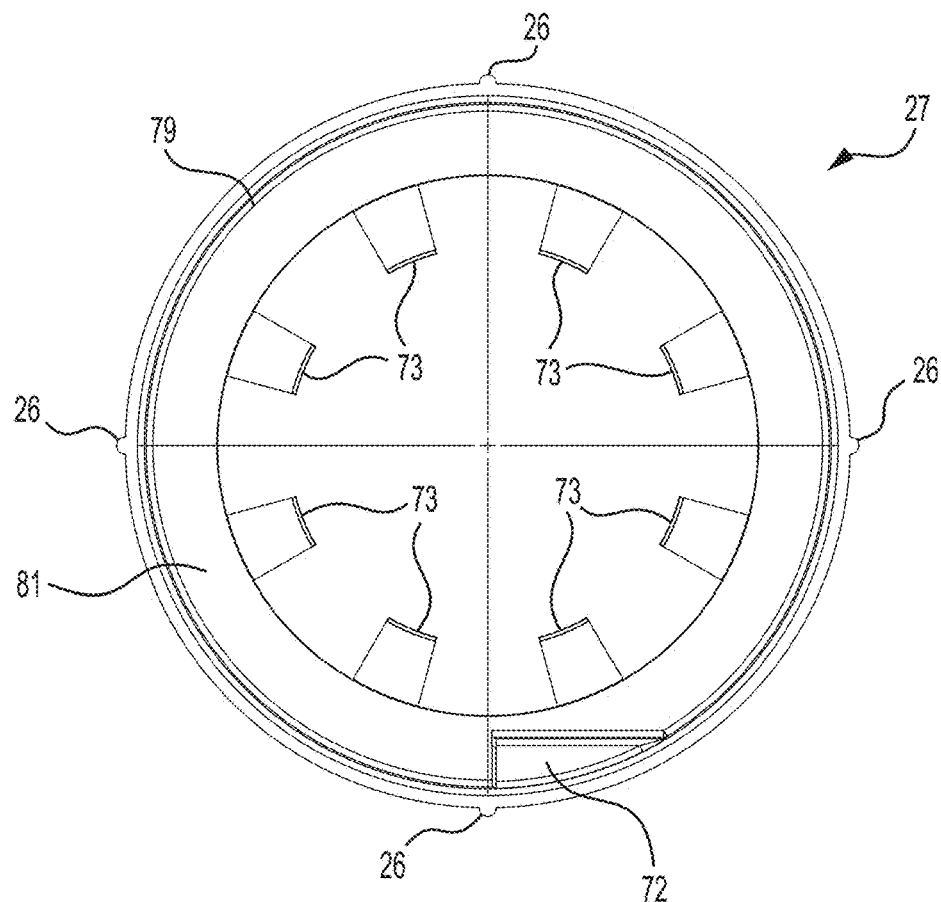
FIG. 45 is a plan view of an outer surface of the clean air side of the debris catch tray.
Figure 46:
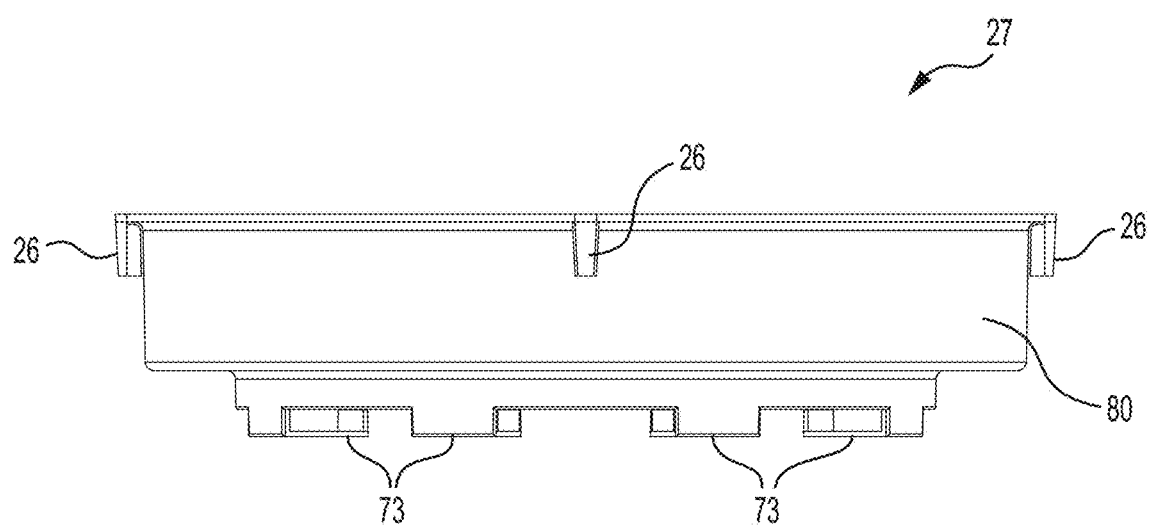
FIG. 46 is a side view of the debris catch tray.

The support tabs 73 are provided and spaced apart circumferentially, as shown in FIG. 43. The support tabs 73 are arranged to support the outer filter media 35 and the optional FIR 92, as shown in FIG. 49. All of the components of the debris catch tray 27 are formed of, for example, polymer composite resin.

(6-5) Outer Filter Closed End Cap

Figure 41:
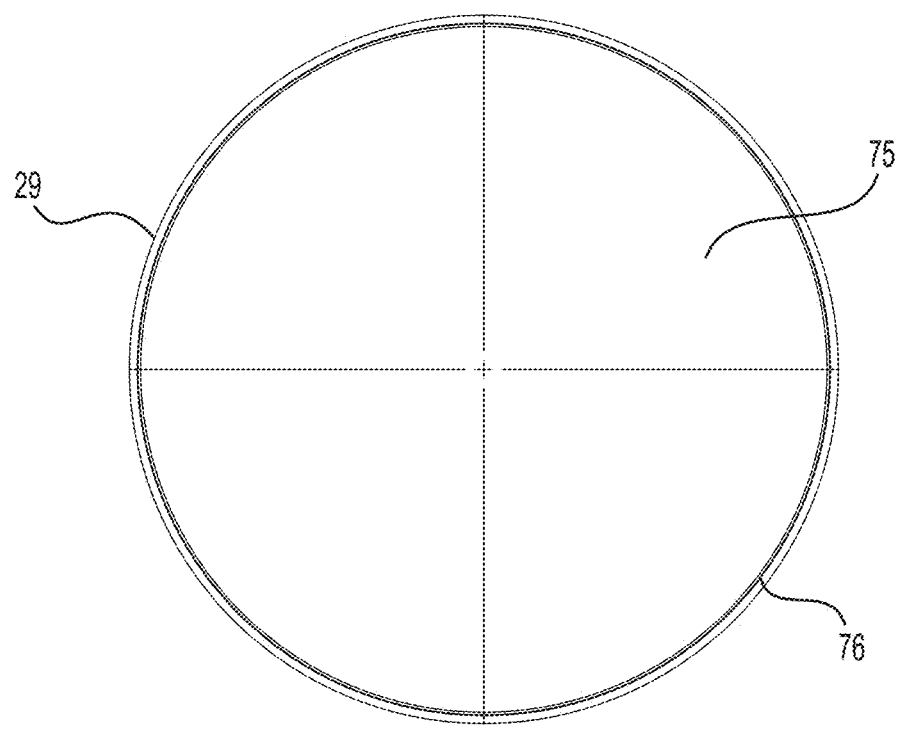
FIG. 41 is a plan view of a second, clean air side of the closed end cap.
Figure 42:
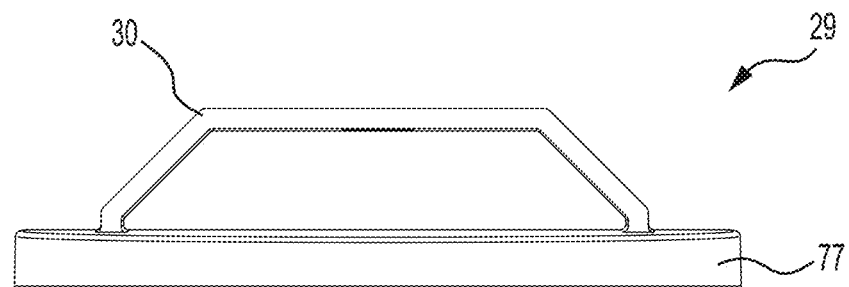
FIG. 42 is a side view of the closed end cap.

FIGS. 39 to 42 shows features of the outer filter closed end cap 29. As discussed above, the outer filter closed end cap 29 holds in place the optional inner screen 36, the outer filter media 35 and the outer screen 28 on the first axial side using, for example, glue. More specifically, as seen in FIG. 41, the second axial side of the outer filter closed end cap 29 includes an affixing surface 75 surrounding by a raised, vertical internal wall 76 that, together, form a tray in which, for example, hot glue may be held during the manufacturing process. The vertical internal wall 76 is, in turn, encompassed and surrounded by a raised, vertical external wall 77. The affixing surface 75 is configured to receive, for example, hot glue during the manufacturing process in order to affix the inner screen 36, the outer filter media 35 and the outer screen 28 on the first axial side.

The outer filter closed end cap 29 is provided with a handle 30 on the first axial side to facilitate installation of the outer filter assembly 20 into the separator chamber housing 11. The center of the handle 30 is provided with an alignment hole 31 configured to receive (and align) the alignment pin 38. Because the alignment pin 38 passes through the handle 30 and extends from the airflow diverter 50 (as described above), the alignment pin 38 advantageously ensures proper alignment between the airflow powerhead assembly 109 (the rain cap 2, the motor/fan assembly 9, and the vane assembly 10) and the outer filter assembly 20. The alignment pin 38 ensures that the outer filter assembly 20 is centered in the separator chamber housing 11.

(6-6) Inner Filter Assembly

Figure 7:
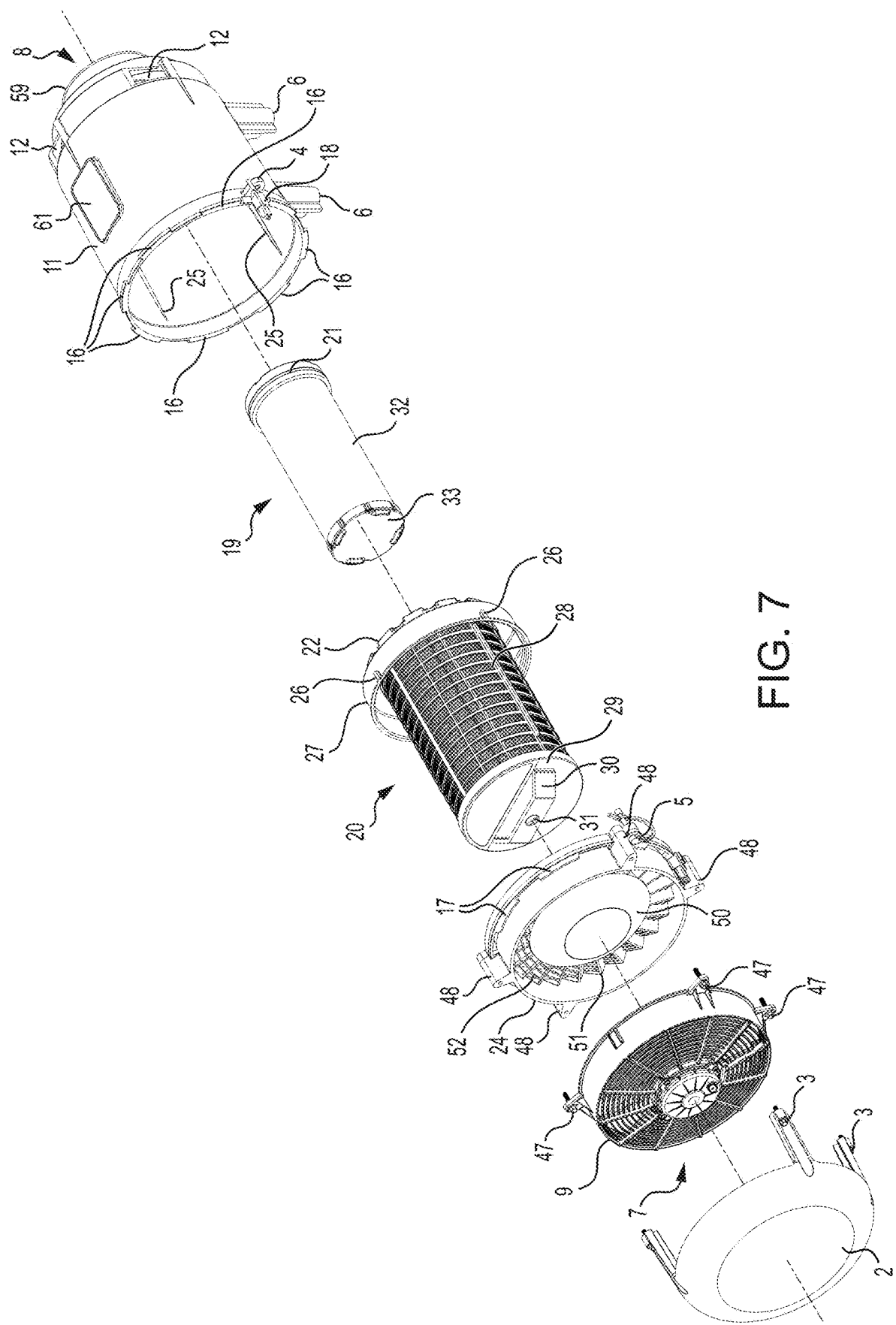
FIG. 7 is an exploded perspective view of the air filtration apparatus.
Figure 9:
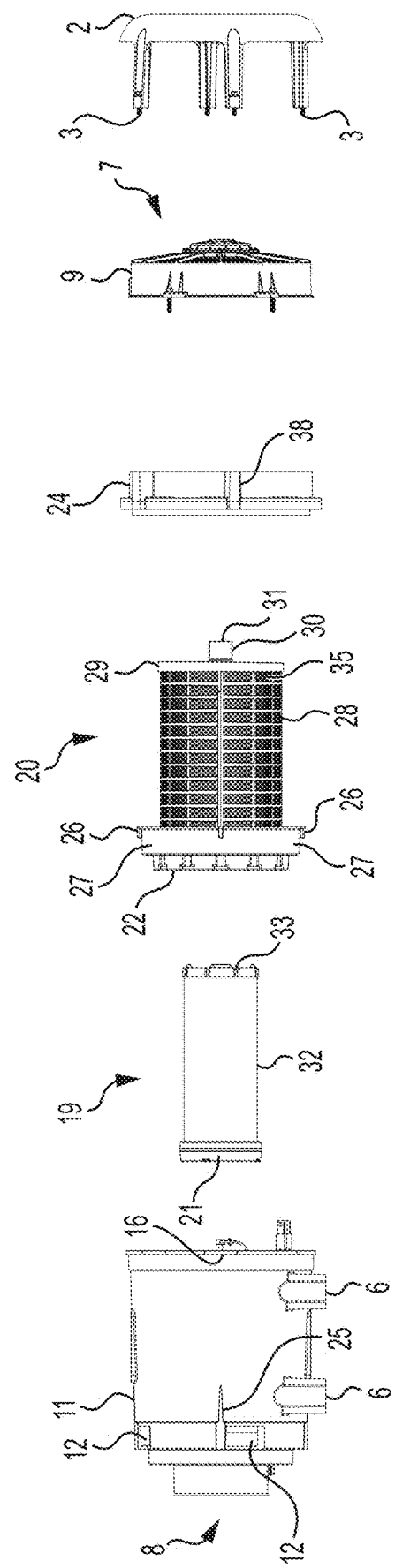
FIG. 9 is an exploded side view of the air filtration apparatus.
Figure 11:
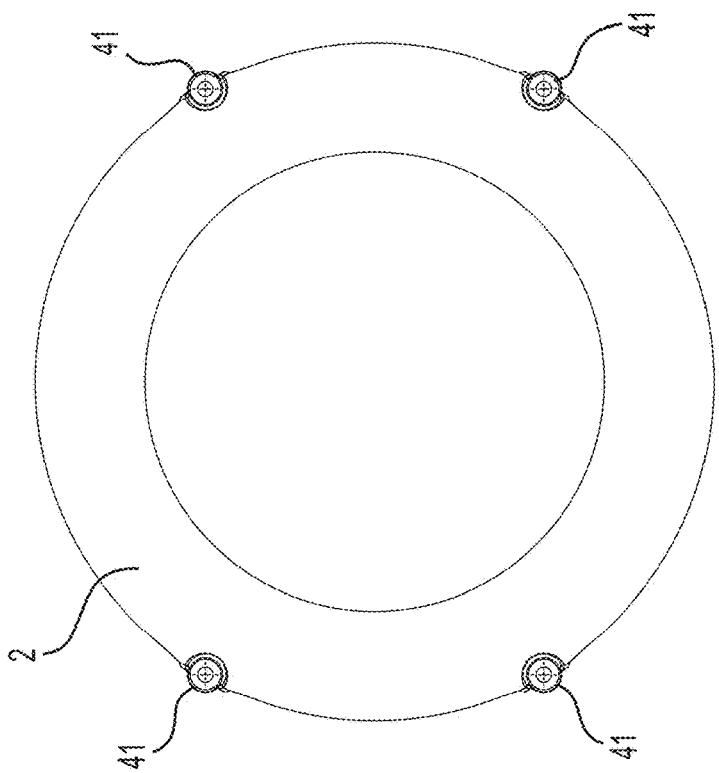
FIG. 11 is a plan view of the top of the rain cap.

The inner filter assembly 19 is provided as an optional, secondary filter (also called a "safety filter") which may be positioned inside of the outer (primary) filter assembly 20, specifically inside of the inner screen 36, if included (see FIGS. 7 and 9). The inner filter assembly 19 includes an inner filter clean side seal 21, inner filter media 32, and an inner filter closed end cap 33. Like the outer filter media 35, the inner filter media 32 may include a variety of media, including but not limited to, natural fiber or synthetic fiber media; may contain carbon wrap, granulated carbon, felt wrap or foam. If the outer filter media 35 becomes defective or begins to lose its ability to properly filter debris such that debris passes through the outer filter media 35, the debris will then collect on the outer surface of the inner filter media 32, reducing the airflow that exits the air filtration apparatus 1 due to the lower debris load capacity of the inner filter media 32. As a result, the user can be readily notified of a problem with the outer filter media 35.

Figure 55:
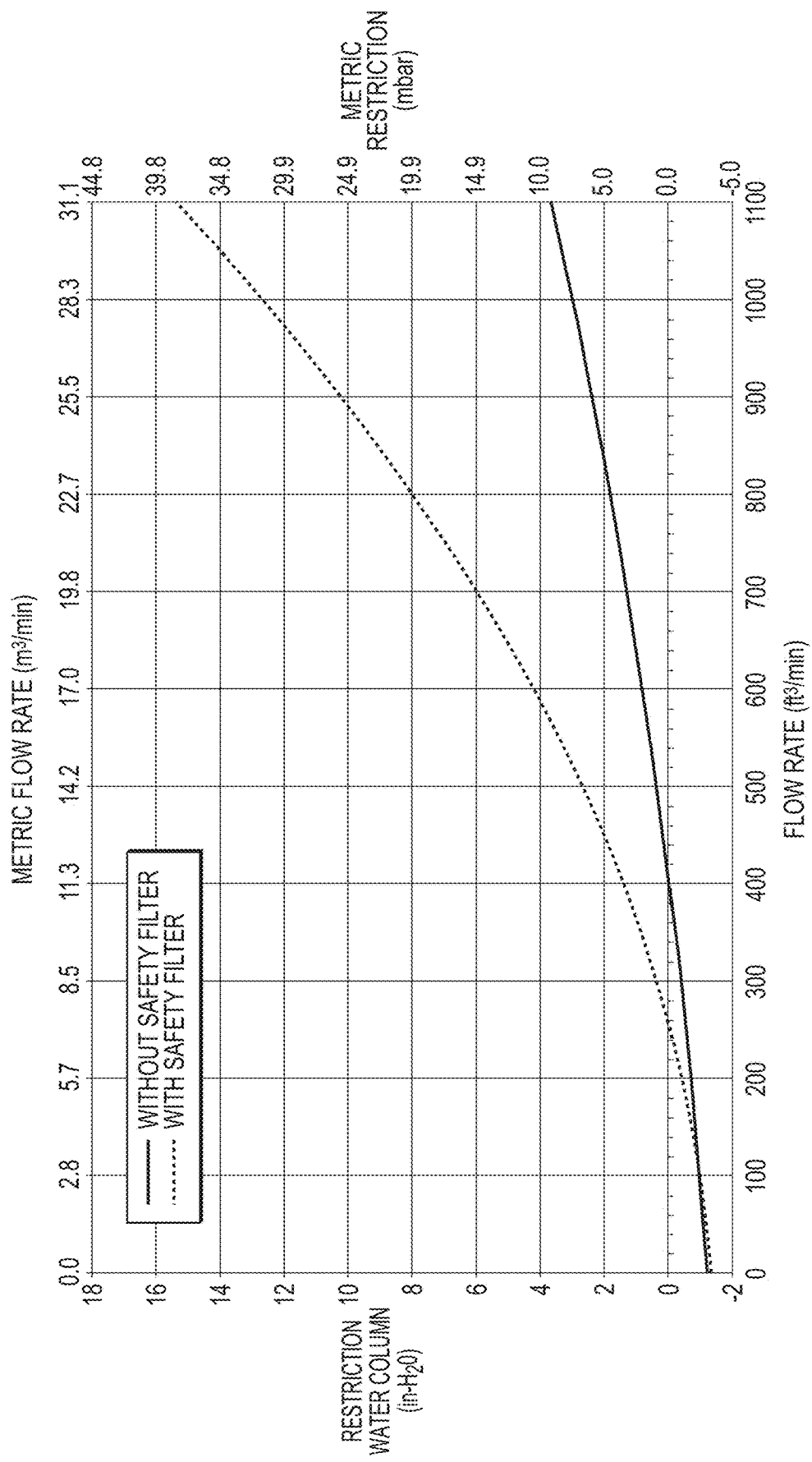
FIG. 55 is a graph comparing an example flow rate in the air filtration apparatus with a safety filter installed and a flow rate without the safety filter installed.

The inner filter clean side seal 21 may be made of, for example, urethane. The inner filter closed end cap 33 may be made of, for example, polymer composite resin. As shown in FIG. 55, at higher flow rates the air filtration apparatus 1 tends to have a more restricted airflow when the inner filter assembly 19 is installed than when it is not installed. However, the level of airflow restriction when the inner filter assembly 19 is installed is still an acceptable level for system performance. The flow rates and parameters given in FIG. 55 are merely exemplary and do not limit the scope of this disclosure.

Figure 53A:
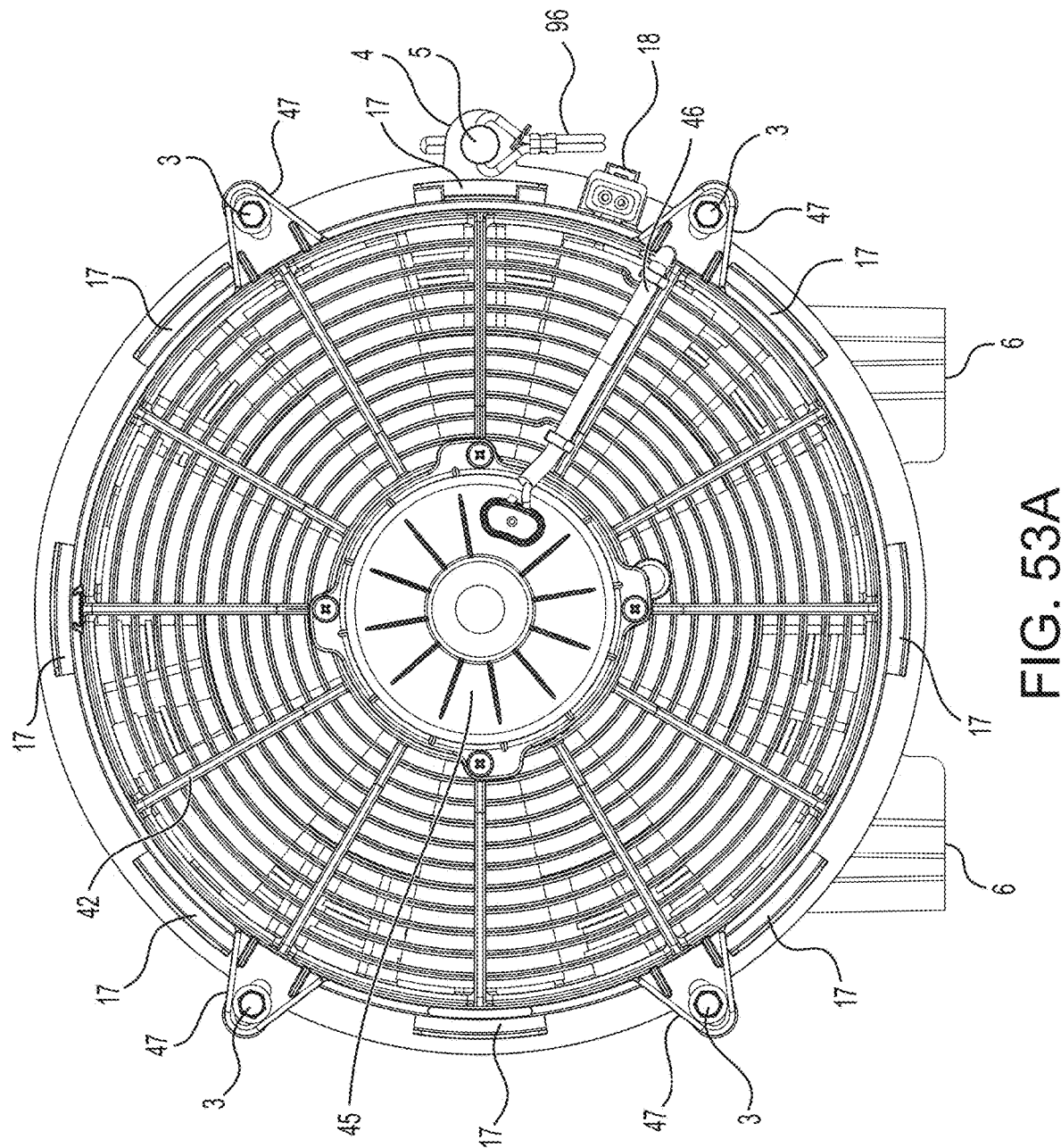
FIG. 53A is a dirty air side view of the air filtration apparatus with the locking pin assembly installed.
Figure 53B:
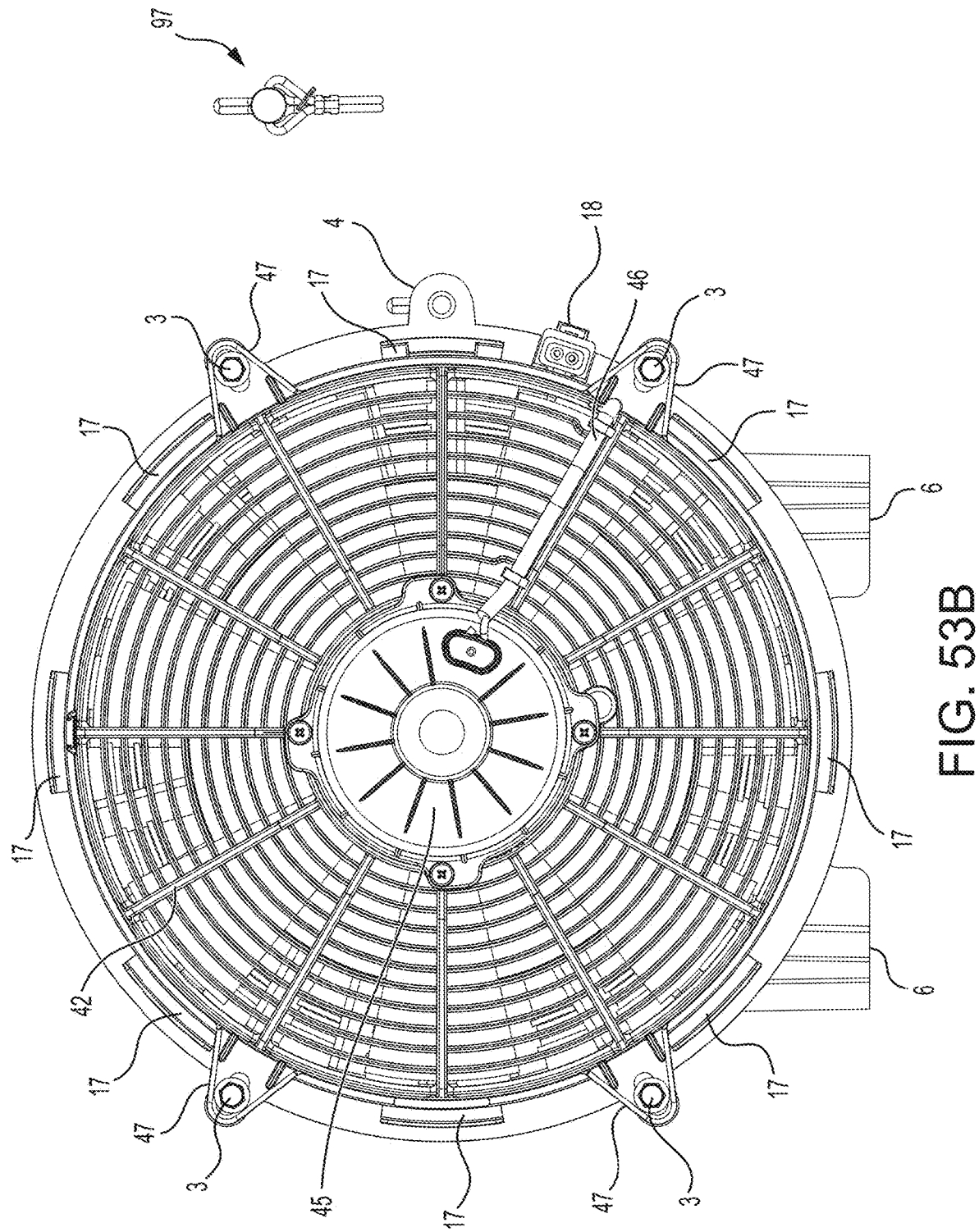
FIG. 53B is a dirty air side view of the air filtration apparatus with the locking pin assembly removed.

After the airflow powerhead assembly 109 is assembled to the separator chamber housing 11 as shown in FIG. 1, the air filtration apparatus 1 is fully assembled and ready for operation. FIGS. 51 to 54 show the assembled state of the air filtration apparatus 1 with the detachable, optional rain cap 2 removed, as a modified arrangement 94. As shown in FIG. 51, the assembly 95 includes only the motor/fan assembly 9 and the vane assembly 10, without the rain cap 2. FIG. 53A shows the assembled state with the locking pin 5 inserted into the first and second locking pin bosses 4, while FIG. 53B shows the assembled state with the locking pin assembly 97 removed.

(7) Debris Screen

Figure 56:
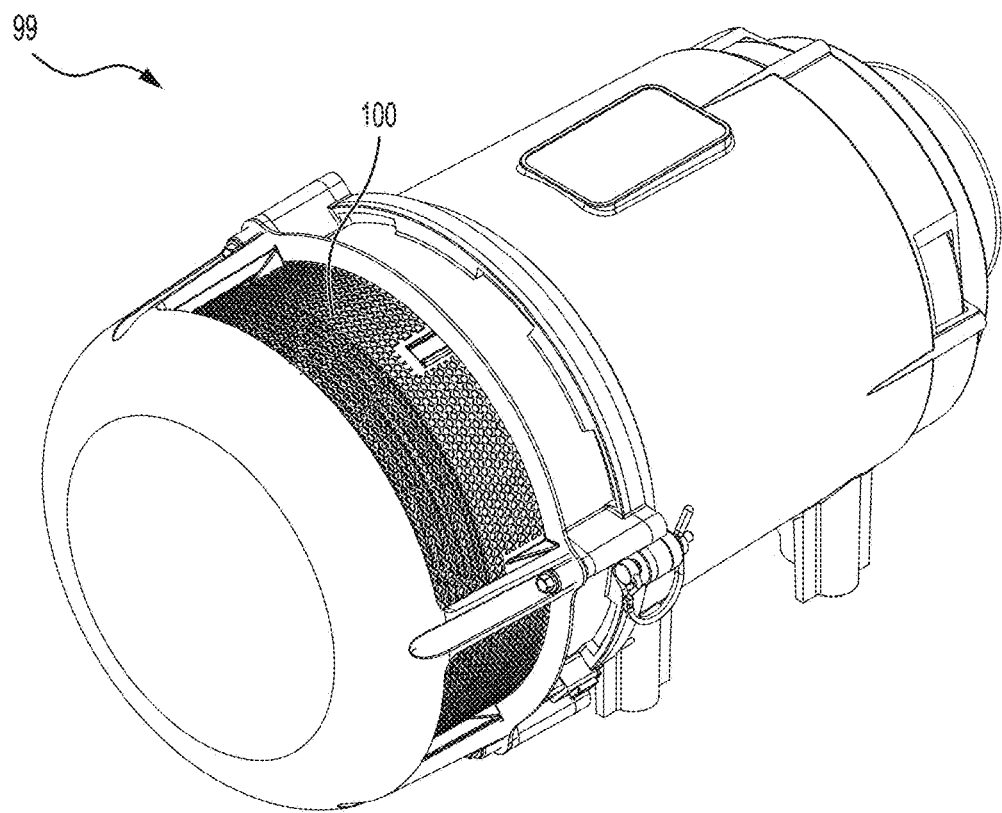
FIG. 56 is a perspective view of the air filtration apparatus showing an optional debris screen installed thereon.
Figure 57:
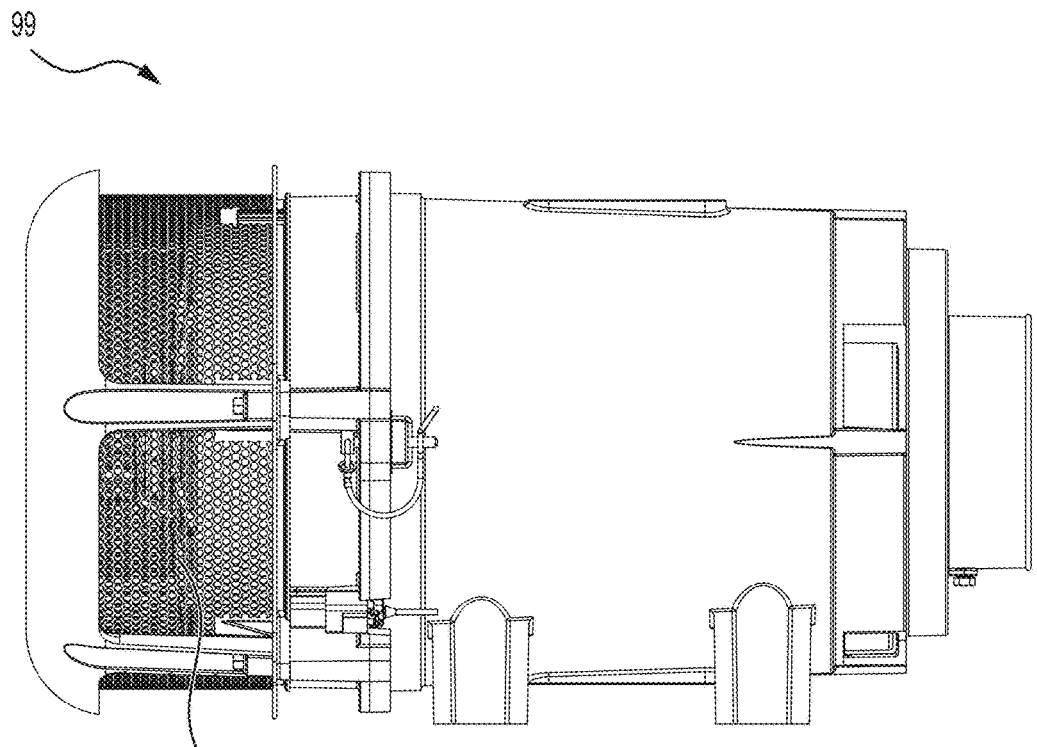
FIG. 57 is a side view of the air filtration apparatus showing the debris screen installed thereon.
Figure 58:
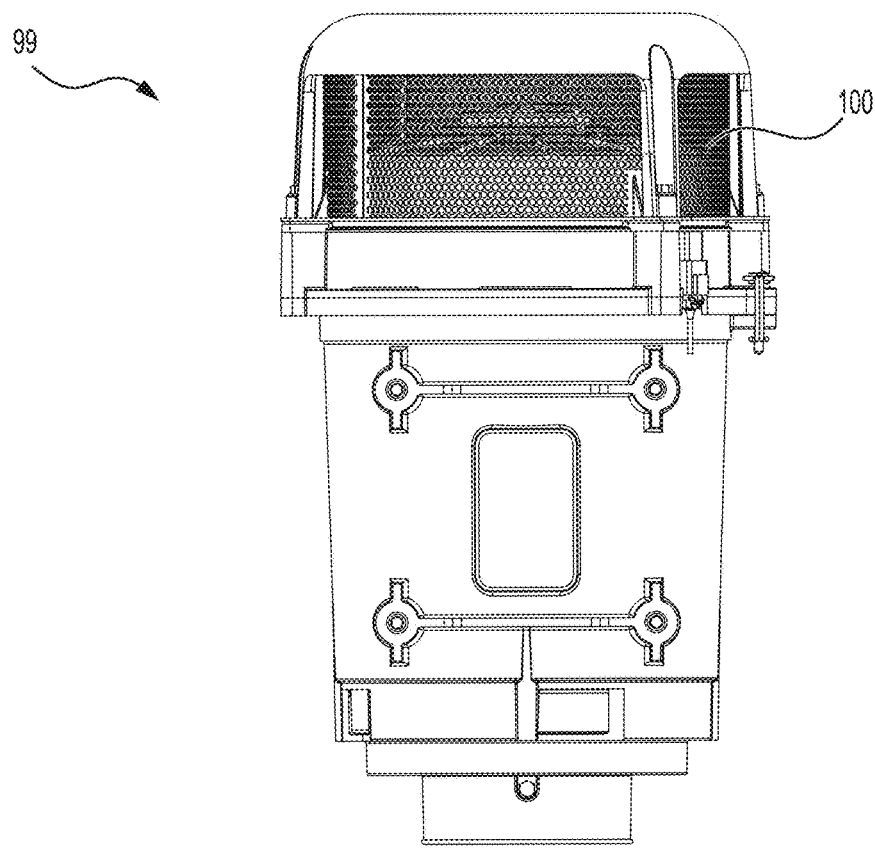
FIG. 58 is another side view of the air filtration apparatus showing the debris screen installed thereon.
Figure 59:
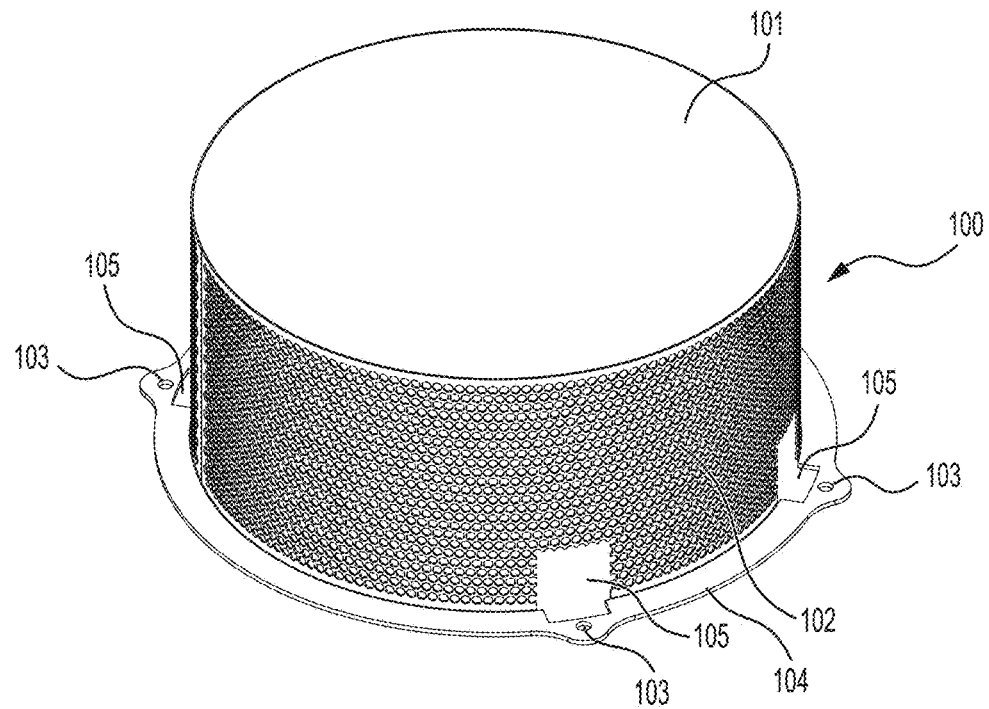
FIG. 59 is a perspective view of the debris screen.
Figure 60:
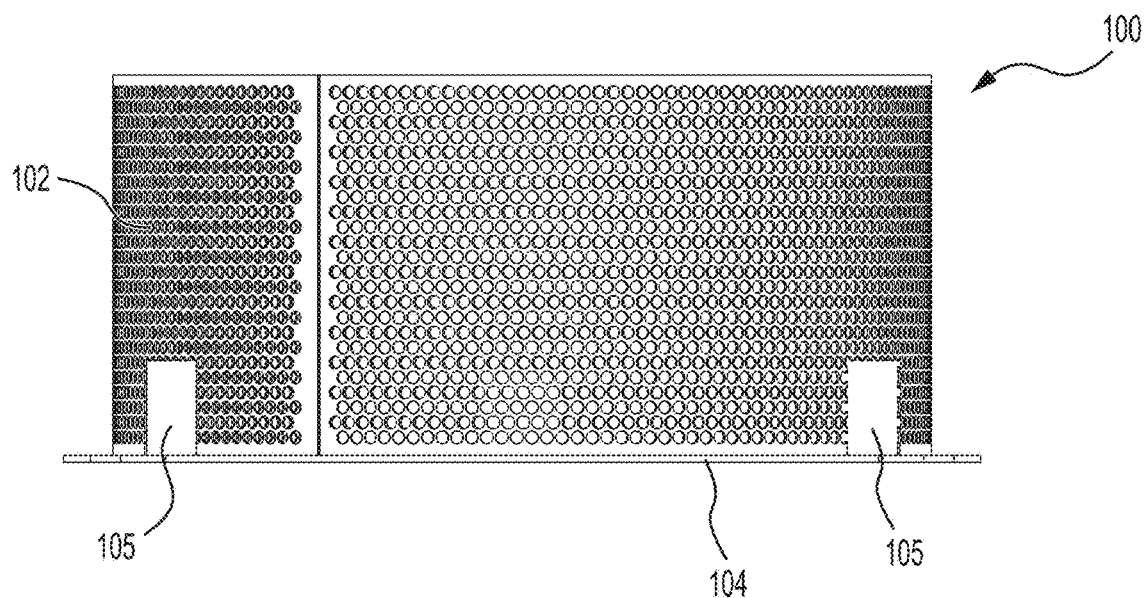
FIG. 60 is a side view of the debris screen.
Figure 61:
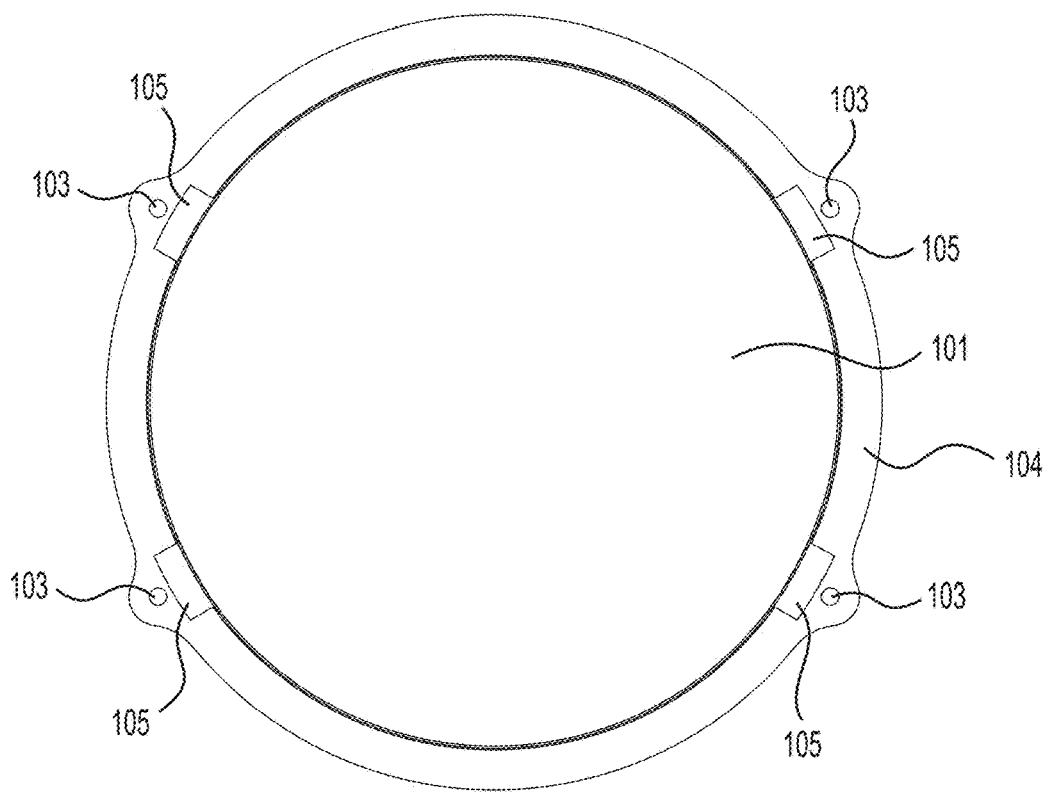
FIG. 61 is a plan view of the bottom and mounting flange of the debris screen.

FIGS. 56 to 59 show features of an optional debris screen 100. FIG. 56 shows an arrangement 99 in which the fully assembled air filtration apparatus 1 additionally includes the debris screen 100. The debris screen 100 is provided so as to fill the space between, and extend axially between, the rain cap 2 and the motor/fan assembly 9. The debris screen 100 advantageously prevents airborne debris that is too large to pass through the air filtration apparatus 1 from entering that space. This is particularly useful in landfill operations, agriculture, logging, and other fields which present an environment that has a high concentration of large airborne debris. The debris screen 100 is made of, for example, metal and includes a top 101, a perforated circumferential side surface 102, mounting holes 103, a mounting flange 104, and air gaps 105. The top 101 is installed adjacent to, but not contacting, the inner surface of the rain cap 2. The mounting flange 104 is installed adjacent to, and contacting, the first axial side of the motor/fan assembly 9. The perforated circumferential side surface 102 is a surface comprising a plurality of holes allowing air to pass into the air filtration apparatus 1. The plural mounting holes 103 are provided spaced apart circumferentially on the mounting flange 104 and are configured to receive the same fasteners 3 that are inserted into the receiving bosses 41 of the rain cap 2, the receiving bosses 47 of the motor/fan assembly 9, and the receiving bosses 48 of the vane assembly 10. Each of the air gaps 105 is sized and configured to receive a corresponding one of the mounting feet of the rain cap 2 as well as a corresponding one of the receiving bosses 47 of the motor/fan assembly 9.

(8) Air Filtration Method

Figure 62:
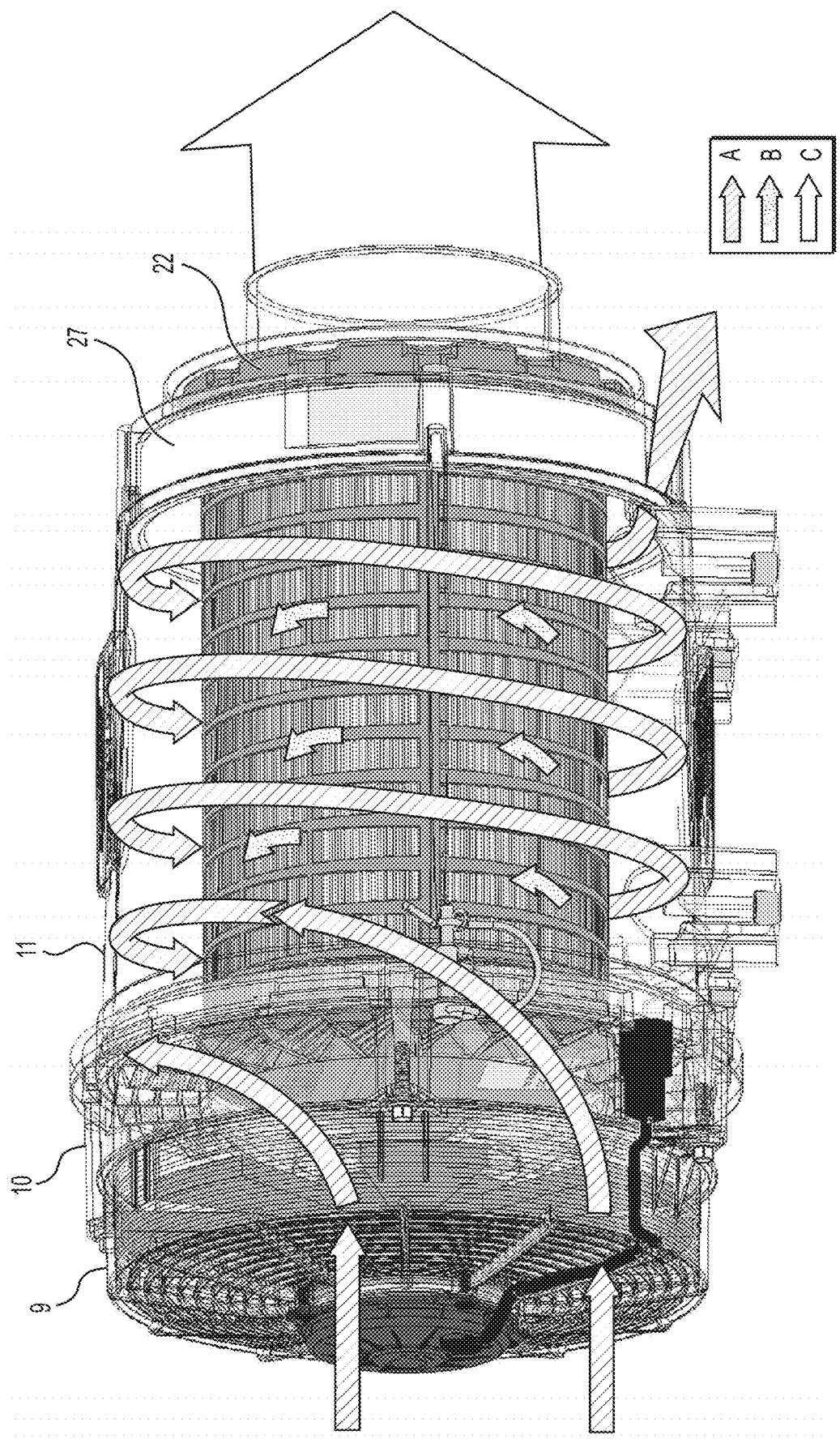
FIG. 62 is a flow diagram showing the airflow passing through the air filtration apparatus.

An air filtration method of the present disclosure can be understood with reference to FIG. 62. FIG. 62 is an image of the airflow through the air filtration apparatus 1 with the rain cap 2 removed. The method compromises drawing debris-laden air into the airflow inlet 57 using a vacuum effect created by the motor/fan assembly 9. The stratified debris-laden air is shown in FIG. 62 as airflow A. After exiting the motor/fan assembly 9, the airflow is pushed downstream using a positive pressure effect created by the motor/fan assembly 9 and the tapered separator chamber housing 11. More specifically, the debris-laden air is flowed under pressure (positive pressure created by the motor/fan assembly 9) along a linear flow path, with centripetal force spinning the airflow of the debris-laden air under pressure about the axis X, thereby forming the debris-stratified rotating airflow A with the heavier-than-air debris particles in the radially outermost orbit of the pressurized rotating airflow. The tapered shape of the separator chamber housing 11, together with the air pressure created by the motor/fan assembly 9, maintains a high-energy flow of air, with the gradually reducing diameter of the separator chamber housing 11 collapsing the airflow toward the debris catch tray 27. As the centripetal spinning debris-laden airflow is pushed into the tapered separator chamber housing 11, it travels in a linear direction down the walls of the separator chamber housing 11 toward the second axial end. The centripetal spinning airflow velocity is maintained by the shrinking area (i.e., gradually reducing diameter) of the tapered separator chamber housing 11 and the pressurized airflow provided by the motor/fan assembly 9. The debris particles that are trapped in the centripetal spinning airflow pattern move along the inside wall of the separator chamber housing 11 and are pushed down the linear path of the airflow toward the clean air outlet end. Centripetal forces cause the debris to move radially outward toward the inside walls of the separator chamber housing 11 as the debris continues to be pushed downstream toward the second axial end by the airflow through the separator chamber housing 11. The debris is then caught in the debris catch tray 27 incorporated into the outer filter clean side seal 22 located at the back of the separator chamber housing 11. The debris is then directed under pressure out the debris ejection slot 72 on the debris catch tray 27 that is aligned with a debris ejection slot extension 12 molded into the end of the separator chamber housing 11, and forcibly ejected back into the environment as shown in FIG. 62.

As the pressurized centripetally spinning air is pushed linearly (axially) down the separator chamber housing 11 toward the second axial end, the radially inner airflow B shown in FIG. 62 is fine-particle debris-laden air surrounding the outer filter assembly 20 that has been stripped of most of the debris. This airflow B enters through the outer filter assembly 20, is filtered (cleaned) by the outer filter assembly 20, and continues to flow, as clean airflow C, along the longitudinal axis X. The filtered (clean) airflow C is carried along the linear flow path inside of the filter assembly 20 toward the clean air outlet 8 at the end of the separator chamber housing 11 as shown in FIG. 62. This linear directional airflow creates minimal airflow restriction allowing for the energy created by the motor/fan assembly 9 to be more efficiently used to flow high volumes of air and creating significant centripetal separating efficiency and pressure through the air filtration apparatus 1, allowing for much higher airflow in applications with limited space. Moreover, the linear airflow pattern in the separator chamber housing 11 prevents turbulence in the airflow, which reduces restriction and improves separator efficiency. The air is drawn into the outer filter assembly 20 along the length of the outer filter assembly 20 and flows to the clean air outlet 8 in the same direction as the spinning airborne debris flows to the debris catch tray 27. The combination of the pressurized air, centripetal spinning airflow, the tapered separator chamber housing 11, the outer air filter assembly 20, and the debris catch tray 27 forcibly pushing debris out the debris ejection slot 72 allows for debris that builds up on the outer air filter assembly 20 to be stripped off by the pressurized centripetal spinning air in the tapered separator chamber housing 11. With the above-described features, the air filtration apparatus 1 is able to meet varying airflow demands of the engine or other device to which the air filtration apparatus 1 is installed.

More specifically, positive air pressure is advantageously maintained in the air filtration apparatus 1 during use. Positive pressure may be understood as the pressure that positively pushes the airflow from the motor/fan assembly 9 to the clean air outlet 8, while exerting a centripetal force on the airflow to ensure that debris is pushed radially outward, thereby minimizing buildup of the debris on the outer filter assembly 20. Positive pressure is caused by the motor/fan assembly 9 compressing air molecules in the air filtration apparatus 1. Positive pressure that is generated by the motor/fan assembly 9 compressing air molecules in the separator chamber housing 11 causes the air to pass through the filter and downstream, out the debris ejection slot extensions 12. This positive air pressure prevents the debris ejection slot extensions 12 from becoming air inlets. In other words, the motor/fan assembly 9 is driven to create a strong enough airflow to achieve ejection at the debris ejection slot extensions 12, at the maximum rated airflow through the clean air outlet 8 without allowing outside air or debris to enter through the debris ejection slot extensions 12.

The tapered separator chamber housing 11 reduces the circumference of the airflow path, causing the centripetal spinning airflow to accelerate within the separator chamber housing 11 toward the clean air outlet 8. As the airflow enters the separator chamber housing 11 under the pressure created by the fan blades 44 and under the centripetal acceleration caused by the vanes 51, the debris in the air is pushed radially outward by centrifugal force. Because the airflow through the air filtration apparatus 1 is linear, the spinning airflow enters the outer filter media 35 in the center of the debris separator chamber 34 (see FIG. 8), flowing toward the clean air outlet 8, such that the airflow is straightened out as it passes through the outer filter media 35. The separator chamber housing 11 tapers inward toward the clean air outlet 8 allowing the separated debris that is spinning around the inside wall of the separator chamber housing 11 to continue to accelerate flowing to the second axial end of the separator chamber housing 11. The separated debris spins into the debris catch tray 27, and is pushed out by the positive airflow pressure created by the fan blades 44 through the debris ejection slot 72, integrated into the outer filter clean side seal 22, that aligns with the at least one debris ejection slot extension 12 incorporated into the air outlet end of the separator chamber housing 11. The airflow that enters the outer filter media 35 is filtered when flowing inward through the outer filter media 35 and moves in a linear direction to the center of the separator chamber housing 11 and out, as clean air, to the device to which it is installed (or to the environment, if not installed on a device) through the clean air outlet 8.

Thus, in operation, the fan motor 45 is given power via the electrical wiring 46, and debris-laden air is drawn into the air filtration apparatus 1 via the fan blades 44. The debris-laden air passes through the motor/fan assembly 9 spinning to the vane assembly 10. Any air that contacts the center of the vane assembly 10 will be redirected to the vanes 51 by the airflow diverter 50. Upon contacting and passing between the vanes 51, the air is accelerated and forms a vortex. The outer walls of the separator chamber housing 11 taper inward to the back of the separator chamber housing 11 (toward the second axial end), which decreases the space at the back of the separator chamber housing 11 to maintain the centrifugal separating velocity of the air as it passes, accelerated, from the radial arrangement of the vanes 51 and through the separator chamber housing 11 spinning the debris-laden air to centrifugally separate and push the particulate debris to the outer wall of the separator chamber housing 11. The remaining air is passed through the outer filter assembly 20 and is cleaned by the outer filter media 35. At the same time, debris that has been removed from the air in the debris separator chamber 34 passes to the debris catch tray 27, where it spins within the debris catch tray 27 until being forcibly ejected under pressure via the debris ejection slot 72. Because the debris ejection slot 72 is aligned with one of the debris ejection slot extensions 12, the debris will then be ejected through the respective debris ejection slot extension 12 back into the environment. Meanwhile, only the cleaned air passes through the center of the outer filter assembly 20, through the outer filter clean side seal 22, and then exits finally through the clean air outlet 8.

(9) Advantageous Effects

As described above, the features of the disclosed air filtration apparatus 1 and air filtration method have numerous advantages. The linear direction of airflow along the longitudinal axis X within the air filtration apparatus 1 significantly reduces airflow restriction and allows more of the positive pressurized air to be pushed out of the clean air outlet 8, while simultaneously forcibly ejecting debris that has been removed from the air back into the environment via the debris ejection slot 72 and the aligned debris ejection slot extension 12. This linear directional airflow creates minimal airflow restriction, allowing for the energy created by the motor/fan assembly 9 to be more efficiently used to flow high volumes of air to the device to which the apparatus is attached while creating significant centripetal separating efficiency and pressure through the compact size of the air filtration apparatus 1, thereby allowing for much higher airflow in applications with limited space. Moreover, the linear airflow pattern in the tapered separator chamber housing 11 prevents airflow turbulence, thereby reducing airflow restriction and improving separator efficiency. The air is drawn into the outer filter assembly 20 along the length of the outer filter assembly 20 and flows to the clean air outlet 8 in the same direction as the spinning airborne debris flows to the debris catch tray 27.

In addition, the tapered structure of the separator chamber housing 11 reduces the airflow path as it moves toward the second axial end, causing the pressurized centripetal spinning air to accelerate within the separator chamber housing 11 toward the clean air outlet 8. At the same time, the tapered structure maintains the centrifugal separating velocity of the pressurized air, spinning the debris-laden air to centrifugally separate and push the particulate debris to the inside walls of the separator chamber housing 11 and to the debris catch tray 27 for ejection to the outside environment via the debris ejection slot 72 and the aligned debris ejection slot extension 12.

Another advantage of the disclosed air filtration apparatus 1 is the provision of the alignment pin 38. Because the alignment pin 38 passes through the handle 30 and extends from the airflow diverter 50, the alignment pin 38 advantageously ensures proper alignment between the airflow powerhead assembly 109 and the outer filter assembly 20. The alignment pin 38 ensures that the outer filter assembly 20 is centered in the separator chamber housing 11.

Yet another advantage of the disclosed air filtration apparatus 1 is the provision of the debris catch tray 27. The debris catch tray 27 is included in (and embedded in) the outer filter clean side seal 22 and facilitates removal of debris by providing a space (formed by the inner axially-facing wall 78 and the inner circumferential wall 79) in which the debris spins before being ejected through the debris ejection slot 72. Depending on the rotational position of the outer filter assembly 20, the debris ejection slot 72 can be aligned with any of the debris ejection slot extensions 12. The mating arrangement of the filter alignment ridges 26 and the filter alignment grooves 25 provides a safety feature that advantageously ensures that, regardless of the rotational position the outer filter assembly 20, the debris ejection slot 72 will without fail be aligned with one of the debris ejection slot extensions 12. In other words, the mating arrangement of the filter alignment ridges 26 and the filter alignment grooves 25 prevents the outer filter assembly 20 from being installed in the separator chamber housing 11 without aligning the debris ejection slot 72 with one of the debris ejection slot extensions 12.

Moreover, due to the provision of the debris ejection slot 72 and the debris ejection slot extensions 12, the air filtration apparatus 1 is a self-cleaning apparatus that does not require maintenance between air filter changes to remove separated airborne debris. Instead, as described in detail above, the pressurized centripetally spinning air created within the air filtration apparatus 1 ensures removal of debris through the debris ejection slot extensions 12. Also, because the debris is caught in the debris catch tray 27, debris will not fall out of the air filtration apparatus 1 during filter maintenance. The debris catch tray 27 also prevents debris from falling into the clean air outlet 8 when the outer filter assembly 20 is removed.

Additionally, the optional provision of the FID (filter identification) reader air outlet side adaptor 83 and the filter identification ring ("FIR") 92 allows for the automatic exchange of filter information and performance data. This allows the machine operator to know, for example, the filter part number, performance characteristics, and operating hours of the filter during operation. The FIR 92 may store data collected over the life of the filter. The attachment of the FID reader air outlet side adaptor 83 to the mounting surface 63 of the separator chamber housing 11 on the clean air side allows for efficient reading of the FIR 92 embedded in the outer filter clean side seal 22 at the clean air side.

In addition, the vacuum/pressure port 13 provided on the inner circumferential surface of the clean air outlet 8 is advantageously configured to receive an optional mechanical or electrical pressure/vacuum sensor for sensing and reading the pressure of the airflow at the clean air outlet 8. This facilitates monitoring the pressure to change the airflow through the air filtration apparatus 1 as needed, as well as monitoring of the restriction to the airflow caused by the outer filter assembly 20 over time.

The air filtration apparatus 1 also advantageously provides for attachment of various adaptable, optional accessories. The mounting surface 63 of the separator chamber housing 11 is configured to accommodate one of the ejection port adaptor 64, the FID (filter identification) reader air outlet side adaptor 83, and the ejection slot sealing cap adaptor 93. Each of these adaptors provides different advantages, and all of them are easily attached to and removed from the separator chamber housing 11 as described above. The ejection port adaptor 64 advantageously fits on the air outlet side of the tapered separator chamber housing 11, allowing for the debris ejection slot extension 12 to be converted to a round tubular ejection port for under-the-hood installations in vehicles. The ejection slot sealing cap adaptor 93 advantageously seals off the debris ejection slot extension 12 if the separator chamber housing 11 is to be used without the self-cleaning features.

Yet another advantage of the disclosed air filtration apparatus 1 is the provision of the optional debris screen 100. The debris screen 100 advantageously prevents airborne debris that is too large to pass through the air filtration apparatus 1 from entering. This is particularly useful in landfill operations, agriculture, logging and other fields which present an environment that has a high concentration of large airborne debris.

Moreover, the detachable airflow powerhead assembly 109, including the rain cap 2, the motor/fan assembly 9, and the vane (louver) assembly 10 allows for adaptation to different machinery and equipment. For instance, the rain cap 2 is optional and easily mounts to the motor/fan assembly 9 and the vane assembly 10 using the same fasteners 3.

Also, the compact air filtration apparatus 1 of this disclosure is significantly smaller in physical size and weight than comparative air filtration precleaning apparatuses at a comparable airflow. Due to the provision of the mounting bosses 6 and the plural debris ejection slot extensions 12, the air filtration apparatus 1 can also be mounted in any orientation that allows for servicing and maintenance. The air filtration apparatus 1 thus gives maximum mounting flexibility to an OEM (original equipment manufacturer) designer to integrate this apparatus on a device, as well as to the aftermarket installer.

Additionally, the provision of the locking slots 17 of the vane assembly 10 arranged to receive the mounting tabs 16 of the separator chamber housing 11 advantageously facilitates a simple lock-and-twist mating structure between the separator chamber housing 11 and the airflow powerhead assembly 109. This, in turn, allows for quick and efficient air filter cartridge replacement.

In addition, the debris catch tray 27 has the debris ejection slot 72 that uses four filter alignment ridges 26 that mate with four filter alignment grooves 25 on the inside of the separator chamber housing 11 to select which of the debris ejection slot extensions 12 at the end of the separator chamber housing 11 will align with the debris ejection slot 72. This ensures that, regardless of the position at which the outer filter assembly 20 is installed, the airborne debris will be ejected out of the separator chamber housing 11.

Furthermore, the separator chamber housing 11 is elongated and tapered along the direction of the longitudinal axis X from the airflow inlet 57 to the clean air outlet 8. This structure allows the air to flow through the separator chamber housing 11 and into the outer filter assembly 20 in a linear direction. This airflow pattern reduces the turbulence and maximizes the airflow through the compact air filtration apparatus 1. This airflow pattern also reduces airflow restriction within the air filtration apparatus 1, allowing more air to be pushed out of the clean air outlet 8 and into the engine or device on which the air filtration apparatus 1 is installed.

Exemplary embodiments of the present invention have been described above. It should be noted that the above exemplary embodiments are merely examples of the present invention, and the present invention is not limited to the detailed embodiments. It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by this disclosure.

What is claimed is:

1. An air filtration apparatus comprising:
an airflow powerhead assembly including a motor-driven fan assembly and a vane assembly, the airflow powerhead assembly defining a dirty air inlet at which debris-laden air is drawn into the air filtration apparatus using the fan assembly;
a filter assembly including filter media, the filter assembly being configured to remove debris from the debris-laden air; and
a separator chamber housing inside of which the filter assembly is disposed, wherein
the airflow powerhead assembly is disposed on a first axial side of the separator chamber housing with respect to a longitudinal axis of the air filtration apparatus, the separator chamber housing has a chamber inlet at the first axial side and a clean air outlet at a second axial side of the separator chamber housing opposite the first axial side, the filter assembly has a first axial end adjacent the chamber inlet and a second axial end adjacent the clean air outlet, the separator chamber housing includes at least one debris ejection slot extension configured to eject the debris from an inner space of the separator chamber housing to a surrounding environment, the filter assembly includes a debris catch tray disposed at the second axial end, the debris catch tray having a debris ejection slot radially aligned with and communicating with the at least one debris ejection slot extension for ejecting the debris radially from the inner space of the separator chamber housing to the surrounding environment, and the debris ejection slot is positioned radially inward of the debris ejection slot extension and is formed in part by a first wall extending away from an outer circumferential surface of the debris catch tray.

2. The air filtration apparatus according to claim 1, wherein the airflow powerhead assembly further includes a detachable rain cap configured to be mounted to a first axial side of the fan assembly, wherein the vane assembly is mounted to a second axial side of the fan assembly.

3. The air filtration apparatus according to claim 2, further comprising a plurality of fasteners configured to secure the airflow powerhead assembly, wherein the fan assembly has a plurality of first receiving bosses, the vane assembly has a plurality of second receiving bosses, the rain cap has a plurality of third receiving bosses, and each of the fasteners extends through a respective one of the third receiving bosses, a respective one of the first receiving bosses, and a respective one of the second receiving bosses.

4. The air filtration apparatus according to claim 2, further comprising a detachable debris screen provided between the rain cap and the fan assembly, wherein the debris screen includes a perforated circumferential surface extending circumferentially around the debris screen and extending axially between the rain cap and the fan assembly.

5. The air filtration apparatus according to claim 4, wherein the debris screen further includes a plurality of air gaps spaced apart around a circumference of the debris screen.

6. The air filtration apparatus according to claim 1, wherein the separator chamber housing is tapered such that a diameter of the separator chamber housing decreases from the first axial side to the second axial side.

7. The air filtration apparatus according to claim 1, further comprising a locking pin assembly configured to lock the airflow powerhead assembly to the separator chamber housing.

8. The air filtration apparatus according to claim 7, wherein the locking pin assembly includes first and second locking pin bosses and a locking pin, the first locking pin boss is provided on an outer circumferential surface of the vane assembly, the second locking pin boss is provided on an outer circumferential surface of the first axial side of the separator chamber housing, and the locking pin extends through both the first locking pin boss and the second locking pin boss to lock the airflow powerhead assembly to the separator chamber housing.

9. The air filtration apparatus according to claim 1, further comprising a plurality of fasteners configured to secure the airflow powerhead assembly, wherein the fan assembly has a plurality of first receiving bosses, the vane assembly has a plurality of second receiving bosses, and each of the fasteners extends through a respective one of the first receiving bosses and a respective one of the second receiving bosses.

10. The air filtration apparatus according to claim 1, further comprising an alignment pin configured to align the airflow powerhead assembly with the filter assembly, wherein the alignment pin extends from the vane assembly, the filter assembly includes a first alignment hole, and the alignment pin is received in the first alignment hole.

11. The air filtration apparatus according to claim 10, wherein the filter assembly further includes a closed end cap disposed at the first axial end, the closed end cap includes a handle protruding from a surface of the closed end cap in a first axial direction toward the airflow powerhead assembly, and the first alignment hole is formed in the handle.

12. The air filtration apparatus according to claim 1, wherein the separator chamber housing includes a plurality of mounting tabs arranged circumferentially around a radially outer surface of the separator chamber on the first axial side of the separator chamber, the vane assembly includes a plurality of locking slots arranged circumferentially around a radially outer surface of the vane assembly on a second axial side of the vane assembly, and each of the locking slots is arranged to receive a respective one of the mounting tabs to secure the airflow powerhead assembly to the separator chamber housing.

13. The air filtration apparatus according to claim 1, wherein the filter assembly further includes a seal member disposed at the second axial end of the filter assembly, the debris catch tray being integrally formed with the seal member.

14. The air filtration apparatus according to claim 13, wherein the filter assembly further includes a filter identification device embedded in the seal member, the filter identification device being configured to store data related to the filter assembly.

15. The air filtration apparatus according to claim 14, further comprising a filter identification reader device removably attached to the second axial side of the separator chamber housing, wherein the filter identification reader device includes circuitry configured to provide power to, and communicate with, the filter identification device.

16. The air filtration apparatus according to claim 15, wherein
the filter identification reader device includes a ring-shaped member attached to the second axial side of the separator chamber housing, a plurality of vertical mounting supports extending axially from the ring-shaped member, and a plurality of air gaps disposed between adjacent pairs of the vertical mounting supports,
the separator chamber housing includes a plurality of the debris ejection slot extensions, and
each of the debris ejection slot extensions is positioned in a respective one of the plurality of air gaps.

17. The air filtration apparatus according to claim 16, wherein
the filter identification reader device further includes an alignment slot formed in each of the vertical mounting supports,
the separator chamber housing includes a mounting boss positioned at each of the debris ejection slot extensions, and
each alignment slot is configured to receive a respective one of the mounting bosses to secure the filter identification reader device to the separator chamber housing.

18. The air filtration apparatus according to claim 14, wherein
the debris catch tray includes a plurality of support tabs spaced circumferentially around the debris catch tray, the support tabs being arranged to support the filter media and the filter identification device.

19. The air filtration apparatus according to claim 1, wherein
the debris catch tray includes a plurality of filter alignment ridges provided on the outer circumferential surface of the debris catch tray,
the separator chamber housing includes a plurality of filter alignment grooves formed on an inner surface of the separator chamber housing, and
the filter alignment ridges are configured to mate with the filter alignment grooves such that the debris ejection slot aligns with the at least one debris ejection slot extension.

20. The air filtration apparatus according to claim 1, further comprising
an electrical connector configured to connect electrical wiring of the fan assembly to a power source, wherein
the electrical connector is disposed in a mounting groove formed in an outer circumferential surface of the vane assembly, and
the electrical connector is configured to prevent removal of the airflow powerhead assembly from the separator chamber housing.

21. An air filtration method comprising:
drawing debris-laden air into an air filtration apparatus using a motor-driven fan assembly of an airflow powerhead assembly located in the air filtration apparatus, the airflow powerhead assembly defining a dirty air inlet at which the debris-laden air is drawn into the air filtration apparatus using the fan assembly;
forming, using a vane assembly of the airflow powerhead assembly positioned downstream of the fan assembly, a centripetal rotating flow of the debris-laden air about a longitudinal axis of the air filtration apparatus to stratify the flow such that debris moves radially outward to outermost orbits of the centripetal rotating flow, the centripetal rotating flow being formed in a separator chamber housing inside of which a filter assembly including filter media configured to remove the debris from the debris-laden air is disposed, the separator chamber housing being positioned downstream of the vane assembly, the airflow powerhead assembly being disposed on a first axial side of the separator chamber housing with respect to the longitudinal axis of the air filtration apparatus, wherein the separator chamber housing has a chamber inlet at the first axial side and a clean air outlet at a second axial side of the separator chamber housing opposite the first axial side, and the filter assembly has a first axial end adjacent the chamber inlet and a second axial end adjacent the clean air outlet;
flowing air from the innermost orbits of the centripetal rotating flow through the filter assembly such that the air that has passed through the filter assembly is clean air, wherein the clean air passes along a linear direction through the filter assembly to the clean air outlet of the separator chamber housing; and
returning the debris-laden air from the stratified centripetal rotating flow to the environment by causing the debris-laden air to pass through a debris ejection slot formed in a debris catch tray of the filter assembly disposed at the second axial end, and then to pass radially through a debris ejection slot extension formed in the separator chamber housing that communicates and is radially aligned with the debris ejection slot, wherein
the debris ejection slot is positioned radially inward of the debris ejection slot extension and is formed in part by a first wall extending away from an outer circumferential surface of the debris catch tray, and
the fan assembly and the separator chamber housing exert a continuous pressure and a continuous centripetal force on the debris-laden air such that the debris-laden air passes along the linear direction through the separator chamber housing to the debris catch tray before returning to the environment.

* * * * *